United States Patent
Nagami et al.

(10) Patent No.: US 7,747,753 B2
(45) Date of Patent: Jun. 29, 2010

(54) NETWORK INTERCONNECTION APPARATUS, NETWORK NODE APPARATUS, AND PACKET TRANSFER METHOD FOR HIGH SPEED, LARGE CAPACITY INTER-NETWORK COMMUNICATION

(75) Inventors: Kenichi Nagami, Chiba-ken (JP); Junko Ami, Kanagawa-ken (JP); Yasuhiro Katsube, Kanagawa-ken (JP); Takeshi Saito, Tokyo (JP); Hiroshi Esaki, Kanagawa-ken (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1386 days.

(21) Appl. No.: 10/437,059

(22) Filed: May 14, 2003

(65) Prior Publication Data

US 2004/0015590 A1    Jan. 22, 2004

Related U.S. Application Data

(60) Division of application No. 09/472,181, filed on Dec. 27, 1999, now Pat. No. 6,598,080, which is a continuation of application No. 09/122,644, filed on Jul. 27, 1998, now Pat. No. 6,343,322, which is a continuation of application No. 08/924,825, filed on Sep. 5, 1997, now Pat. No. 5,835,710, which is a continuation of application No. 08/522,115, filed on Aug. 31, 1995, now abandoned.

(30) Foreign Application Priority Data

Aug. 31, 1994 (JP) ................. P06-232092
Feb. 23, 1995 (JP) ................. P07-58196

(51) Int. Cl.
*G06F 15/16* (2006.01)
(52) U.S. Cl. ................................... 709/227

(58) Field of Classification Search ............ 370/395.52, 370/395.5, 395.51, 245, 351, 389, 396–406, 370/420, 431, 437; 710/36, 316, 317; 340/825, 340/826, 825.03; 709/220, 223, 227, 238, 709/242, 249, 250
See application file for complete search history.

(56) References Cited

U.S. PATENT DOCUMENTS 4,975,906 A    12/1990    Takiyasu et al.

(Continued)

FOREIGN PATENT DOCUMENTS

EP    0 570 630    5/1992
JP    HEI2-167491    6/1990

OTHER PUBLICATIONS

H. EsakI et al., Connection Oriented and Connectionless IP Forwarding Over ATM Networks, Oct. 1994, pp. 1-17.

(Continued)

*Primary Examiner*—Larry Donaghue
(74) *Attorney, Agent, or Firm*—Oblon, Spivak, McClelland, Maier & Neustadt, L.L.P.

(57) ABSTRACT

A packet transfer scheme in a network system capable of realizing a high speed, large capacity inter-network communication under an internet environment. A network interconnection apparatus (router) has a memory for storing a correspondence relationship between a virtual connection used in receiving a packet from one logical network and a virtual connection used in transmitting a packet to another logical network, and a transfer at a datalink layer is carried out according to the registered correspondence relationship, to effectively form a bypass pipe capable of transferring a packet by an datalink layer level processing alone over a plurality of networks from the transmission terminal to the destination terminal, so that a high speed packet transfer between networks can be realized.

21 Claims, 53 Drawing Sheets

U.S. PATENT DOCUMENTS

| | | | |
|---|---|---|---|
| 5,208,811 | A | 5/1993 | Kashio et al. |
| 5,357,508 | A | 10/1994 | Le Boudec et al. |
| 5,420,858 | A | 5/1995 | Marshall et al. |
| 5,426,637 | A | 6/1995 | Derby et al. |
| 5,450,406 | A | 9/1995 | Esaki et al. |
| 5,452,293 | A | 9/1995 | Wilkinson et al. |
| 5,815,816 | A * | 9/1998 | Isumi .......................... 455/458 |

OTHER PUBLICATIONS

Request for Comments 1190 by the IETF, CIP Working Group, Oct. 1990. pp. 1-148.
Application of BGP in the Internet, Jeffrey C. Honig et al., RFC 126B, Oct. 1991. pp. 1-13.
Guru Parulkar et al., A Strategy for Integrating IP with ATM, Department of Computer Sciene, Washington University, pp. 1-10.
Girish P. Chandranmenon et al., Trading Packet Headers for Packet Processing, pp. 1-11.
Reuven Cohen et al., Connection Managemetn and Rerouting in ATM Networks, 1994 IEEE, pp. 184-191.
Keri-ichi-Sato et al., Broad-Band ATM Network Architecture Based on Virtual Paths, 1990 IEEE, Transactions on Communications, vol. 38, No. 8, Aug. 1990, pp. 1212-1222.
Liaw Perez et al., ATM Signaling Support for IP Over ATM, Request for Comments: 1755, Feb. 1995, pp. 1-32.
Wendy M. Harman et al., ISDN Protocols for Connection Control, IEE Journal on Selected Areas in Communications, vol. 7, No. 7, Sep. 1989, pp. 1034-1042.
Rick Bubenik et al., Multipoint Connection Management in High Speed Networks, INFOCOM '91: Proceedings of the Tenth Annual Joint Conference of the IEEE Computer and Communications Societies, pp. 59-68, Apr. 1991.
Israel Cidon et al., Fast Connection Establishment in High Speed Networks, pp. 1-296.
Lixia Zhang et al., RSVP: A New Resource ReSerVation Protocol, pp. 1-22.
H. Esaki et al., Conventional IP over ATM, Internet Draft, Jul. 1994, pp. 1-10.
United States Court of Appeals for the Federal Circuit Court, *Toshiba Corporation* v. *Juniper Networks, Inc.*, 2006-1612, Decided Sep. 6, 2007, pp. 1-7.
In the United States District Court for the District of Delaware, *Toshiba Corporation* v. *Juniper Networks, Inc.*, C.A. No. 03-1035 (SLR), Stipulation and Order of Non-Infringement, pp. A2597-A2599.
In the United States District Court for the District of Delaware, Final Judgment Order, *Toshiba Corporation* v. *Juniper Networks, Inc.*, C.A. 03-1035 (SLR), p. A2600.
In the United States District Court for the District of Delaware, *Toshiba Corporation* v. *Juniper Networks, Inc.*, C.A. No. 03-1035 (SLR), Stipulated Order of Non-Infringement and Final Judgment, pp. A2602-A2611.
United States Court of Appeals, Federal Circuit, INPRO II Licensing, *S.A.R.L* v. *T-Mobile USA, Inc.*, Research in Motion Limited, and Research in Motion Corporation, No. 05-1233, May 11, 2006, pp. A2613-A2620.
In the United States District Court for the District of Delaware, INPRO II Licensing, *S.A.R.L.* v. *T-Mobile USA, Inc.*, Research in Motion Limited and Research in Motion Coroporation, C.A. No. 03-1047 (GMS), Stipulated Order and Judgement, pp. A2622-A2625.
United States Court of Appeals for the Federal Circuit, *Toshiba Corporation* v. *Juniper Networks, Inc.*, Defendant-Appellee Juniper Networks, Inc.'S Motion to Remand Appeal No. 2006-1612, Ruffin B. Cordell, Joseph V. Colaianni, Jr. and Brian T. Racilla, Fish & Richardson, P.C., Roderick R. McKelvie, Richard L. Rainey, Covington and Burling, LLP, pp. A2628-A2646, Sep. 20, 2006.
In the United States District Court for the District of Delaware, *Toshiba Corporation* v. *Juniper Networks, Inc.*, Stipulation and Order of Non-Infringement, C.A. 03-1035-SLR pp. A2648-A2650, Aug. 30, 2006.
In the United States District Court for the District of Delaware, *Toshiba Corporation* v. *Juniper Networks, Inc.*, C.A. No. 03-1035 (SLR), Stipulated Order of Non-Infringement and Final Judgment, pp. A2652-A2661.
In the United States District Court for the District of Delaware, *Toshiba Corporation* v. *Juniper Networks, Inc.*, C.A. No. 03-1035-SLR, Letter dated Aug. 14. 2006 to Richard. L. Horowitz, Esquire and William J. Marsden, Jr. , Esquire, pp. A2663-A2664.
In the United States District Court for the District of Delaware, *Toshiba Corporation* v. *Juniper Networks, Inc.*, C.A. No. 03-1035-SLR, Letter dated Aug. 14, 2006 to Richard. L. Horowitz, Esquire, and William J. Marsden, Jr., Esquire pp. A2626-A2627.
In the United States District Court for the District of Delaware, INPRO II Licensing, *S.A.R.L.,* v. *T-Mobile USA, Inc.* Research in Motion Limited and Research in Motion Corporation, C.A. No. 03-1047 (GMS), Stipulated Order and Judgment, pp. A2666-A2671, Sep. 28, 2006.
In the United States District Court for the District of Delaware, *Toshiba Corporation* v. *Juniper Networks, Inc.*, C.A. No. 03-1035 (SLR), Stipulation and Order of Non-Infringement, pp. A2674-A2676.
In the United States District Court for the District of Delaware, *Toshiba Corporation* v. *Juniper Networks, Inc.*, C.A. No. 03-1035 (SLR), Final Judgement Order, p. A2677.
In the United States District Court for the District of Delaware, *Toshiba Corporation* v. *Juniper Networks, Inc.*, C.A. No. 03-1035 (SLR), Stipulated Order of Non-Infringement and Final Judgement, pp. A2679-A2688.
United States Court of Appeals, Federal Circuit, INPRO II Licensing, *S.A.R.L* v. *T-Mobile USA, Inc.*, Research in Motion Limited, and Research in Motion Corporation, No. 05-1233, May 11, 2006, pp. A2690-A2697.
INPRO II Licensing, *S.A.R.L.,* v. *T-Mobile USA, Inc.* Research in Motion Limited and Research in Motion Corporation, C.A. No. 03-1047 (GMS), Stipulated Order and Judement, pp. A2699-A2702, Dec. 28, 2004.
In the United States District Court for the District of Delaware, *Toshiba Corporation* v. *Juniper Networks, Inc.*, C.A. No. 03-1035 (SLR), Stipulation and Order of Non-Infringement, pp. A2703-A2705.
In the United States District Court for the District of Delaware, *Toshiba Corporation* v. *Juniper Networks, Inc.*, C.A. No. 03-1035 (SLR), Final Judgement Order, pp. A2706-A2707.
Confidential Videotaped Deposition of Joel M. Halpern, vol. 1 Conducted on Monday, Jan. 23, 2006, 9:27 a.m., Job No. 1-71491, pp. 1-278, Reported by Joan V. Cain, L.A.D. Reporting and Digital Videography, pp. A2708-A2712.
In the United States District Court for the District of Delaware, *Toshiba Corporation* v. *Juniper Networks, Inc.*, C.A. No. 03-1035 (SLR), Joint Pretrial Order, pp. A2713-A2726, Jun. 23, 2006.
Exhibit 1, The Parties' Joint Statement of Admitted Facts Requiring No Proof, pp. A2728-A2738.

United States Court of Appeals for the Federal Circuit, *Toshiba Corporation* v. *Juniper Networks, Inc.* Appeal From the United States District Court for the District of Delaware in Case No. 03-CV-1035, Chief Judge Sue L. Robinson, Brief of Defendant—Appellant Juniper Networks, Inc., Fish and Richardson, Covington and Burling, 91 pages, Feb. 16, 2007.

J.Y. Le Boudec et al, A Direct ATM Connectionless Service, Aug. 23, 1991, pp. 1-15.

Donald F. Box at al, Architecture and Design of Connectionless Data Service for a Public ATM Network, Dept. of Information and Computer Science, pp. 1-28.

John David Cavanaugh et al, Internetworking with ATM WANs, Minnesota Supercomputer Center, Inc., Dec. 14, 1992, pp. 403-420.

P. Crocett et al. ATM-based SMDS for LANs/MANs Interconnection, International Switching Symposium, 1992, Oct. 25-30, 1992, vol. 1, pp. 87-91.

D. Deloddere et al, Architecture and Implementation of A Connectionless Server for B-ISDN, ISS '92, Oct. 1992, vol. 1, pp. 224-228.

G. Fioretto et al, Connectionless Service Handling Within B-ISDN, Globecom '91, pp. 217-222.

Takeshi Kawasaki et al, A Study on High Speed Data Communication System Using ATM, Globecom '91, Fujitsu Laboratories Ltd., pp. 2105-2109.

Peter Newman, ATM LANs: The Customer Premises ATM Network, 3$^{rd}$ B-ISDN Technical Workshop, Nice, France, Apr. 5-8, 1993, pp. 1-18.

Katsuyuki Yamazaki et al, KDD R&D Laboratories, International Switching Symposium 1990, Connectionless Cell Switching Schemes for Broadband ISDN, Proceedings vol. VI, pp. 6-10.

C. Brazdziunas, Png Support for ATM Services, Mar. 1994, Network Working Group.

M. Perez et al, ATM Signaling Support for IP over ATM, Internet Draft, Jul. 1994, pp. 1-19. http://www.waterspring.org/pub/id/draft-.etf-ipatrn-sig-01.txt.

Y. Rekhter, Application of the Border Gateway Protocol in the Internet, Network Working Group, Request for Comments: 1268, Obsoletes: RFC 1164, T.J. Watson Research Center, IBM Corp., Oct. 1991, pp. 1-13.

Dave Katz, NBMA Next Hop Resolution Protocol, Internet Draft, Aug. 25, 1994, pp. 1-29.

Yasuhiro Katsube et al, Router Architecture Extensions for ATM, Internet Draft, Mar. 1, 1995, pp. 1-21. Overview & it; draft-katsube-router-atm-overview-oo.txt>.

Juniper Networks, Inc.'s Responses to Toshiba Corporation First Set of Interrogatories (Nos. 1-10), Jun. 11, 2004 (Redacted), pp. 1-20.

Juniper Networks, Inc.'s Suppl. Response to Toshiba Corp.'s First Set of Interrogatories (Nos. 1-10), Dec. 27, 2004 (Redacted), pp. 1-93.

Juniper Networks, Inc.'s Suppl. Response to Toshiba Corp.'s First Set of Interrogatories (Nos. 1-10), Apr. 11, 2005, pp. 1-230.

Riverstone Network, Inc.'s Suppl. Response to Toshiba Corp.'s Interrogatory No. 4, Jan. 3, 2005, pp. 1-4.

Riverstone Network, Inc.'s Second Suppl. Response to Toshiba Corp.'s Interrogatory No. 4, Apr. 11, 2005, pp. 1-13.

Israel Cidon et al., "Fast Connection Establishment in High Speed Networks," Sep. 1990, pp. 287-296.

Reuven Cohen et al., "Connection Management and Rerouting in ATM Networks," Jun. 1994, pp. 184-191.

H. Esaki et al, "Connection Oriented and Connectionless IP Forwarding over ATM Networks," Internet Draft, Oct. 14, 1994, pp. 1-10.

M. Ohta et al, "Conventional IP over ATM," *Internet Draft*, Mar. 1995. <draft-ohta-ip-over-atm-00.txt>, pp. 1-10.

M. Perez et al., "ATM Signaling Support for IP over ATM," Internet Draft, Jul. 1994, pp. 1-19.

Perez et al., "ATM Signaling Support for IP over ATM," Feb. 1995, pp. 1-32.

Y. Rekhter et al, "Application of the Border Gateway Protocol in the Internet," RFC 1268, Oct. 1991, pp. 1-13.

Lixia Zhang et al., "RSVP: A New Resource ReSerVation Protocol," *IEEE Network*, vol. 7, No. 5, Sep. 1993. pp. 1-22.

David Katz et al., NBMA Next Hop Resolution Protocol (NHRP), Draft, Aug. 25, 1994, <Draft-IETF-ROLC-NHRP-02.txt>, pp. 1-29.

Jean-Yves Le Boudec et al., "A Direct ATM Connectionless Service," IBM Temporary Working Doc., Aug. 23, 1991, pp. 1-15.

Donald F. Box et al., "Architecture and Design of Connectionless Data Service for a Public ATM Network," Mar. 1993, pp. 1-28.

John Cavanaugh et al., "Internetworking with ATM WANs," Minnesota Super Computing Center Technical Report, Dec. 14, 1992, pp. 403-420.

D. Deloddere et al., "Architecture and Implementation of a Connectionless Server for B-ISDN," International Switching Symposium, Proceedings, Oct 1992, vol. 1, pp. 12-223-228.

G. Fioretto et al., "Connectionless Service Handling Within B-ISDN," Globecom 1991, Dec. pp. 0217-0222.

Takeshi Kawasaki et al., "A Study on High Speed Data Communication System Using ATM," GlobeCom Dec. 1991, pp. 2105-2109.

Katsuyuki Yamazaki et al., "Connectionless Cell Switching Schemes for Broadband ISDN," Session A9, Paper #2, Proceedings, vol. VI, May 28, 1990, pp. 5-10.

H. Esaki et al, "Datagram Delivery in an ATM-Internet," IEICE Trans. Commun. vol. E77-8, No. 3 1994, pp. 1-13.

H. Esaki et al, "Class D Service Architecture in an ATM-Internet," IEEE (G-7803-1825-0/94) 1994, pp. 1312-1318.

Amended Answer to Plaintiff Toshiba Corporation's Amended Complaint and Additional Defenses of Defendant Juniper Networks, Inc., Jul. 15, 2005.

* cited by examiner

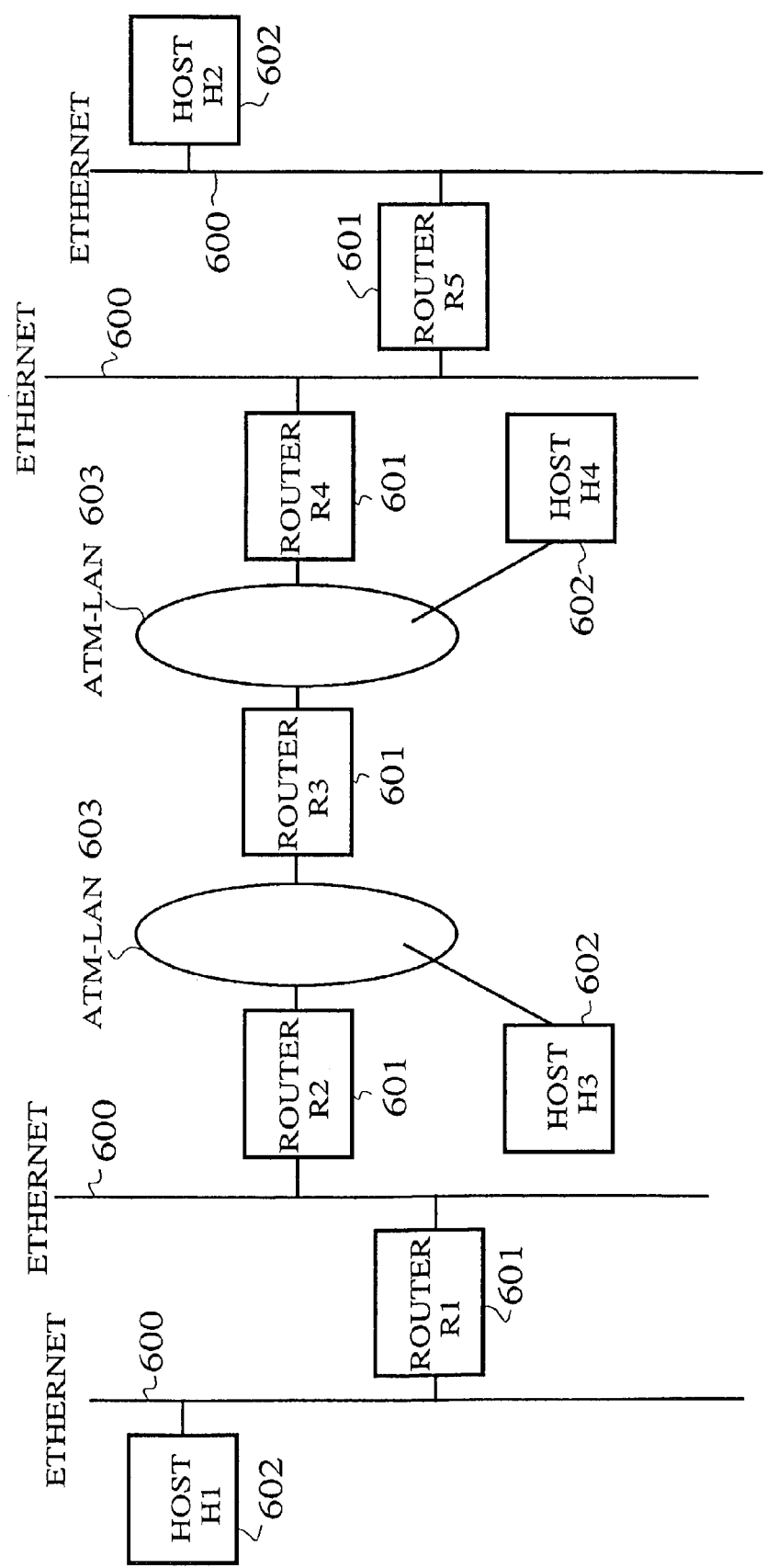

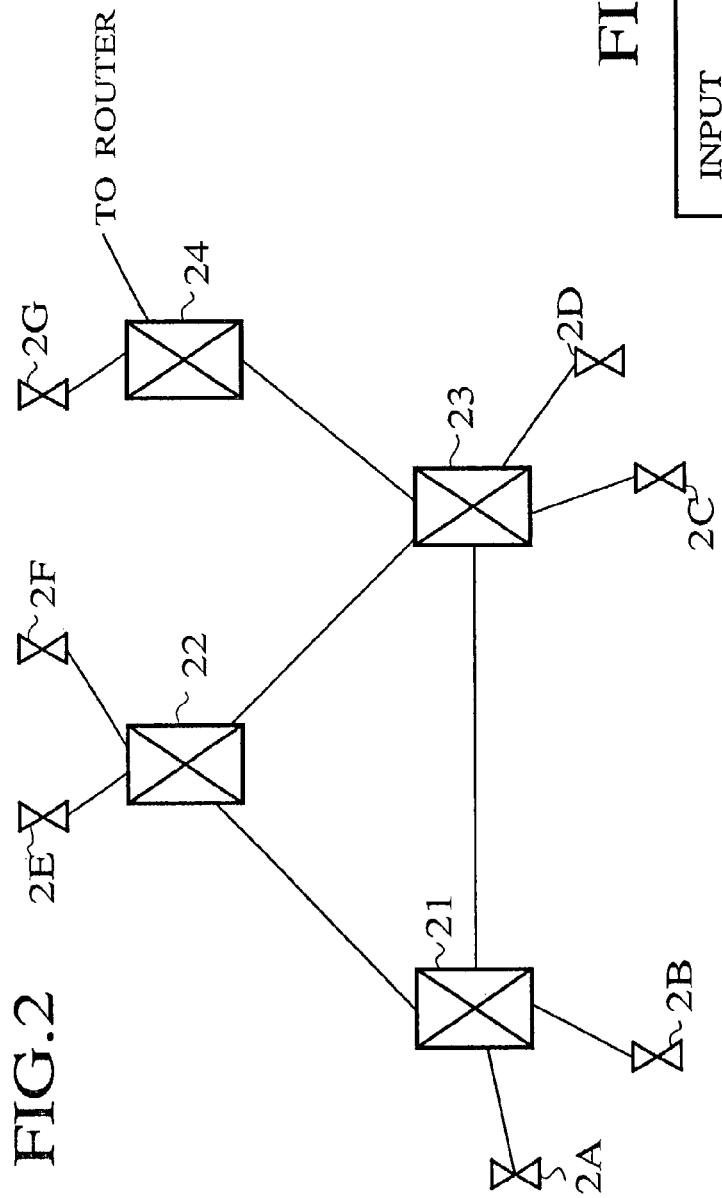

FIG.8

| DESTINATION L3 ADDRESS | NEXT HOP L3 ADDRESS | OUTPUT I/F VPI/VCI |
|---|---|---|
| #1 | DIRECT | |
| #2 | DIRECT | |
| #3 | 1 B | *B/& α /$ x |
| #5 | 1 B | *B/& α /$ x |
| #4 | 1 B | *B/& α /$ y |

FIG.10

| VC CONNECTION TARGET IP ADDRESS | I/F | VPI/VCI | STATUS |
|---|---|---|---|
| 12. 34. 78. 56 | 1 | 110/101 | IN USE |
| 12. 34. 78. 56 | 1 | 110/102 | IN USE |
| 12. 35. 2. 1 | 2 | 111/105 | UNUSED |
| 12. 35. 2. 1 | 2 | 111/106 | UNUSED |
| 12. 34. 78. 34 | 1 | 110/108 | IN USE |

FIG.11

| DESTINATION IP ADDRESS | I/F | VPI/VCI |
|---|---|---|
| 12. 12. 2. 5 | 1 | 110/101 |
| 12. 14. 5. 34 | 1 | 110/102 |
| 10. 9. 8. 23 | 1 | 110/108 |

| OPERATION | TRANSMISSION PACKET | BYPASS PIPE MANAGEMENT TABLE (OUTPUT SIDE) | BYPASS PIPE MANAGEMENT TABLE (INPUT SIDE) | ATM TRANSFER | IP-VC CORRESPONDENCE TABLE/IP ROUTING TABLE |
|---|---|---|---|---|---|
| AS1 | SET UP REQUEST | REGISTER | — | — | — |
| AS2 | SET UP REQUEST | REGISTER | REGISTER | — | — |
| AS3 | SET UP RESPONSE | — | REGISTER | — | — |
| AS4 | SET UP RESPONSE | — | — | SET UP | — |
| AS5 | — | — | — | — | REGISTER |
| AS6 | SET UP REJECTION | — | — | — | — |
| AS7 | SET UP RESPONSE | DELETE | — | — | — |
| AS8 | — | DELETE | — | — | — |
| AR1 | RELEASE REQUEST (DOWNWARD) | — | — | — | — |
| AR2 | RELEASE RESPONSE (UPWARD) | — | DELETE | — | — |
| AR3 | RELEASE REQUEST (UPWARD) | DELETE | — | — | — |
| AR4 | RELEASE RESPONSE (DOWNWARD) | DELETE | — | — | — |
| AR5 | — | — | DELETE | — | — |
| AR6 | — | — | — | — | — |
| AR7 | — | — | — | RELEASE | — |
| AR8 | — | — | — | — | DELETE |

FIG.17

FIG.18A
VC MANAGEMENT TABLE

| VPI/VCI | VCID | TARGET IP ADDRESS |
|---|---|---|
| | | |

FIG.18B
AVAILABLE VC TABLE

| TARGET IP ADDRESS | VCID |
|---|---|
| | |

FIG.18D
IP-VC CORRESPONDENCE TABLE

| IP ADDRESS | VPI/VCI |
|---|---|
| | |

FIG.18C
BYPASS PIPE MANAGEMENT TABLE

| PIPE ID | INPUT SIDE | | | OUTPUT SIDE | | | STATE |
|---|---|---|---|---|---|---|---|
| | VCID | VPI/VCI | PORT | VCID | VPI/VCI | PORT | |
| | | | | | | | |

FIG.18E
IP ROUTING TABLE

| DESTINATION IP ADDRESS | NEXT HOP IP ADDRESS | I/F | VIRTUAL NEXT HOP IP ADDRESS | PACKET COUNT |
|---|---|---|---|---|
| | | | | |

FIG. 26
(a)
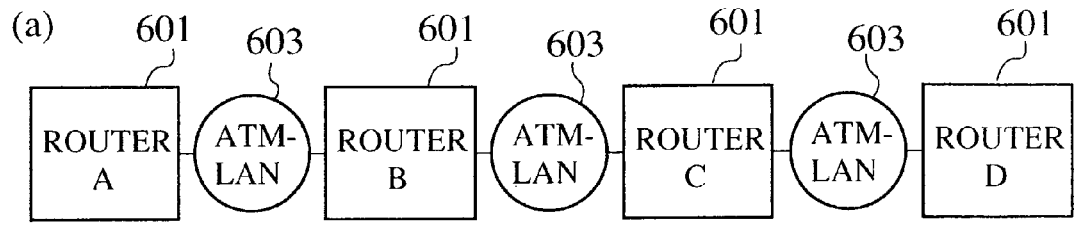
SET UP-1
(b)
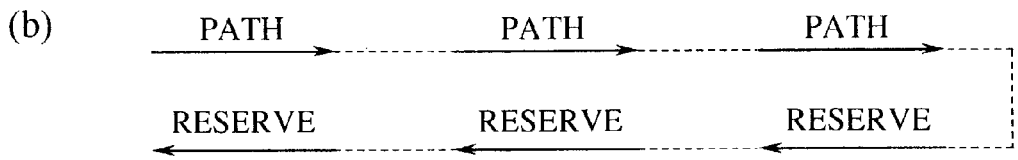
(PERIODICAL REPETITION CONTINUE)
SET UP-2
(c)
RELEASE-1
(d)
RELEASE-2
(e)
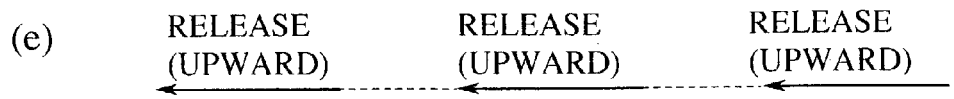

FIG. 28

| OPERATION | TRANSMISSION PACKET | BYPASS PIPE MANAGEMENT TABLE (INPUT SIDE) | BYPASS PIPE MANAGEMENT TABLE (OUTPUT SIDE) | ATM TRANSFER | IP-VC CORRESPONDENCE TABLE/IP ROUTING TABLE | TIMER |
|---|---|---|---|---|---|---|
| A1 | RESERVE (UPWARD) | REGISTER | — | — | — | T1 START |
| A2 | RESERVE (UPWARD) | REGISTER | — | — | — | T1 RESET |
| A3 | RESERVE (UPWARD) | REGISTER | REGISTER | REGISTER | — | T2 START |
| A4 | RESERVE (UPWARD) | REGISTER | REGISTER | REGISTER | — | T2 RESET |
| A5 | — | — | REGISTER | — | REGISTER | T2 START |
| A6 | — | — | REGISTER | — | REGISTER | T2 RESET |
| A7 | — | DELETE | — | — | — | T1 STOP |
| A8 | — | DELETE | DELETE | DELETE | — | T2 STOP |
| A9 | RELEASE (UPWARD) | — | — | — | — | — |
| A10 | RELEASE (DOWNWARD) | — | — | — | — | — |
| A11 | | — | DELETE | — | DELETE | T2 STOP |

FIG. 30

| OPERA-TION | TRANS-MISSION PACKET | BYPASS PIPE MANAGEMENT TABLE (INPUT SIDE) | BYPASS PIPE MANAGEMENT TABLE (OUTPUT SIDE) | ATM TRANSFER | IP-VC CORRESPONDENCE TABLE / IP ROUTING TABLE | TIMER |
|---|---|---|---|---|---|---|
| B1 | — | REGISTER | — | — | — | T2 START |
| B2 | — | REGISTER | — | — | — | T2 RESET |
| B3 | RESERVE (UPWARD) | REGISTER | REGISTER | REGISTER | — | T2 START |
| B4 | RESERVE (UPWARD) | REGISTER | REGISTER | REGISTER | — | T2 RESET |
| B5 | RESERVE (UPWARD) | — | REGISTER | — | REGISTER | T1 START |
| B6 | RESERVE (UPWARD) | — | REGISTER | — | REGISTER | T1 RESET |
| B7 | — | DELETE | — | — | — | T2 STOP |
| B8 | — | DELETE | DELETE | DELETE | — | T2 STOP |
| B9 | RELEASE (UPWARD) | — | — | — | — | — |
| B10 | RELEASE (DOWNWARD) | — | DELETE | — | — | — |
| B11 | — | — | — | — | DELETE | T1 STOP |

FIG. 45A

| INPUT SIDE | | OUTPUT SIDE | |
|---|---|---|---|
| I/F | VPI/VCI | I/F | VPI/VCI |
| 1 | 100/101 | 2 | 101/102 |
| 1 | 100/103 | 2 | 101/104 |

FIG. 45B

| INPUT SIDE | | OUTPUT SIDE | |
|---|---|---|---|
| I/F | VPI/VCI | I/F | VPI/VCI |
| 1 | 102/111 | 2 | 103/104 |
| 1 | 102/113 | 2 | 103/106 |

FIG. 45C

| INPUT SIDE | | OUTPUT SIDE | |
|---|---|---|---|
| I/F | VPI/VCI | I/F | VPI/VCI |
| 1 | 103/104 | 2 | 105/101 |
| 1 | 103/106 | 2 | 105/103 |

FIG. 45D

| INPUT SIDE | | OUTPUT SIDE | |
|---|---|---|---|
| I/F | VPI/VCI | I/F | VPI/VCI |
| 1 | 106/112 | 2 | 107/101 |
| 1 | 106/114 | 2 | 107/103 |

FIG. 45E

| INPUT SIDE | | OUTPUT SIDE | |
|---|---|---|---|
| I/F | VPI/VCI | I/F | VPI/VCI |
| 1 | 107/101 | 2 | 108/110 |
| 1 | 107/103 | 2 | 108/112 |

FIG. 46A

| VC CONNECTION TARGET IP ADDRESS | I/F | VPI/VCI | STATUS |
|---|---|---|---|
| A | 1 | 100/101 | UNUSED |
| A | 1 | 100/103 | UNUSED |

FIG. 46B

| VC CONNECTION TARGET IP ADDRESS | I/F | VPI/VCI | STATUS |
|---|---|---|---|
| B | 1 | 108/110 | UNUSED |
| B | 1 | 108/112 | UNUSED |

FIG. 46C

| VC CONNECTION TARGET IP ADDRESS | I/F | VPI/VCI | STATUS |
|---|---|---|---|
| H1 | 1 | 101/102 | UNUSED |
| H1 | 1 | 101/104 | UNUSED |
| B | 2 | 102/111 | UNUSED |
| B | 2 | 102/113 | UNUSED |

FIG. 46D

| VC CONNECTION TARGET IP ADDRESS | I/F | VPI/VCI | STATUS |
|---|---|---|---|
| A | 1 | 105/101 | UNUSED |
| A | 1 | 105/103 | UNUSED |
| H2 | 2 | 106/112 | UNUSED |
| H2 | 2 | 106/114 | UNUSED |

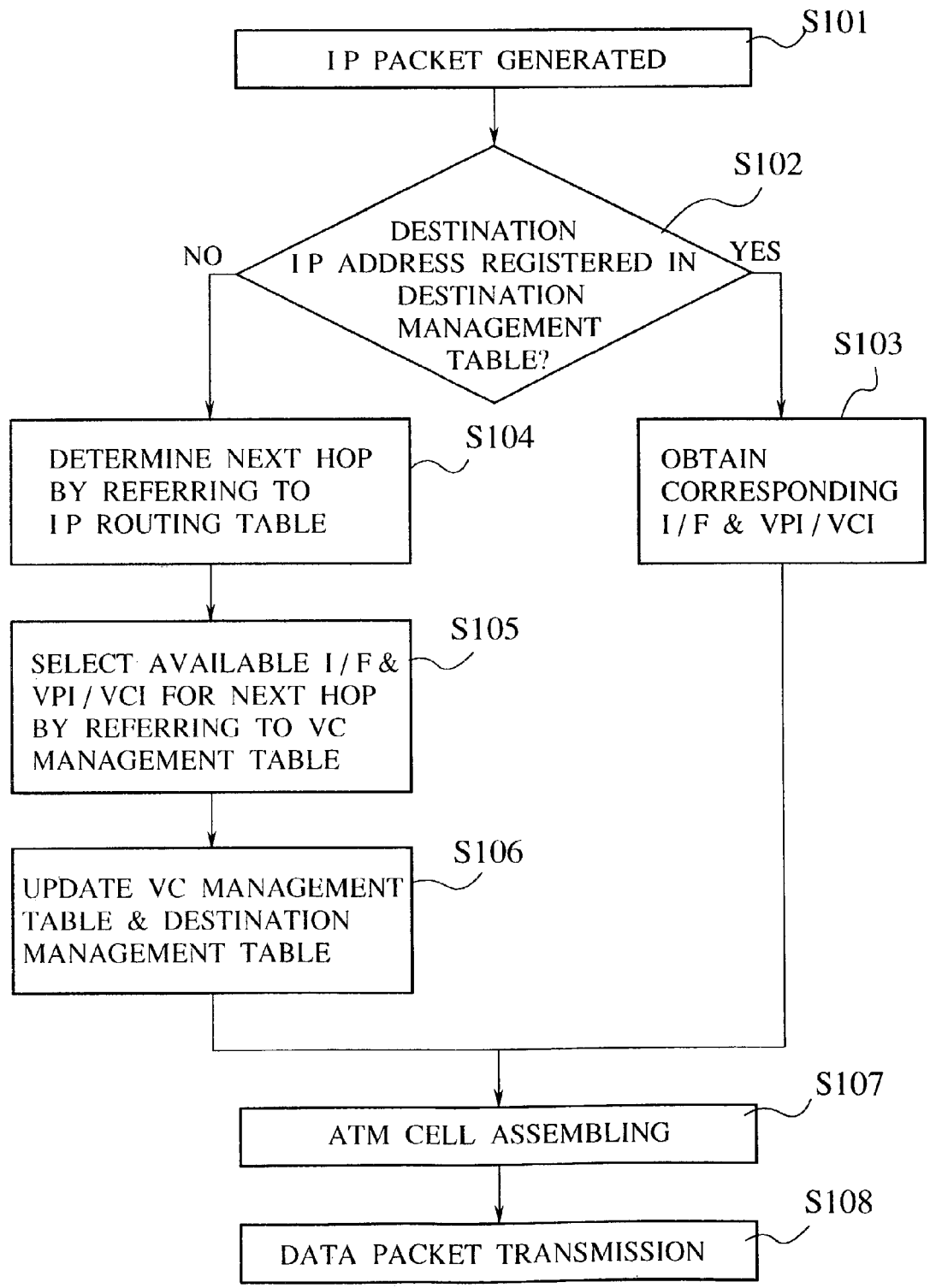

| VC CONNECTION TARGET IP ADDRESS | I/F | VPI/VCI | STATUS |
|---|---|---|---|
| 12. 34. 78. 56 | 1 | 110 / 101 | IN USE |
| 12. 34. 78. 56 | 1 | 110 / 102 | IN USE |
| 12. 35. 2. 1 | 2 | 111 / 105 | UNUSED |
| 12. 35. 2. 1 | 2 | 111 / 106 | UNUSED |
| 12. 34. 78. 56 | 1 | 110 / 108 | IN USE |

OTHER VC MANAGEMENT TABLE 6261 (6161)

| VC CONNECTION TARGET IP ADDRESS | I/F | VPI/VCI |
|---|---|---|
| 12. 34. 78. 56 | 1 | 110 / 100 |
| 12. 35. 2. 1 | 2 | 111 / 103 |

DEFAULT VC MANAGEMENT TABLE

NETWORK INTERCONNECTION APPARATUS, NETWORK NODE APPARATUS, AND PACKET TRANSFER METHOD FOR HIGH SPEED, LARGE CAPACITY INTER-NETWORK COMMUNICATION

This is a divisional of application Ser. No. 09/472,181, filed Dec. 27, 1999, now U.S. Pat. No. 6,598,080, which in turn is a continuation of Ser. No. 09/122,644, filed Jul. 27, 1998, now U.S. Pat. No. 6,343,322; which in turn is a continuation of application Ser. No. 08/924,825, now U.S. Pat. No. 5,835,710, filed Sep. 5, 1997; which in turn is a file wrapper continuation of Ser. No. 08/522,115, filed Aug. 31, 1995, now abandoned.

BACKGROUND OF THE INVENTION

1. Field of the Invention

The present invention relates to a network interconnection apparatus, a network node apparatus, and a packet transfer method suitable for an internet environment formed by connection-oriented networks.

2. Description of the Background Art

In recent years, due to increasing demands for a variety of communications such as an image communication and a high speed data communication, there is an eager expectation for a realization of the B-ISDN (Broadband-Integrated Service Digital Network) in order to provide highly efficient and flexible communication services, and the ATM (Asynchronous Transfer Mode) exchange scheme is considered as a prospective scheme for actually realizing the B-ISDN. This ATM exchange scheme is a scheme for realizing the communication service by loading data into a fixed length packet called cell regardless of the attributes of the data, and using this cell as a unit of exchange. The ATM communication technique is now studied extensively as a platform for realizing a multi-media communication and a high speed, large capacity communication, in a field of the public network (B-ISDN) as well as in a field of the LAN (Local Area Network).

Now, in the conventional LAN environment such as that of the Ethernet, the inter-LAN connection, i.e., the inter-networking among the LANs, has been realized by providing a router between each adjacent LANs. The main function of this router is the routing processing for the datagram transmission over the LANs, by processing up to the layer 3 (network layer) in the OSI (Open System Interconnection) protocol layer stack. Namely, for the datagram to be transmitted over two LANs, the datagram must be brought up to the layer 3 by the router to analyze the destination network layer address there, and then delivered to the destination LAN according to the result of this analysis. Here, it should be noted that, this "router" is often also referred as "gate-way" in the field of the computer communication, but a term "gate-way" is formally defined as an element which carries out the processing up to the layer 7 in the OSI, so that "gate-way" is actually different from the "router" strictly speaking.

There is also an element called "bridge" which has the similar function as the router in realizing the inter-LAN connection. In this bridge, in contrast to the router which determines the destination LAN by analyzing the destination network layer address, the destination LAN is determined by analyzing the datalink layer address (MAC address). Namely, the bridge realizes the inter-LAN connection by analyzing the destination MAC address of the datagram and passing the datagram through to another LAN when the obtained MAC address is not destined within its own LAN. Thus, in the bridge, only the filtering of data is carried out and the functions of the network layer are not realized.

Furthermore, there is also a similar element called "brouter" which has the function of the router as well as the function of the bridge. Namely, this brouter functions as the router for the predetermined network layer protocol and as the bridge for all the other protocols. In other words, in the brouter, those that can be handled by the router are all handled by the router function, while those that cannot be handled by the router are handled by the bridge function.

The function of the router, bridge, or brouter has been usually realized by the workstation (WS). Namely, the function of the router, bridge, or brouter has been realized as the CPU provided within the WS carries out the address analysis and transmits the datagram to the allocated physical port.

Now, one of the features of the ATM communication scheme is its high speed operation realized by the hardware switching of the ATM cells. That is, in the ATM communication scheme, the virtual connection (VC) or the virtual path (VP) is set up end-to-end, while the data to be exchanged end-to-end is loaded in the payload section of the ATM cell, and the ATM cell is exchanged and transmitted up to the destination terminal by the hardware switching operation alone without the intervention of the software operation, where the hardware switching operation is carried out by the ATM switch according to the VPI/VCI (Virtual Path Identifier/Virtual Channel Identifier) or the value of the other field such as PT in the ATM cell header which is contained in the ATM cell header.

From this point of view, the ATM communication scheme can be considered as a communication scheme which achieves its high speed operation by referring only to the ATM cell headers, setting up the virtual connections/paths end-to-end according to the ATM cell header values, and carrying out the hardware switching. In a case of applying this ATM communication scheme to the LAN, it is considered that the communications between the terminals in the LAN are realized by the communications through the ATM-VC/ATM-VP as described above, and it is possible to expect a drastic speed up and capacity increase for the communications between the terminals.

However, in a case of the ATM-LAN, when the inter-LAN communication is to be carried out, the network layer transfer is carried out at the router between the LANs, so that the inter-LAN communication has a problem in that the speed and the capacity of the communication can be considerably lowered compared with the communication within the LAN. In addition, due to the processing overhead at the network, there has also been a problem that the probability for the occurrence of the congestion becomes high as a result of the lowering of the transfer speed and the limitation of the processing speed.

On the other hand, the inter-networking scheme used in the conventional data network is the connection-less scheme, in which the data unit (network layer service data unit) transmitted to the router by using the datalink is applied with the OSI layer 3 processing at the router, and then the relaying of the data unit is carried out. As described above, the bridge for carrying out the filtering of the data unit of the datalink layer only carries out the filtering of the data unit and the functions of the network layer are not realized.

Recently, there are propositions for the inter-networking not only in the connection-less mode but also in the connection-oriented mode as well. In short, these propositions introduce the concept of the connection into the inter-networking at the datalink level or the inter-networking at the network layer level. The ATM is a prime example of the former type, while the ST-II recently proposed as the connection-oriented network layer protocol is an example of the latter type.

In the ATM, the reservation of the communication resource is made at the datalink level, while in the ST-II, the reservation of the communication resource is made at the network layer level. In either case, the set up of the connection is carried out before the communication, so that they are basically the connection-oriented schemes. Here, for the connection-less communication, the processing of the network layer is carried out at the server (CLS, router, etc.) of the connection-less communication, whereas for the connection-oriented communication, the header information rewriting table necessary for the reservation of the communication resource and the relaying is set up before the start of the communication, and then the actual data transfer is handled by the relaying at the datalink level.

However, the currently available usual applications realize the connection-oriented communication on the connection-less service, such that the data unit is transferred by using the connection-less communication mode even for the connection-oriented communication. In the connection-less mode, a plurality of processings of the network layer are carried out, and it is common to reconstruct the data unit of the network layer in this case. Consequently, even in the application which is designed to realize a high speed communication by carrying out the relaying at the datalink level, there has been a problem that the probability for the occurrence of the congestion becomes high as a result of the lowering of the transfer speed and the limitation of the processing speed due to the processing overhead at the network.

SUMMARY OF THE INVENTION

It is therefore an object of the present invention to provide a network interconnection apparatus, a network node apparatus, and a packet transfer method, capable of realizing a high speed, large capacity inter-network communication under an internet environment in which a plurality of networks are inter-networked.

According to one aspect of the present invention there is provided a network interconnection apparatus for connecting at least two virtual connection-oriented logical networks, comprising: physical interface means for interfacing the logical networks; first transfer means for applying a network layer level processing to a packet received from one logical network and transmitting the packet to another logical network; memory means for storing a correspondence relationship between a virtual connection used in receiving a packet from said one logical network and a virtual connection used in transmitting the packet to said another logical network; second transfer means for carrying out a packet transfer without the network layer level processing, according to the correspondence relationship stored in the memory means; and registration means for receiving a control message containing information for a registration of the correspondence relationship from at least one of the logical networks, and registering the correspondence relationship into the memory means according to the control message.

This aspect of the present invention defines a first configuration of a router (network interconnection apparatus) according to the present invention. In transferring a data packet from a transmission terminal belonging to one logical network to a destination terminal belonging to another logical network, this data packet passes through a router connecting these logical networks. A conventional router has a rather slow transfer speed as it transmits a packet received from one logical network to another logical network by applying a network layer level processing. In contrast, a router of the present invention has memory means for storing a correspondence relationship between a virtual connection used in receiving a packet from one logical network and a virtual connection used in transmitting a packet to another logical network, and a necessary correspondence relationship is registered into this memory means according to an explicit control message received from one logical network. Then, a transfer at a datalink layer is carried out according to the registered correspondence relationship, to effectively form a bypass pipe capable of transferring a packet by a datalink layer level processing alone over a plurality of networks from the transmission terminal to the destination terminal, so that a high speed packet transfer between networks can be realized.

In the router of the present invention, when a packet is received from one logical network, if the correspondence relationship for a virtual connection used in receiving this packet is in the memory means, the packet is transferred to another logical network by the second transfer means for carrying out a transfer processing at a datalink layer level alone, whereas otherwise the packet is transferred to another logical network by the first transfer means for carrying out a transfer processing at a network layer level.

Alternatively, it is also possible to provide additional information regarding whether a transfer by the first transfer means is to be carried out for a virtual connection used in receiving the packet from one logical network, such that the transfer by the first transfer means is carried out if this additional information indicates that the transfer by the first transfer means is to be carried out for a virtual connection used in receiving this packet, whereas otherwise the transfer by the second transfer means is carried out according to the correspondence relationship stored in the memory means.

According to another aspect of the present invention there is provided a network node apparatus directly connected with one virtual connection-oriented logical network, for transmitting packets to a node connected with another virtual connection-oriented logical network, comprising: physical interface means for interfacing the logical networks; memory means for storing a correspondence between a destination node information for each packet to be transmitted and a virtual connection to be used in transmitting each packet; first transmission means for transmitting the packet according to the correspondence stored in the memory means; and second transmission means for transmitting a control message to a network interconnection apparatus connecting said one logical network and said another logical network, the control message containing information for a registration of a correspondence relationship between a first virtual connection used in receiving a packet from said one logical network and a second virtual connection used in transmitting the packet to said another logical network.

This aspect of the present invention defines a configuration of a network node (encompassing a terminal as well as an intermediate stage router) according to the present invention. The network node which transmits a packet to the router has memory means for storing a correspondence relationship between a destination node information of the packet and a virtual connection to be used in transmitting the packet, and updates this memory means after the control message is transmitted, so that an initial setting to transfer the packet to the destination node by the transfer processing at a network layer level in the router can be switched to a setting to transfer the packet to the destination node by the transfer processing at a datalink layer level alone, i.e., a bypass pipe, in the router.

Here, the control message can contain an information for specifying source and destination nodes of each packet to be transmitted, which is an example of a globally unique bypass pipe ID.

Also, the update of the memory means at the network node can be carried out at a time of transmitting the control message, or at a time of receiving a response message from the router notifying a set up of the bypass pipe.

Also, in a case of using an identical virtual connection for a transmission of the control message and a transmission of a packet such that the router registers the correspondence relationship by regarding this virtual connection used in receiving the control message as a virtual connection used in receiving the packet, the switching from the first transfer means to the second transfer means is going to be made at the router even when the update of the memory means at the transmission terminal side is not carried out.

According to another aspect of the present invention there is provided a method of packet transfer for transferring a packet transmitted from a first node belonging to one logical network to a second node belonging to another logical network, comprising the steps of: determining a correspondence relationship between a virtual connection available for transmitting the packet from the first node and a virtual connection available for transmitting the packet to the second node, according to a control message containing an identification information for a desired virtual connection available for transmitting the packet without a network layer level processing over different logical networks, the control message being transmitted from at least one of the first and second nodes; storing the correspondence relationship determined at the determining step in a memory; and transferring a newly received packet without carrying out a network layer level analysis according to the correspondence relationship when the correspondence relationship for a virtual connection used in receiving the newly received packet is stored in the memory.

This aspect of the present invention defines a method for forming a bypass pipe by using a control message according to the present invention. This method encompasses the following three cases.

The first case (out-band, packet) is that in which the control message (which is a type of packet) contains an identification information (VCID, or VCI when a VP directly connecting neighboring routers is provided) for a first virtual connection available for transmitting the packet from one of the first node and the second node to the router, in addition to the identification information (bypass pipe ID) for the desired virtual connection, and this control message is transmitted from said one of the first node and the second node to the router through a second virtual connection different from the first virtual connection. Then, the control message is analyzed at a network layer level, to form a bypass pipe connecting the first virtual connection and a virtual connection connected to a logical network to which another one of the first node and the second node belongs, at the router.

Here, the bypass pipe ID is an identification information unique in an entire network system containing a plurality of logical network, and can be given by an information specifying a transmission terminal and a destination terminal for example. On the other hand, the VCID, or VCI when a VP directly connecting neighboring routers is provided, is an identification information unique within a logical network to which the transmission terminal belongs.

The second case (out-band, ATM signaling) is that in which the control message (ATM signaling) contains an identification information (VCID, or VCI when a VP directly connecting neighboring routers is provided) for a first virtual connection available for transmitting the packet from one of the first node and the second node to the router, which is a usual part of the ATM signaling message, in addition to the identification information (bypass pipe ID) for the desired virtual connection, and this control message is transmitted from said one of the first node and the second node to the router through a virtual connection for an ATM signaling which is different from the first virtual connection. Then, an ATM signaling processing is applied to the control message, to form a bypass pipe connecting the first virtual connection and a virtual connection connected to a logical network to which another one of the first node and the second node belongs, at the router.

The third case (in-band) is that in which the control message (which is a type of packet) contains the identification information (bypass pipe ID) for the desired virtual connection, and this control message is transmitted from one of the first node and the second node to the router through one virtual connection. Then, a bypass pipe connecting said one virtual connection and a virtual connection connected to a logical network to which another one of the first node and the second node belongs is formed at the router.

According to another aspect of the present invention there is provided a network interconnection apparatus for connecting at least two virtual connection-oriented logical networks, comprising: physical interface means for interfacing the logical networks; first transfer means for applying a network layer level processing to a packet received from one logical network and transmitting the packet to another logical network; memory means for storing a correspondence relationship between a virtual connection used in receiving the packet from said one logical network and a virtual connection used in transmitting the packet to said another logical network; second transfer means for carrying out a packet transfer without the network layer level processing, according to the correspondence relationship stored in the memory means; and means for detecting a virtual connection used in receiving the packet and a virtual connection used in transmitting the packet at a time of a packet transfer by the first transfer means, and registering the correspondence relationship into the memory means according to the detected virtual connections.

This aspect of the present invention defines a second configuration of a router (network interconnection apparatus) according to the present invention. Here, just as in the first configuration described above, this router forms a bypass pipe capable of transferring a packet by a datalink layer level processing alone over a plurality of networks from the transmission terminal to the destination terminal, so that a high speed packet transfer between networks can be realized. The first configuration uses the control message so that it is possible to form a bypass pipe in a manner fully accounting for each request from a user or an application, while this second configuration registers the necessary correspondence relationship into the memory means according to an information on a virtual connection obtained at a time of transferring a packet by applying a network layer level processing, and a transfer processing is switched from a transfer by a network layer level processing to a transfer by a datalink layer level processing alone once the correspondence relationship is registered in the memory means, so that a bypass pipe for a high speed transfer can be set up without using a special message.

According to another aspect of the present invention there is provided a method of packet transfer for transferring a packet transmitted from a first node belonging to one logical network to a second node belonging to another logical network, comprising the steps of: receiving a packet containing a destination node information transmitted through a first virtual connection available for transmitting the packet from the first node; analyzing the destination node information contained in the packet at a network layer level, and determining a second virtual connection available for transmitting the packet to the second node; transmitting the packet through the second virtual connection, while storing a correspondence relationship between the first virtual connection used in receiving the packet and the second virtual connection used in transmitting the packet in a memory; and transferring a newly received packet without carrying out a network layer level analysis according to the correspondence relationship when the correspondence relationship for a virtual connection used in receiving the newly received packet is stored in the memory.

This aspect of the present invention defines a method for forming a bypass pipe without using a control message according to the present invention.

Thus, in a case of forming a bypass pipe by using a control message, there is provided a network system, comprising: a plurality of virtual connection-oriented logical networks; a plurality of network nodes connected to the logical networks, the nodes include terminal nodes and network interconnection apparatuses interconnecting the logical networks, each network interconnection apparatus has a memory means for storing a correspondence relationship between a virtual connection available for transmitting a packet from one network node and a virtual connection available for transmitting the packet to another network node, and each network interconnection apparatus transfers a newly received packet without carrying out a network layer level analysis when a correspondence relationship for a virtual connection used in receiving the newly received packet is stored in the memory means, whereas each network interconnection apparatus transfers the newly received packet by carrying out the network layer level analysis when the correspondence relationship for a virtual connection used in receiving the newly received packet is not stored in the memory means; wherein each network node belonging to one logical network and wishing to transfer the packet to another network node belonging to another logical network transmits a control message containing an identification information for a desired virtual connection available for transmitting the packet without a network layer level processing over different logical networks, according to which each network interconnection apparatus connected between said one logical network and said another logical network updates the connection relationship stored in the memory means.

On the other hand, in a case of forming a bypass pipe without using a control message, there is provided a network system, comprising: a plurality of virtual connection-oriented logical networks; a plurality of network nodes connected to the logical networks, the network nodes include terminal nodes and network interconnection apparatuses interconnecting the logical networks, each network interconnection apparatus has a memory means for storing a correspondence relationship between a first virtual connection available for transmitting a packet from one network node and a second virtual connection available for transmitting the packet to another network node, and each network interconnection apparatus transfers a newly received packet without carrying out a network layer level analysis when a correspondence relationship for a virtual connection used in receiving the newly received packet is stored in the memory means, whereas each network interconnection apparatus transfers the newly received packet by carrying out the network layer level analysis when the correspondence relationship for a virtual connection used in receiving the newly received packet is not stored in the memory means; wherein when each network interconnection apparatus receives the newly received packet transmitted through the first virtual connection, each network interconnection apparatus analyzes a destination node information contained in the newly received packet at a network layer level and determine the second virtual connection to update the connection relationship stored in the memory means.

It is to be noted that the virtual connection-oriented network here refers to a network capable of setting a plurality of virtual connections between a terminal apparatus and a network interconnection apparatus (router) or between network interconnection apparatuses (routers), and changing a purpose of using each of these virtual connections, connection by connection. ATM, frame relay, and X. 25 are examples of the virtual connection-oriented network.

Also, a logical network here refers to a network that can be handled logically as a single entity, regardless of a physical configuration. For example, a logical network is defined by a range sharing an identical network ID in a certain physical network configuration.

On the other hand, a packet here refers to a packet of a network layer as well as a packet of a datalink layer such as an ATM cell, an Ethernet frame, an AAL PDU (ATM Adaptation Layer Protocol Data Unit), etc.

Other features and advantages of the present invention will become apparent from the following description taken in conjunction with the accompanying drawings.

BRIEF DESCRIPTION OF THE DRAWINGS

FIG. 1 is a schematic block diagram showing an overall configuration of one embodiment of an ATM network according to the present invention.

FIG. 2 is a schematic block diagram showing an internal configuration of each ATM-LAN in the ATM network of FIG. 1.

FIG. 3 is a diagrammatic illustration of a routing table provided in each ATM switch node in the ATM-LAN of FIG. 2.

FIG. 8 is a diagrammatic illustration of an L3 routing table that can be provided in the router of FIG. 4.

FIG. 10 is a diagrammatic illustration of a VC management table content used in the transmission terminal of FIG. 9.

FIG. 11 is a diagrammatic illustration of a destination management table content used in the transmission terminal of FIG. 9.

FIG. 17 is a table summarizing operations of the router in the control message sequences of FIGS. 14 to 16 and FIGS. 19 to 21.

FIGS. 18A, 18B, 18C, 18D, and 18E are diagrammatic illustrations of a VC management table, an available VC table, a bypass pipe management table, an IP-VC correspondence table, and an IP routing table, respectively, which are used by the operations of the router summarized in FIG. 17.

FIG. 26 is a diagram showing possible outlines of a procedure for set up/release of a bypass pipe using a soft state scheme in the ATM network of FIG. 1.

FIG. 28 is a table summarizing operations of the router in the procedure for set up/release of a bypass pipe using a receiver initiative soft state scheme.

FIG. 30 is a table summarizing operations of the router in the procedure for set up/release of a bypass pipe using a sender initiative soft state scheme.

FIGS. 45A, 45B, 45C, 45D, and 45E are diagrammatic illustrations of router control tables provided in switches in the exemplary configuration of FIG. 42.

FIGS. 46A, 46B, 46C, and 46D are diagrammatic illustrations of VC management tables provided in a host H1, a host H2, a router A, and router B, respectively in the exemplary configuration of FIG. 42.

FIG. 47 is a flow chart showing a procedure for data packet transmission by a transmission terminal in the exemplary configuration of FIG. 42.

FIG. 49 is a diagrammatic illustration of a VC management table content for still another bypass pipe set up/release procedure using no control message.

DETAILED DESCRIPTION OF THE PREFERRED EMBODIMENTS

Figure 4:
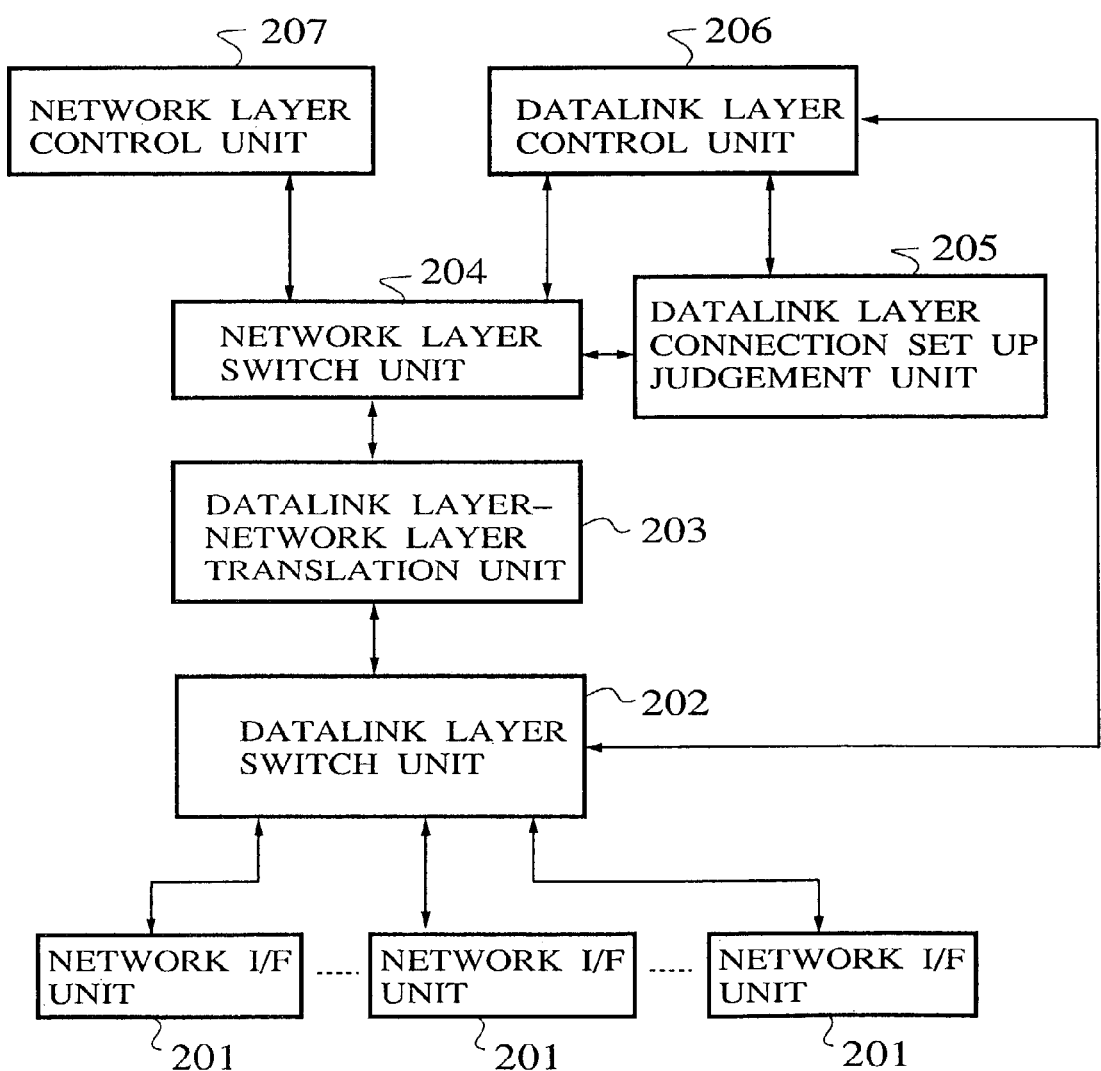
FIG. 4 is a block diagram showing a configuration of each router in the ATM network of FIG. 1.

Now, the preferred embodiment in a form of an ATM network incorporating the network interconnection apparatus, the network node apparatus, and the packet transfer method according to the present invention will be described in detail.

Configuration of ATM-LAN

The ATM network of this embodiment has an overall configuration of an ATM internet as shown in FIG. 1, which comprises ATM-LANs 603 and Ethernets 600 interconnected by routers 601, and Hosts 602 connected to the ATM-LANs 603 or the Ethernets 600.

Here, the ATM-LAN 603 is a local area network operated by the ATM scheme, and this ATM-LAN 603 may very well be operated according to the protocol defined by the standardizing organization such as the ATM forum for example. The router 601 is a device for mutually connecting a plurality of LANs (ATM-LANs in this embodiment). The Host 602 is a device for carrying out transmission and reception of packets.

In this ATM internet configuration of FIG. 1, the ATM-LAN 603 functions as a sub-net of the IP (Internet Protocol) so that each ATM-LAN 603 has a sub-net address (sub-net ID). In the following, only an exemplary case of using IP/IP address as network layer protocol/network layer address constituting the ATM internet will be described, but the similar description is also possible for the other protocols such as netware/IPX, AppleTalk, etc. Also, in the following description, a term "sub-net" is intended to imply "logical network in the network layer".

It should be apparent from the foregoing description that this embodiment concerns with a case in which the physical LAN (ATM-LAN) and the logical sub-net (IP sub-net) coincide with each other, that is, a case in which each ATM-LAN corresponds to one sub-net. Here, however, the similar description is also possible for a case in which a plurality of sub-nets are logically constructed within one ATM-LAN, assuming that the router provides support (of the network management, the datagram transmission, etc.) for these plurality of sub-nets as well.

Next, an exemplary internal configuration of the ATM-LAN 603 is shown in FIG. 2, which comprises mutually connected ATM switch nodes 21 to 24 and terminal devices 2A to 2G connected to the ATM switch nodes 21 to 24.

Each of the ATM switch nodes 21 to 24 is a switching hub which contains a built-in ATM switch (or device having an equivalent function as an ATM switch) therein, and which has a plurality of ports through which it is connected with the terminal devices or the other ATM switch nodes. In this embodiment, it is assumed that the connection interface among them is in the ATM scheme. Each of these nodes has a routing table in a form shown in FIG. 3 in which an interface and a corresponding VPI/VCI are specified for the input side and the output side such that the data transfer can be carried out according to this table.

Each of the terminal devices 2A to 2G is a device such as a personal computer (PC), a workstation (WS), a printer, a server, etc., which has an ATM interface (or a terminal adaptor having an ATM interface) for direct connection with the ATM-LAN.

Each ATM-LAN 603 in FIG. 1 has this type of an internal configuration formed by the ATM switch nodes and the terminal devices, but the factors such as a topology among the internal ATM switch nodes, a connection interface speed, a number of nodes, a number of terminals, etc. are arbitrary in each ATM-LAN.

This ATM-LAN 603, which is an LAN in accordance with the ATM forum for example, has the following features.

(1) Each terminal device or ATM switch node has a its own link layer address (ATM address in this embodiment). Here the link layer addresses do not overlap with each other within one ATM-LAN.

(2) Each terminal device or ATM switch node has its own IP address as the network layer address, where the network layer address is a globally unique address in general.

(3) Each terminal device or ATM switch node has a broadcast channel with respect to the ATM-LAN to which it belongs, such that each terminal device or ATM switch node can transmit a message (cell) simultaneously to all the other terminals/nodes belonging to that ATM-LAN through the broadcast channel.

Each ATM-LAN also has a VPI/VCI value determination function (not shown) provided therein which has a right to determine the VPI/VCI values to be used within each ATM-LAN, which is an independent right in each ATM-LAN. Whenever there is a data to be transmitted, the terminal device or node in the ATM-LAN loads that data into an ATM cell, attaches a prescribed ATM cell header, and transmits that ATM cell in that ATM-LAN, regardless of whether the transmission destination is within that ATM-LAN.

Now, some terms to be used in this embodiment will be defined.

A network layer level indicates a basic unit of transfer through the network, which is a layer for handling the routing control, etc. An address to be used in the transfer or the routing control at the network layer will be referred as a network layer address.

A host is a device other than the router which transmits and receives packets of the network layer level, such as a terminal device for instance.

A node is a generic name indicating the router and the host.

Neighboring routers are routers that can directly transmit the packets of the network layer level with one another, without being intermediated by the other routers.

A VCID (VC IDentifier) is an identifier for identifying a virtual connection (VC), which is identical between the host and the router, as well as between the neighboring routers. In a case of the ATM, a correspondence relationship between the VCID and VPI/VCI is stored at each host and router. The VCID is unique within a range in which the VC is set up (which is within the ATM network in this embodiment).

A dedicated VC is a VC to be set up between the host and the router or between the neighboring routers, which is used at a time of forming a bypass pipe.

A default VC is a VC to be set up between the host and the router or between the neighboring routers, which is used at a time of transferring the packet hop by hop.

A bypass pipe is a connection formed by connecting a plurality of dedicated VCs, which provides a mechanism for sending the data packet from a transmitting terminal to a receiving terminal by using only a lower level packet transfer unit, without passing through a packet transfer unit of the network layer level, at a network interconnection apparatus through which the data packet passes in its course.

Configuration of Router

In this embodiment, each router has a configuration as shown in FIG. 4, which comprises: a plurality of network interface units (network I/F units) 201; a datalink layer switch unit 202 connected with the network I/F units 201; a datalink layer-network layer translation unit 203 connected with the datalink layer switch unit 202; a network layer switch unit 204 connected with the datalink layer-network layer translation unit 203; a data link layer connection set up judgement unit 205 connected with the network layer switch unit 205; a datalink layer control unit 206 connected with the datalink layer switch unit 202, the network layer switch unit 204, and the datalink layer connection set up judgement unit 205; and a network layer control unit 207 connected with the network layer switch unit 204.

This router of FIG. 4 is connected with a desired LAN such as the ATM-LAN, Ethernet, FDDI, etc., through each network I/F unit 201, and at least one of the plurality of network I/F units 201 is accommodating a virtual connection-oriented LAN such as the ATM-LAN. Here, the LANs such as the ATM-LAN, Ethernet, etc. are treated as the datalink layer.

In the following, the datalink layer is also referred as L2, while the network layer is also referred as L3.

The datalink layer switch unit 202 is a unit for determining an output network I/F unit 201 for a datalink layer frame according to a header address of a datalink layer frame whenever a datalink layer frame arrives from the LAN connected with the network I/F unit 201 or from the datalink layer-network layer translation unit 203. In order to determine the output network I/F unit 201, this datalink layer switch unit 201 is provided with a datalink layer routing table (L2 routing table) therein, where this datalink layer routing table is managed by the datalink layer control unit 206. By providing this datalink layer switch unit 202, it becomes possible to carry out a faster packet/cell switching compared with a case of using only a network layer switching.

The datalink layer-network layer translation unit 203 carries out a translation from an L2 frame to an L3 packet, and from an L3 packet to an L2 frame. This corresponds to an AAL in the ATM for instance. Thus, in a case an ATM cell is entered from the datalink layer switch unit 202, the entered ATM cell is assembled into an L3 packet. Also, in a case an L3 packet is entered from the network layer switch unit 204, the entered L3 packet is disassembled into an ATM cell.

The network layer switch unit 204 has an L3 routing table and a function similar to those of a conventional router, in which a destination address of an L3 packet is checked and compared with the L3 routing table to determine an output network I/F.

The datalink layer connection set up judgement unit 205 judges the switching from a network layer transfer in which an output target is determined by the network layer switch unit 204 to a datalink layer transfer in which an output target is determined by the datalink layer switch unit 202, when packets over a prescribed number have been entered, outputted, or passed according to an input/output statistics data for L3 packets, or when there is a notice from an upper protocol. By means of this function, it is possible to realize a high speed packet transfer. Here, the datalink connection can be newly set up by the datalink layer control unit 206 at a time of switching from the network layer transfer to the datalink layer transfer, or the datalink connections may be set up in advance and an unused datalink connection is used at a time of switching from the network layer transfer to the datalink layer transfer. A method for judging the switching in this datalink layer connection set up judgement unit 205 will be described in detail later.

The datalink layer control unit 206 carries out a set up/release of a connection, and a relaying of packets for the sake of connection set up/release, in a case the datalink layer is a connection oriented one such as the ATM. Here, a connection information for connections set up or released by this datalink layer control unit 206 is registered or deleted in the L2 routing table provided in the datalink layer switch unit 202.

The network layer control unit 207 has a function for managing the L3 routing table provided in the network layer switch unit 204. In a case the L3 routing table is static, the L3 routing table is set up only once at the beginning. In a case of a dynamic routing, the routing information is exchanged with neighboring routers in order to manage the L3 routing table. The routing information exchange among the neighboring routers can be realized by using the existing routing protocol such as RIP (Routing Information Protocol), OSPF (Open Shortest Path First), etc.

Next, the router having physical interfaces with respect to two ATM-LANs will be described as an exemplary case of the router of this embodiment. This type of router will be referred as a "2 port router".

Figure 5:
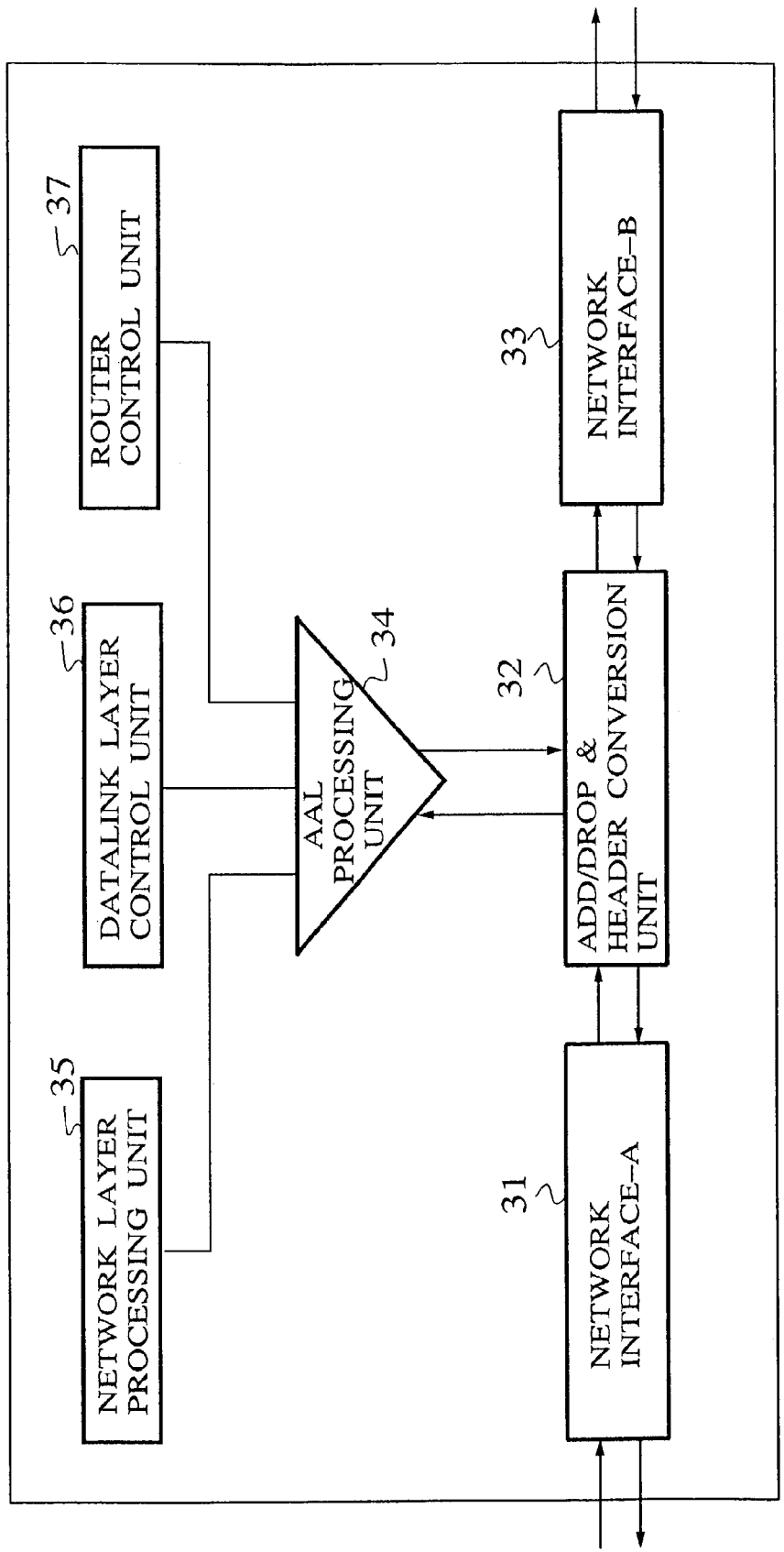
FIG. 5 is a block diagram showing a configuration of a 2 port router that can be used as each router in the ATM network of FIG. 1.

The 2 port router has a configuration as shown in FIG. 5, which logically comprises: network I/Fs (network interface-A and network interface-B) 31 and 33; an add/drop and header conversion unit 32 provided between the network I/Fs 31 and 33; an AAL processing unit 34 connected with the add/drop and header conversion unit 32; and a network layer processing unit 35, a datalink layer control unit 36, and a router control unit 37, all of which are connected with the AAL processing unit 34.

The network I/Fs 31 and 33 are provided in correspondence to the physical ports of the router, to function as the physical interfaces with respect to the ATM-LANs. Each network I/F has functions for carrying out a conversion processing between a signal on a physical transmission medium and an ATM cell, such as E/O conversion, O/E conversion, SDH (Synchronous Digital Hierarchy) processing, cell synchronization processing, scrambling/descrabling processing, etc. for example, as well as an exchange of ATM cells with respect to the add/drop and header conversion unit 32.

The add/drop and header conversion unit 32 corresponds to the datalink layer switch unit 202 of FIG. 4, and has a function for dropping (extracting) cells having prescribed ATM cell header values (such as VPI/VCI/PT values) among the cells transmitted from the network I/Fs 31 and 33 and sending out the dropped cells to the AAL processing unit 34, a function for converting cell headers of cells having prescribed ATM cell header values according to a header conversion table provided therein and sending out these cells to a network I/F on an opposite side (without sending them to the AAL processing unit 34), and a function for adding (inserting) and sending out the ATM cells handed from the AAL processing unit 34 into a specified direction. In this add/drop and header conversion unit 32, in a case cells having ATM cell header values which are not registered in the header conversion table are entered, these cells may be discarded in this module and empty cells may be inserted and outputted to an output side instead.

The AAL processing unit 34 corresponds to the datalink layer-network layer translation unit 203 of FIG. 4, and has a function for cell disassembling the ATM cells handed from the add/drop and header conversion unit 32, assembling the upper layer packets (such as IP packets), and handing the packets to a processing unit of a destination upper layer (such as a router processing unit or a router control unit in this embodiment), and a function for cell assembling the packets handed from a processing unit of an upper layer (such as a router processing unit) and sending out to the add/drop and header conversion unit 32.

The network layer processing unit 35 corresponds to the network layer switch unit 204 and the network layer control unit 207 of FIG. 4, and has a function of the router for carrying out the network layer processing (that is, a function for receiving datagram (such as IP datagram) from the AAL processing unit 34 and carrying out the routing processing for this datagram, while carrying out data exchange or data processing for the routing protocol (such as RIP or OSPF) with respect to the other routers), and a function for carrying out data exchange and data processing for "ATM internet bypass pipe set up protocol" to be described later, as well as processing necessitated by the processing result of this protocol by acting on the datalink layer control unit 36 and the add/drop and header conversion unit 32.

The datalink layer control unit 36 has a function for carrying out a connection processing for the datalink layer (ATM-LANs in this embodiment) connected through the network I/Fs 31 and 33, as well as a signaling processing and call processing.

The router control unit 37 has a function for carrying out a control of the router as a whole, and carries out an initialization of the router as well.

Now, the router of this embodiment can be constructed by using a dedicated device, or by using a general purpose computer such as a personal computer or a workstation. Here, a case of constructing the 2 port router described above by using a general purpose computer (a workstation in this embodiment) will be described.

Figure 6:
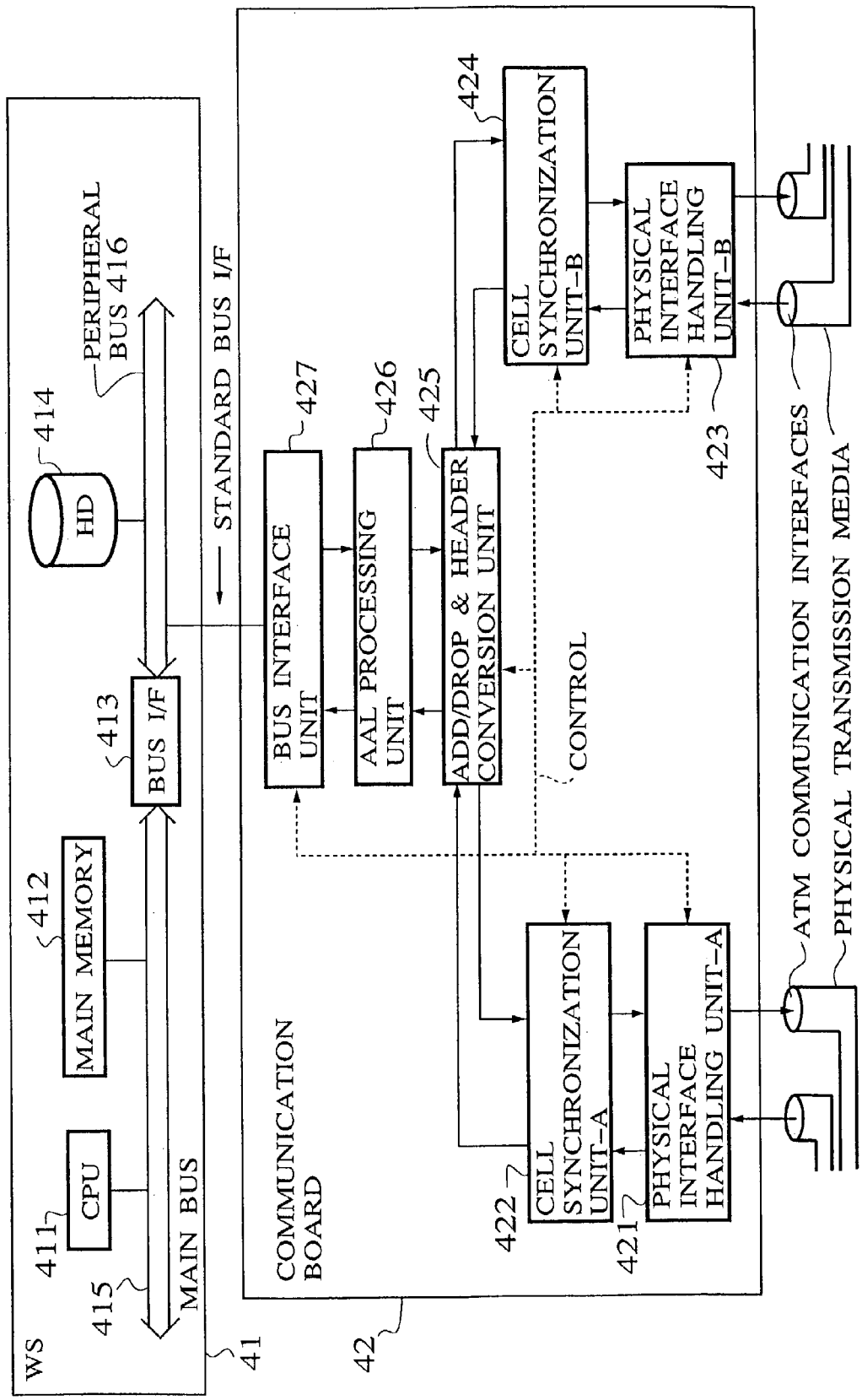
FIG. 6 is a block diagram showing a physical internal configuration of a general purpose computer implementing the 2 port router of FIG. 5.

In this case, the 2 port router has a physical internal configuration as shown in FIG. 6, which generally comprises a workstation (WS) 41 and a communication board 42 connected to the WS 41 as an extension board. Here, the WS 41 has no communication interface in a form of the ATM interface, and the ATM interface function is provided by the communication board 42.

The communication board (ATM communication board) 42 comprises: a physical interface handling unit-A 421 connected with one physical transmission medium through one ATM communication interface; a cell synchronization unit-A 422 connected with the physical interface handling unit-A 421; a physical interface handling unit-B 423 connected with another physical transmission medium through another ATM communication interface; a cell synchronization unit-B 424 connected with the physical interface handling unit-B 423; an add/drop and header conversion unit 425 connected with the cell synchronization unit 422 and the cell synchronization unit 424; an AAL processing unit 426 connected with the add/drop and header conversion unit 425; and a bus interface unit 427 connected with the AAL processing unit 426 and a standard bus I/F for interfacing the WS 41 and the communication board 42.

The WS 41 comprises: a CPU 411, a main memory 412, a hard disk (HD) 414, and a bus interface (bus I/F) 413 connected with the CPU 411 and the main memory 412 through a main bus 415 as well as with the HD 414 and the standard bus I/F through a peripheral bus 416. Here, the other usual elements of the WS 41 such as CRT, frame memory, other network interfaces, etc. are omitted in FIG. 6.

Each element of the communication board 42 has the following functions.

Each of the physical interface handling units 421 and 423 has a function for carrying out a conversion between the physical transmission medium (such as optical fiber, coaxial cable, shield-less twist pair cable, etc.) and a physical processing scheme within the communication board 42 (electric interface in this embodiment). In addition, each physical interface handling unit also has a function for adapting the transmission scheme to the SDH scheme when the physical transmission medium uses such an ATM cell transmission scheme, a function for notifying an abnormality of the physical interface handling unit to the external, and registers for initial settings, etc.

Each of the cell synchronization units 422 and 424 has a function for taking a synchronization in ATM cell unit by referring to and processing an HEC (Header Error Control) field of an ATM cell in the bit stream entered from the physical interface handling unit 421 or 423, and a function for calculating and inserting the HEC field into an ATM cell transmitted from the add/drop and header conversion unit 425.

In the following, an interface formed by the physical interface handling unit-A 421 and the cell synchronization unit-A 422 will be referred as an A-side interface, while an interface formed by the physical interface handling unit-B 422 and the cell synchronization unit-B 424 will be referred as a B-side interface. These A-side interface and B-side interface correspond to the network interface-A 31 and the network interface-B 33 of FIG. 5, respectively.

The add/drop and header conversion unit 425 has a function for dropping (extracting) cells having prescribed ATM cell header values (such as VPI/VCI/PT values) among the cells transmitted from the cell synchronization units 422 and 424 and sending out the dropped cells to the AAL processing unit 426, a function for converting cell headers of cells having prescribed ATM cell header values according to a header conversion table provided therein and sending out these cells to the cell synchronization unit on an opposite side, and a function for adding (inserting) and sending out the ATM cells handed from the AAL processing unit 426 into a specified direction (a cell synchronization unit in a specified direction). In this add/drop and header conversion unit 425, in a case cells having ATM cell header values which are not registered in the header conversion table are entered, these cells are discarded in this module and empty cells are inserted and outputted to an output side instead.

The AAL processing unit 426 has a function for cell disassembling the ATM cells handed from the add/drop and header conversion unit 425, assembling them in forms of the upper layer packets, storing these packets, and handing these packets to the bus interface 427 according to the need, and a function for storing the upper layer packets handed from the bus interface 427, ATM cell assembling these packets according to the need, sending out these ATM cells to the add/drop and header conversion unit 425.

The bus interface 427 has a function for interfacing the input/output data of the standard bus interface of the WS 41 with respect to the communication board 42, and a function for relaying the set up commands to each module within the communication board 42 from the WS 41 side given through the standard bus interface or the notices from each module within the communication board 42 to the WS 41 side, so as to carry out the control of each module in the communication board 42.

Next, each element of the WS 41 has the following functions.

The CPU 411 is a main processor of the WS 41, where an operating system operable on the WS 41 and various application programs operable on the WS 41 are operated on this CPU 411. In addition, in this embodiment, the configuration of FIG. 6 operates as the router, so that the software of the application programs for the router are also operated on this CPU 411.

Here, the application programs for the router includes:
(1) a control/management program for the router,
(2) a link layer connection control program for setting up, changing, disconnecting, and managing link layer connection (ATM connection) between the router and the link layer network (ATM-LAN) connected to it,
(3) a network layer processing (router processing) program, and
(4) a control program of the communication board 42.

It is to be noted that the link layer connection (2) and a part of the control program of the communication board 42 (4) may be implemented as a device driver of the WS 41 by regarding the communication board 42 as one of the devices for the WS 41.

The main memory 412 is a main data storage device for the WS 41.

The bus interface 413 has a function for electrically connecting/disconnecting the main bus 415 and the peripheral bus 416 according to commands from the CPU 411.

The hard disk (HD) 414 is a large capacity data memory device connected to the peripheral bus 416.

The WS 41 has at least one extension slot, and this extension slot has its own peripheral bus 416 and a corresponding bus (such as S bus, TURBO bus, ISA bus, PCI bus, etc.).

Also, it may be possible for the WS 41 of this embodiment to have a configuration capable of directly referring to addresses of a memory provided in the bus interface unit 427 or in the AAL processing unit 426 through the bus interface unit 427 in the communication board 42, via the standard bus interface. Namely, it may be possible for the CPU 411 to regard a memory space within the communication board 42 as a part of the address space (or I/O space) directly visible from the CPU 411.

The bus interface unit 427 in the communication board 42 connected with the WS 41 has a function for carrying out a control of each module within the communication board 42 as described according to commands from the CPU 411. In other words, the CPU 411 carries out various settings of each module in the communication board 42 via the bus interface unit 427, according to commands from the router software operated on the CPU 411 described above, as follows.

First, the router software operated on the CPU 411 carries out the initialization of the communication board 42. This initialization includes the link layer connection processing software, the network management software, and the router processing software as the inter-networking device softwares operated on the CPU 411, a function of connection set up in the ATM-LAN connected to the router, and an establishment of the ATM connection/upper layer connection with respect to the other routers, etc. The establishment of the ATM connection is realized as the router software operated on the CPU 411 sets up the specific processing contents with respect to the add/drop and header conversion unit 425 via the bus interface unit 427, such as "those ATM cells which have prescribed ATM cell header values among the ATM cells entered from a certain physical interface are to be dropped to the WS 41 side", "the AAL processing unit 426 is to cell disassemble the dropped ATM cells and hand them to the CPU 411 (or the router software provided therein) through the bus interface unit 427", and "in order to output data from the CPU 411 (or the router software provided therein) to the external of the WS 41, that data is to be handed to the AAL processing unit 426 through the bus interface unit 427, and ATM cell assembled by attaching the prescribed ATM cell header value there, and then the ATM cell is to be added and outputted to an appropriate physical interface side by the add/drop and header conversion 425"

At this point, the data exchange between the WS 41 and the communication board 42 may be realized by using a scheme for specifying one of the A-side and B-side physical interfaces from which that data was transmitted or to which that data is to be transmitted, along with the ATM cell header value.

Next, an ATM connection which passes through the router at the ATM layer processing alone (which will be referred hereafter as a bypass ATM connection) will be described.

A set up of a bypass ATM connection to be set over the router is carried out by various programs operated on the CPU 411. A physical setting of the actual bypass ATM connection is made as follows. Namely, the software operated on the CPU 411 sets up the processing content that "an ATM cell entered from the physical interface of one side (A-side for instance) which has a specific ATM cell header value (header value=X for instance) is to be outputted to another side (B-side for instance) after the cell header value is rewritten into a prescribed value (header value=Y for instance)", with respect to the add/drop and header conversion unit 425 through the bus interface unit 427. An appropriate setting is also made with respect to the add/drop and header conversion unit 425 in a case there is an ATM connection in opposite direction (such as a ATM connection in B→A direction, or a bidirectional connection). By means of this, the ATM cell with the header value=X entered from the A-side for example will be outputted to the B-side interface with the cell header value rewritten into the header value=Y. At this point, in the router (i.e., in the communication board), only the ATM layer processing is carried out. In this manner, it is possible to set up a bypass ATM connection which passes through the communication board 42 at the ATM layer processing alone.

Here, the add/drop and header conversion unit 425 may be provided with a UPC function, i.e., a policing/shaping function therein. Namely, it is possible to carry out a cell flow monitoring or a cell flow regulation on the cell flow having specific ATM cell header values.

Procedure for Packet Transfer

Next, a procedure for packet transfer by the router in this embodiment as shown in FIG. 4 will be described with reference to the flow chart of FIG. 7.

When the datalink layer frame is entered from the network I/F unit 201 (step S1), the datalink layer switch unit 202 searches through the L2 routing table t1 with an input connection ID or L2 destination address of the received datalink layer frame as a search key (step S2) to determine the output I/F.

In a case the search is successful, the received datalink layer frame is handed to the output I/F registered in the searched out entry, while the output connection ID in the packet is rewritten according to the searched out entry of the L2 routing table (step S6), and the received datalink layer frame is outputted from the network I/F unit 201 of the determined output I/F (step S13).

On the other hand, when the determined output I/F indicates an upper layer, or when there is no corresponding entry, the received datalink layer frame is handed to the datalink layer-network layer translation unit 203 to carry out an assembling of L3 packet from L2 frame (step S3). For example, in a case of the ATM, the AAL processing is to be carried out here, whereas in a case of the Ethernet, the header is to be removed here. After the translation from the L2 frame to the L3 packet is carried out, the network layer switch unit 204 determines whether this L3 packet is destined to this node or not (step S4), and if so, the L3 packet destined to this node is handed to the upper layer (the network layer control unit 207, the datalink layer control unit 206, the datalink layer connection set up judgement unit 205) (step S5). Otherwise, the L3 packet is not destined to this node and to be transferred, so that the following operation is carried out for a transmission of a packet.

Namely, the network layer switch unit 204 searches through the L3 routing table t4 with a destination L3 address of the packet as a search key, to determine the next hop L3 address and the output I/F (step S8). Here, the destination L3 address may not necessarily be the destination address to which the packet is to be transferred, and can be any of a source address, a network mask, a flow ID to be set by IPng, an application ID such as a TCP/UDP port, etc. By using the network mask, it becomes possible to specify a group of a plurality of hosts rather than specifying just one destination host, so as to enable more general destination specification. Also, by using the flow ID or the TCP/UDP port, it becomes possible to specify a specific application of the destination host, so as to enable more detailed destination specification. In the following, it is assumed that the destination address is indicated by any one or more of "address of destined host", "network mask of destined host", "address of source host", "network mask of source host", "flow ID", and "transport layer port (such as TCP/UDP port)".

When the output I/F is determined by the L3 routing table search, a dedicated VC table t3 is searched by the datalink layer-network layer translation unit 203 to check if there is an entry for the destination address in this dedicated VC table t3 (step S9). This dedicated VC table t3 is managed by the datalink layer control unit 206 and an entry is registered in this dedicated VC table t3 when L2 forward is made without making L3 forward at a router in a middle. By searching through this dedicated VC table t3, it is possible to determine the connection ID to be attached to the packet to be outputted from the destination L3 address. Consequently, by using this dedicated VC table t3, it becomes possible to carry out the L2 transfer by routers at a next and farther stages, so as to realize a high speed packet transfer. When a corresponding entry is found by the dedicated VC table search, the operation proceeds to the step S12 described below.

When no corresponding entry is found by the dedicated VC table search, a default VC table t2 is searched by the datalink layer-network layer translation unit 203 (step S10). This default VC table t2 registers the routers/terminals existing in the same LAN, for a use in a case of the L3 packet transfer to a next hop, hop by hop. When a corresponding entry is found by the default VC table search, the operation proceeds to the step S12 described below.

When no corresponding entry is found by the default VC table search either, the output connection ID remains unknown, so that the L2 address is resolved from the L3 address by using ARP (Address Resolution Protocol), a connection (VC) is set up, and a corresponding entry is registered in the default VC table t2, while the packet is outputted by using its output connection ID, at the datalink layer-network layer translation unit 203 (step S11).

The packet with the output connection ID determined is then converted from L3 packet to L2 frame at the datalink layer-network layer translation unit 203 (step S12), and outputted to the LAN through the network I/F unit 201 of the determined output I/F (step S13).

Also, when there is an entry from the upper layer (step S7), the steps S8 to S13 described above is carried out similarly for the transmission of a packet.

In the above described procedure, the dedicated VC table and the default VC table are provided separately, but it is also possible to combine them to form a single table. It is further possible to form a single table by combining the L3 routing table, the default VC table, and the dedicated VC table, if desired. In this case, the L3 routing table has a format as shown in FIG. 8, which differs from the L3 routing table t4 shown in FIG. 7 in that the output connection ID (VPI/VCI) is registered in a field for the output I/F as well, so that it suffices to search through this table alone in determining the output connection ID, and therefore the separate default VC table and dedicated VC table are unnecessary.

Transmission Terminal

Figure 7:
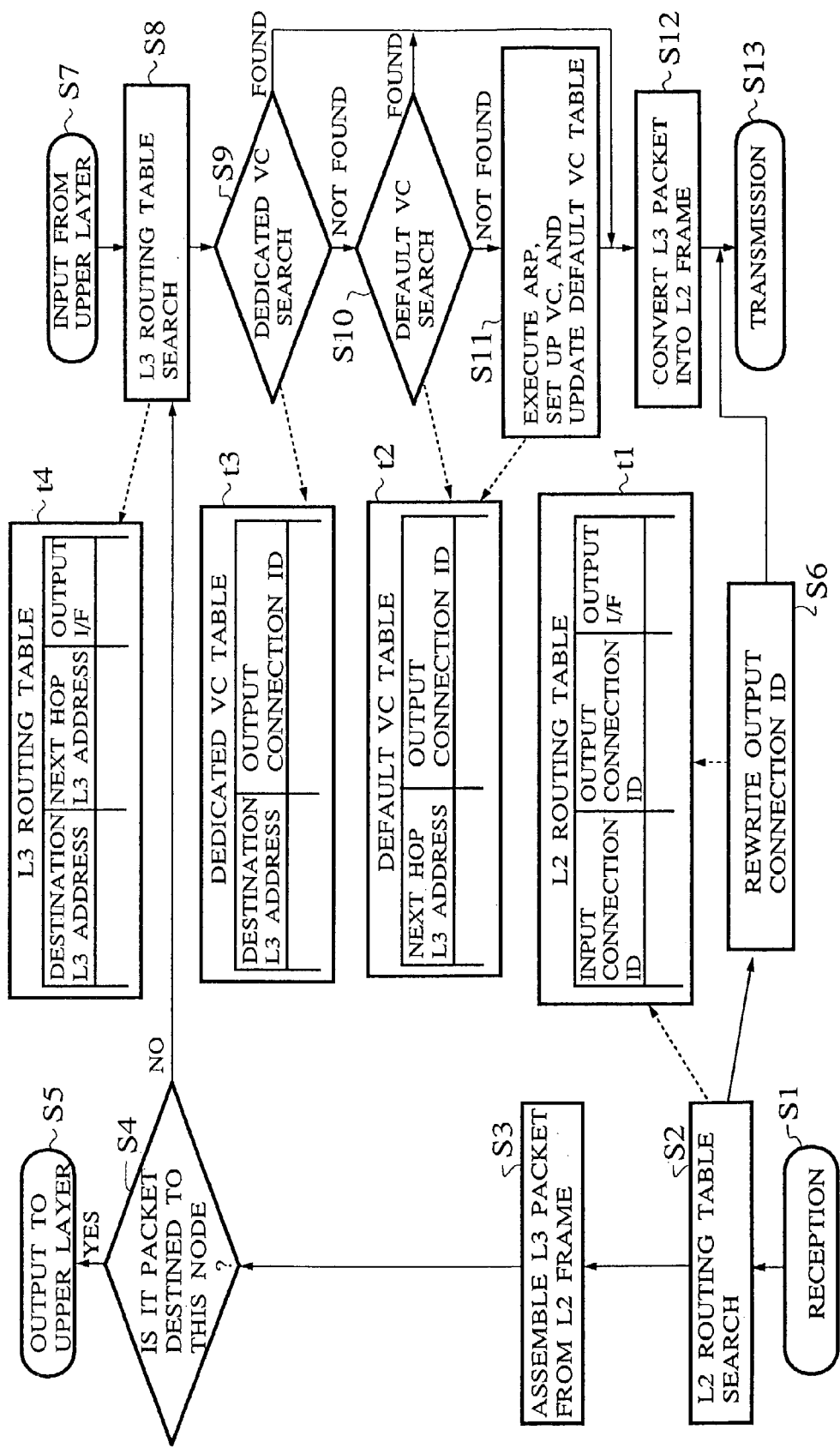
FIG. 7 is a flow chart showing a procedure for packet transfer by the router of FIG. 4.

The steps S7 to S13 in the above described flow chart of FIG. 7 for a packet transfer procedure at a router is a packet transmission procedure which is also applicable to a packet transmission at a terminal as well.

Here, another example of a transmission terminal for transmitting a packet will be described with references to FIG. 9 to FIG. 12.

Figure 9:
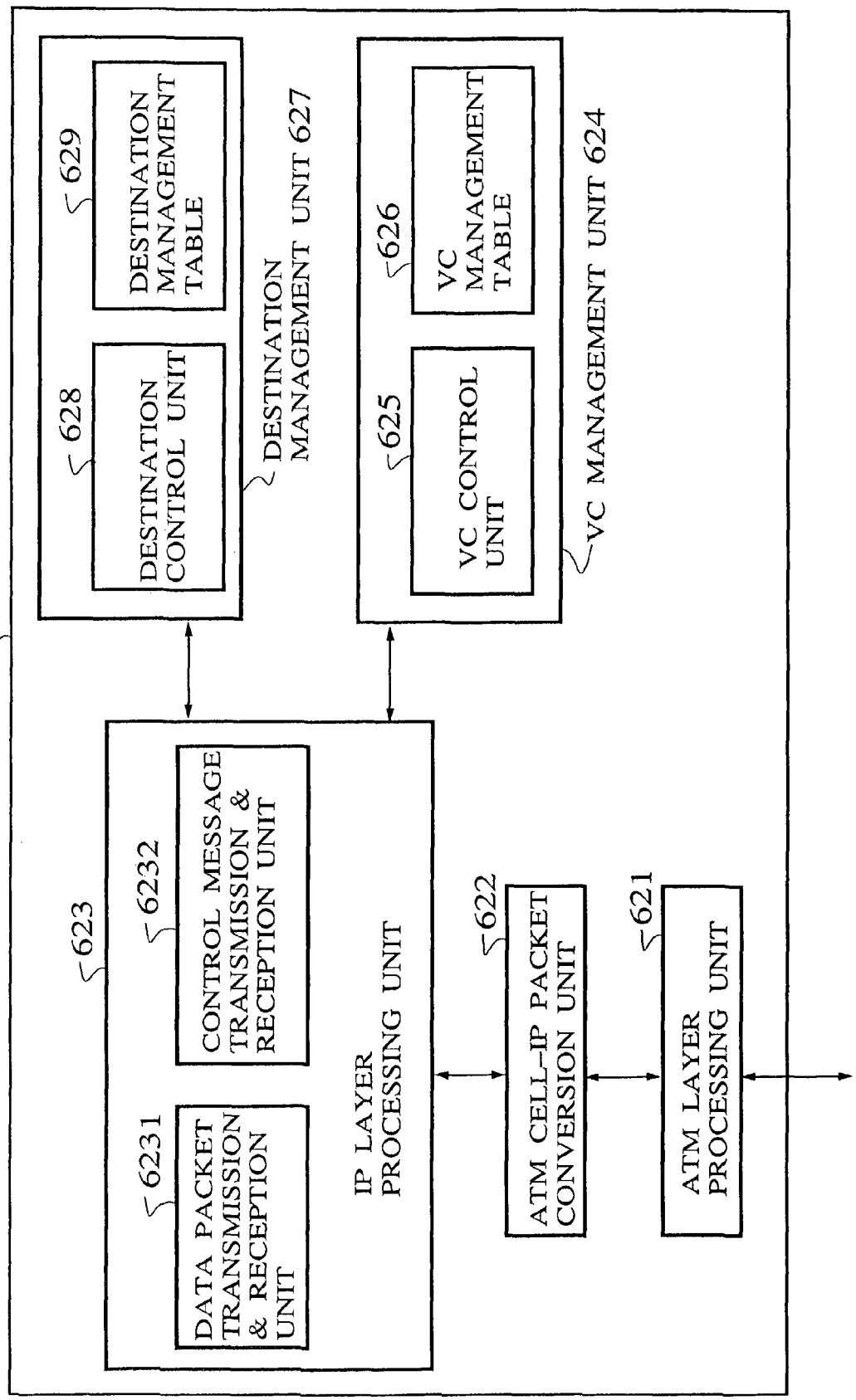
FIG. 9 is a block diagram showing a configuration of each transmission terminal in the ATM network of FIG. 1.

The terminal (host) 602 in FIG. 1 for transmitting and receiving packets in this embodiment can have an exemplary configuration as shown in FIG. 9, which comprises: an ATM layer processing unit 621; and ATM cell-IP packet conversion unit 622 connected with the ATM layer processing unit 621; an IP layer processing unit 623 connected with the ATM cell-IP packet conversion unit 622, and a VC management unit 624 and a destination management unit 627 connected with the IP layer processing unit 623. Here, the IP layer processing unit 623 includes a data packet transmission and reception unit 6231 for carrying out transmission and reception of data packets and a control message transmission and reception unit 6232 for carrying out transmission and reception of control messages, and the VC management unit 624 includes a VC control unit 625 and a VC management table 626, while the destination management unit 627 includes a destination control unit 628 and a destination management table 629.

Here, the VC management table 626 has an exemplary table content as shown in FIG. 10. This VC management table 626 stores a VC connection target IP address, I/F, VPI/VCI, and status for each VC managed by the VC management unit 624. The status indicates whether each VC is already in use somewhere or not.

Also, the destination management table 629 has an exemplary table content as shown in FIG. 11. This destination management table 629 stores a correspondence between a data transmission destination (which can be indicated by an IP address of a destination terminal, or by a net ID of a destination network, for example), I/F, and VPI/VCI.

Figure 12:
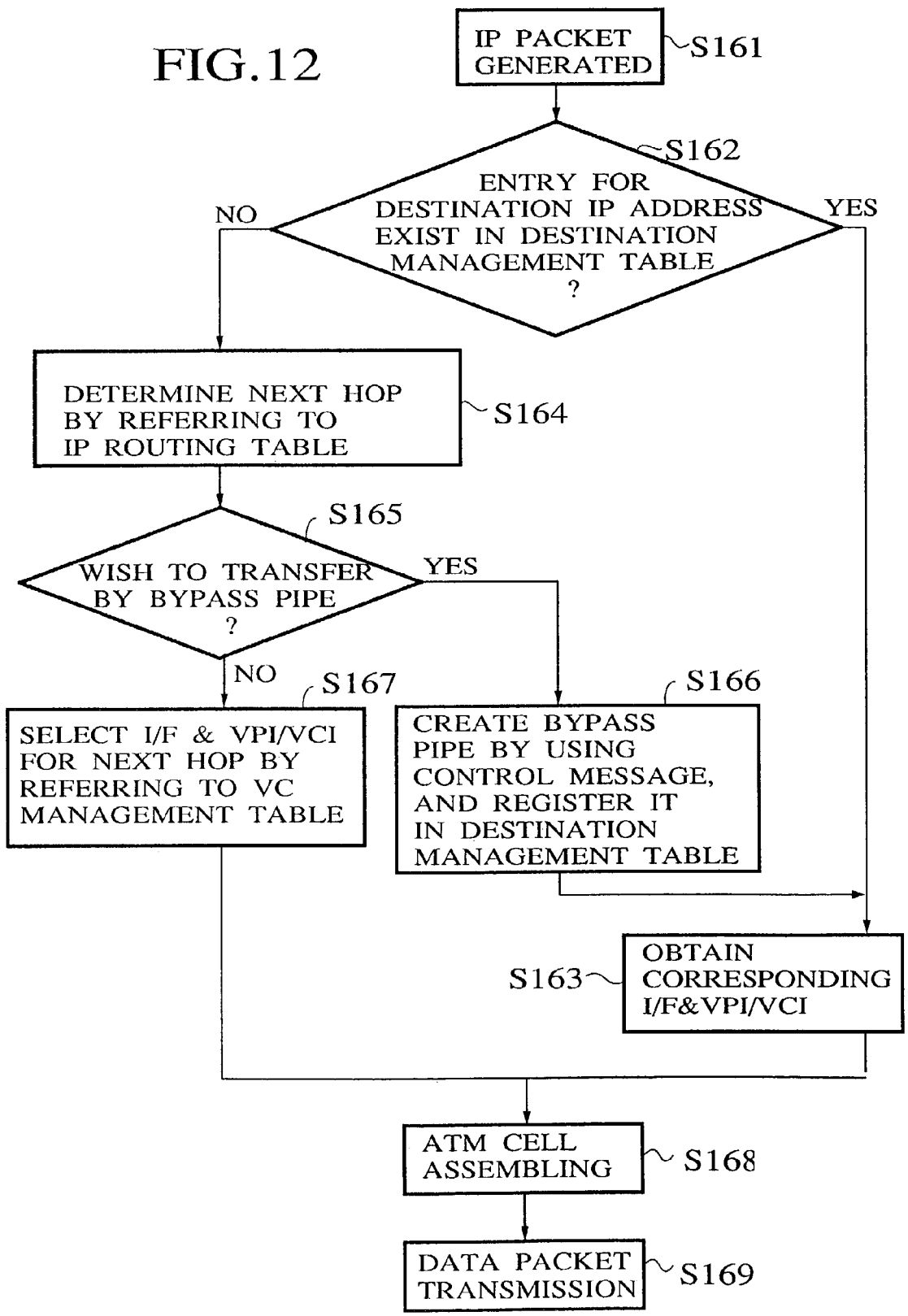
FIG. 12 is a flow chart showing a procedure for transmitting a data packet by the transmission terminal of FIG. 9.

Next, a procedure for transmitting a data packet in this transmission terminal of FIG. 9 will be described with reference to the flow chart of FIG. 12.

When data to be transmitted (IP packet) is generated (step S161), the destination management table 629 is referred to check if there exists an entry corresponding to the destination IP address in the generated IP packet (S162). In a case a corresponding entry exists at the step S162, a corresponding I/F and a corresponding VPI/VCI are obtained from the destination management table 629 (step S163). Then, the ATM cell is assembled according to a prescribed format (step S168) and the data packet, i.e., the assembled ATM cell, is transmitted (step S169).

In a case a corresponding entry does not exist at the step S162, a next hop is determined by referring to an IP routing table provided within the IP layer processing unit 623 (step S164). Then, whether a transfer by a bypass pipe is wished or not is judged (step S165).

In a case the transfer by a bypass pipe is not wished, the VC management table 626 is referred to obtain I/F and VPI/VCI corresponding to the next hop (step S167). Then, the ATM cell is assembled according to a prescribed format (step S168) and the data packet, i.e., the assembled ATM cell, is transmitted (step S169).

In a case the transfer by a bypass pipe is wished, the bypass pipe is created by using the control message and registered in the destination management table 629 (step S166), and then, a corresponding I/F and a corresponding VPI/VCI are obtained from the destination management table 629 (step S163). Then, the ATM cell is assembled according to a prescribed format (step S168) and the data packet, i.e., the assembled ATM cell, is transmitted (step S169).

Bypass Pipe Set Up/Release Procedure (Hard State)

Now, a procedure for setting up or releasing a bypass pipe using a hard state scheme in this embodiment will be described in detail. In a case of ATM, the bypass pipe can be provided by either a PVC (Permanent Virtual Channel) or a VC within VP. The bypass pipe set up/release procedure to be described below is equally applicable to either case, so that only a case of using PVC will be described below as an illustrative example.

Figure 13:
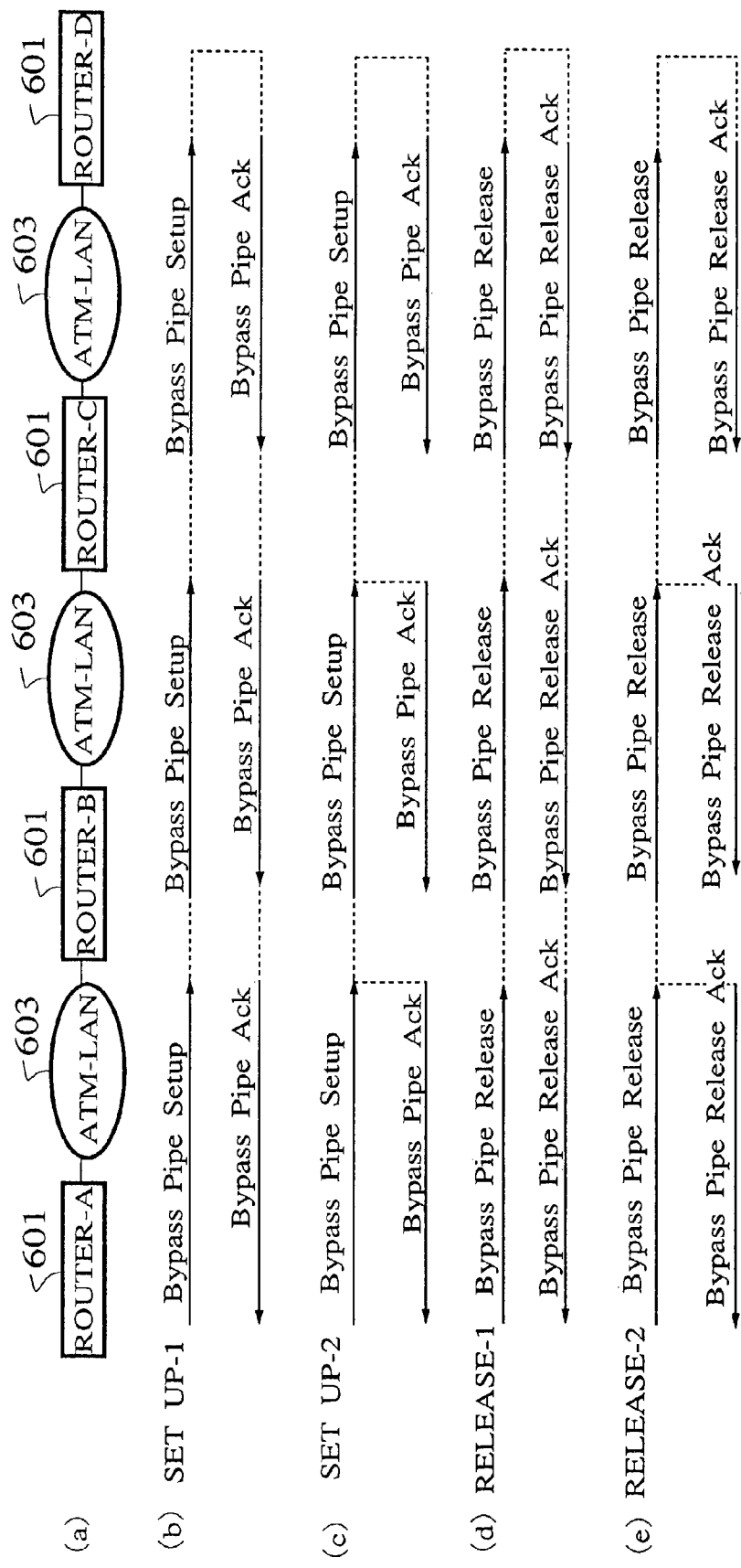
FIG. 13 is a diagram showing possible outlines of a procedure for set up/release of a bypass pipe using a hard state scheme in the ATM network of FIG. 1.

In an exemplary case in which a router-A commands set up/release of a bypass pipe from a router-A to a router-D through a router-B, a router-C, and ATM-LANs provided between routers as shown in a part (a) of FIG. 13, there are two possible outlines for a control message sequence to be used at a time of set up as indicated in parts (b) and (c) of FIG. 13, and two possible outlines for a control message sequence to be used at a time of release as indicated in parts (d) and (e) of FIG. 13. In setting up or releasing the bypass pipe, it is preferable to rewrite an ATM routing control table within one cell time in order to maintain a transfer efficiency for data packets. In view of this fact, a case of using the control message sequences as outlined in a part (b) (set up-1) and a part (e) (release-2) of FIG. 13 will be described in detail first.

Figure 14:
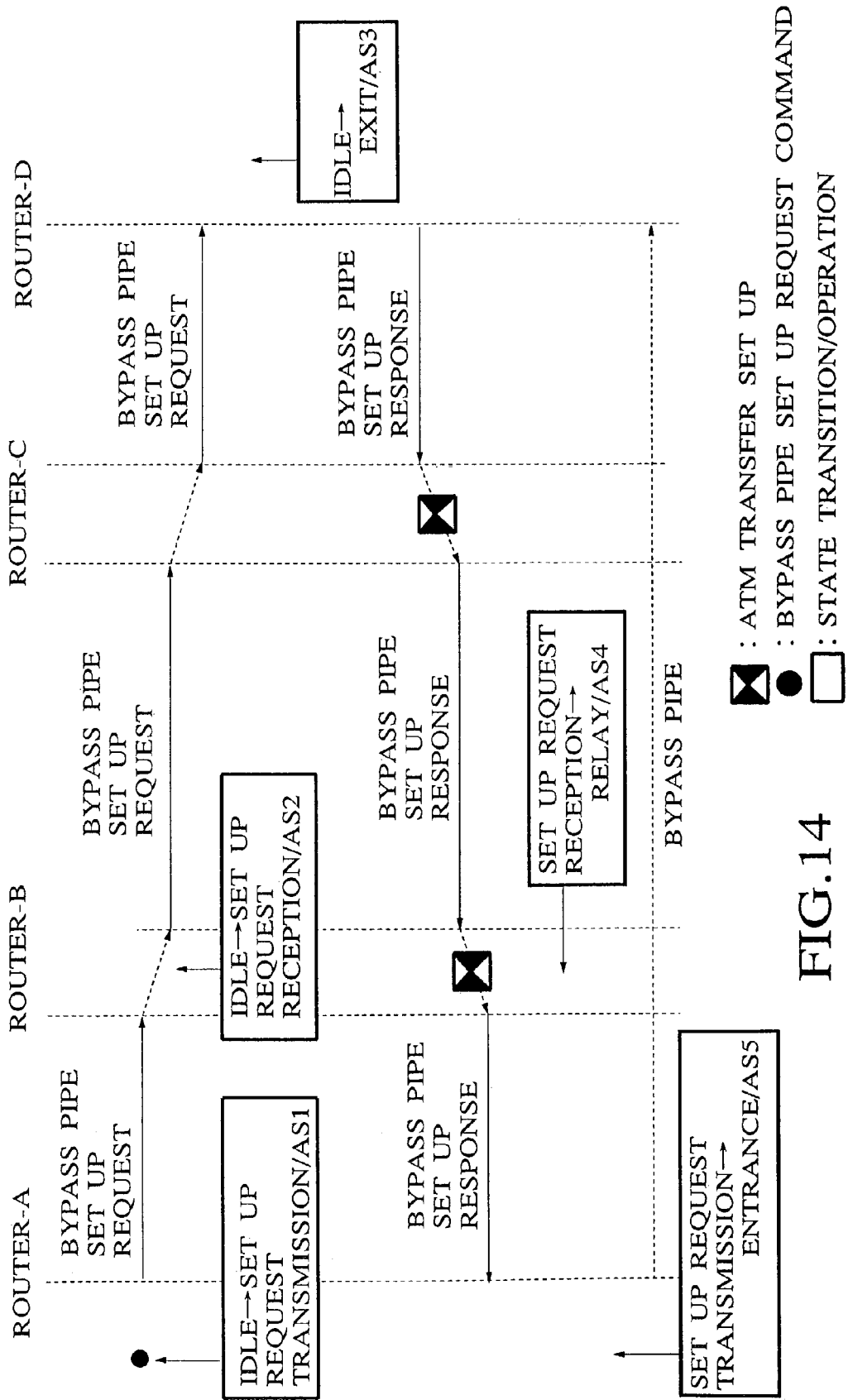
FIG. 14 is a diagram showing a detailed control message sequence to be used at a time of bypass pipe set up in one case.
Figure 15:
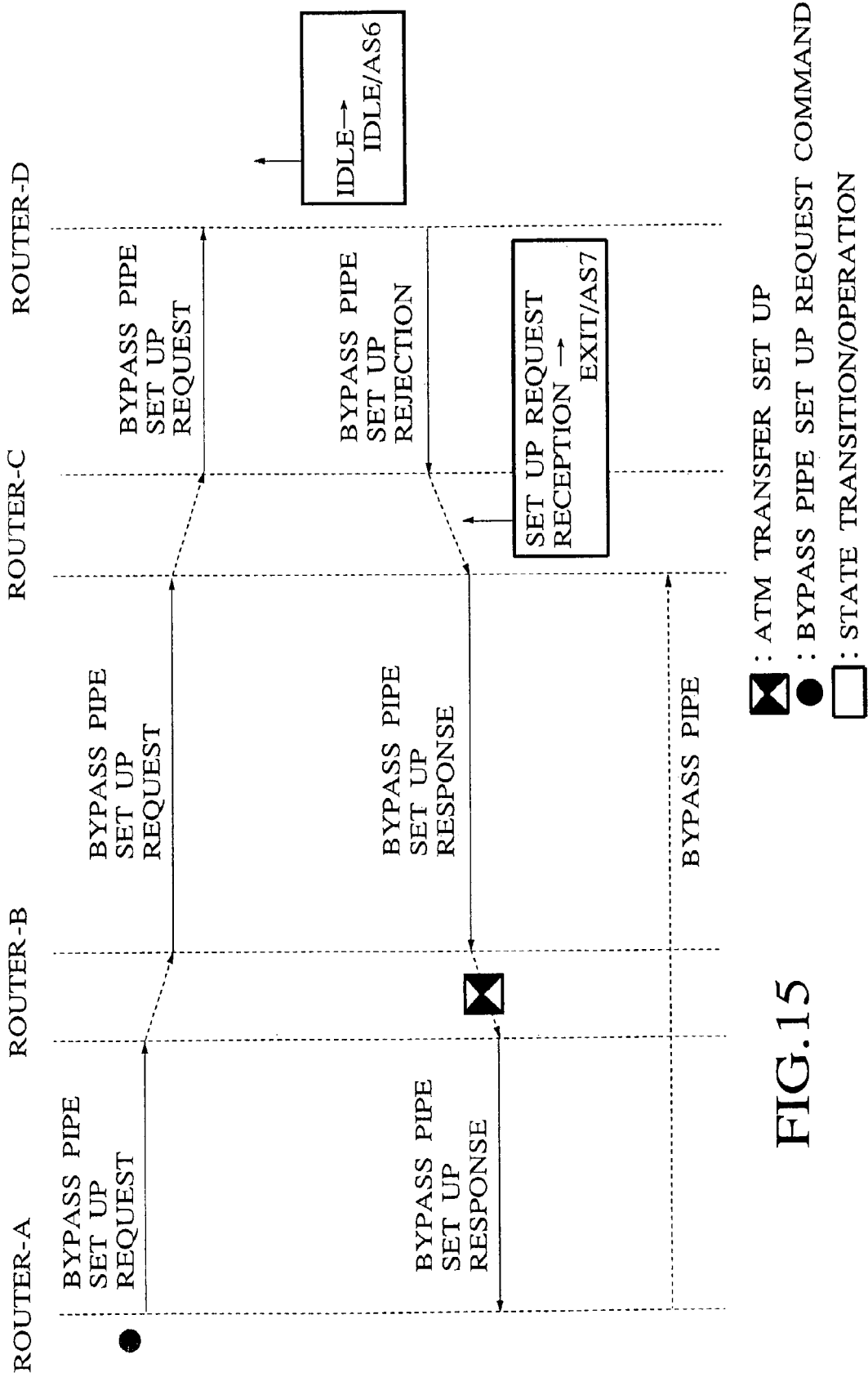
FIG. 15 is a diagram showing a detailed control message sequence to be used at a time of bypass pipe set up in another case.
Figure 16:
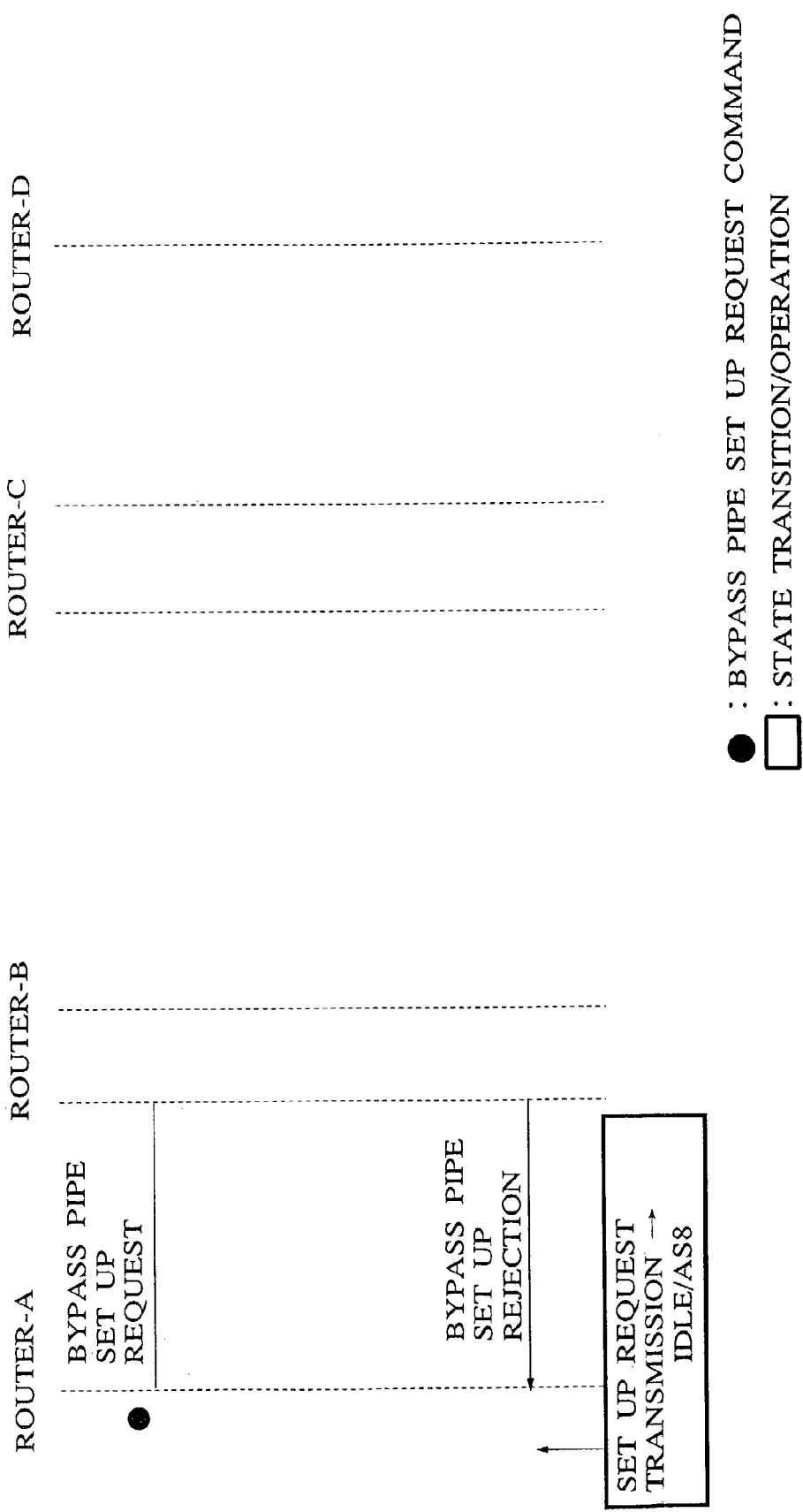
FIG. 16 is a diagram showing a detailed control message sequence to be used at a time of bypass pipe set up in still another case.

In this case, detailed control message sequences to be used at a time of bypass pipe set up are shown in FIGS. 14, 15, and 16, where FIG. 14 shows a control message sequence for a case in which the bypass pipe has been set up to a target router, FIG. 15 shows a control message sequence for a case in which the bypass pipe has been set up to an intermediate router, and FIG. 16 shows a control message sequence for a case in which the bypass pipe has not been set up.

As indicated in each of FIGS. 14, 15, and 16, a black dot symbol in these figures represents a router which made a bypass pipe set up request command (router-A in this case), and a partially black square symbol in these figures represents a completion of an ATM transfer set up (ATM layer level set up). Also, a solid line with an arrow in these figures represents a control message. Here, a control message at a time of bypass pipe set up is transferred to a neighboring router hop by hop, using a default VC provided for this purpose. In addition, a rectangular enclosure with an arrow in these figures represents a state transition inside a router and an operation of a router at that time, where each operation is indicated in an abbreviated format of "AS(numeral)" whose content is specified in a table shown in FIG. 17.

In FIG. 17, each operation is specified in terms of the following parts. A "Transmission Packet" part indicates a type of packet to be transferred. "Bypass Pipe Management Table" parts (output side and input side) indicate registration or deletion of a bypass pipe management table as shown in FIG. 18C for managing from which input port to which output port the dedicated VCs are connected. In further detail, the bypass pipe management table of FIG. 18C has an entry for each bypass pipe ID which specifies VCID, VPI/VCI, and port at the input side and the output side, along with its state (internal state). An "ATM Transfer" part indicates a set up or release of the L2 routing table within the router to carry out the ATM transfer. An "IP-VC Correspondence table/IP Routing table" part indicates registration or deletion of an IP-VC correspondence table as shown in FIG. 18D and an IP routing table as shown in FIG. 18E. Here, the IP-VC correspondence table of FIG. 18D is used in determining which VC should the packet be outputted at a time of transferring the packet from the first router of the bypass pipe according to the destination IP address of the packet. This IP-VC correspondence table of FIG. 18D is set up in the router at an entrance of the bypass pipe when the bypass pipe is set up.

Also, each interface is provided with a VC management table as shown in FIG. 18A for specifying a VCID and a target IP address for each VPI/VCI, and an available VC table as shown in FIG. 18B for specifying a VCID for each target IP address, in addition to the IP-VC correspondence table of FIG. 18D.

On the other hand, each node is provided with the IP routing table of FIG. 18E for specifying a next hop IP address, an interface, a virtual next hop IP address, and a packet count for each destination IP address, in addition to the bypass pipe management table of FIG. 18C. Here, the next hop IP address indicates an address of a next node in a case of a usual hop by hop transfer, and the virtual next hop IP address indicates an address of a terminal point node of a bypass pipe which corresponds to a next hop in terms of IP and which is to be used in a case of a transfer by a bypass pipe, while the packet count indicates a number of packets transferred, which is to be used as a statistical information in determining a timing for the bypass pipe set up.

Now, the detailed control message sequences of FIGS. 14, 15, and 16 will be described in further detail one by one.

FIG. 14 is a control message sequence for a case in which the bypass pipe has been set up completely from the router-A to the router-D. The black dot symbol indicates that the router-A receives the bypass pipe set up request command. When this command is received, the router-A changes the internal state for a pipe ID=#1 from an "idle" state to a "set up request transmission" state by changing a state of the pipe ID=#1 in the bypass pipe management table. Then, the VCID and the port used at the output side are registered in the bypass pipe management table. In addition, the bypass pipe set up request message is transmitted to the router-B which is a next stage router on the way to the router-D. This message includes the pipe ID, the VCID to be used, the final destination address, and the sender address. In this example the pipe ID is #1, the VCID is #2, the final destination address is the router-D, the sender address is the router-A. Here, the final destination address and the sender address are those contained in the bypass pipe set up request message, and not those contained in the header of the IP packet. These series of operations is indicated by "AS1" in FIG. 17.

The router-B starts to operate when the bypass pipe set up request message transmitted from the router-A is received. First, the router-B checks the condition P1: whether the dedicated VC to the router-A is available and whether the router-A is permitted to set up the bypass pipe to the router-B. Then, the router-B checks whether the router-B itself is the last router of the bypass pipe or not by looking up the final destination address of the received message. Here, the condition for becoming the last router is given by the condition P2: a case of either "a link to a next router to which the bypass pipe set up request message is to be sent is not ATM" or "it is in the identical sub-net as the final destination address". For this condition P2, it is also possible to consider a case of "a link to a next router to which the bypass pipe set up request message is to be sent is not ATM" or "it is identical to the final destination address".

In this example, the link to which the bypass pipe set up request message is to be sent is ATM and the final destination address is the router-D, so that the router-B is not the last router of the bypass pipe. Thus, the router-B changes the internal state for the pipe ID #1 from an "idle" state to a "set up request reception" state. Then, the bypass pipe set up request message is transmitted to the router-C which is a next stage router on the way to the router-D. Here, the content of the bypass pipe set up request message has the same pipe ID and final destination address as those sent by the router-A, while the VCID is changed to that used by the router-B. After this message is transmitted, the VCIDs and ports used here are registered in the input side and the output side of an entry for the pipe ID=#1 in the bypass pipe management table.

The router-C also checks whether the dedicated VC between the router-B and the router-C is available according to the condition P1, and whether it is the last router of the bypass pipe according to the condition P2, just as in the router-B. In this example, it is recognized that it is not the last router of the bypass pipe. Thereafter, the router-C carries out the operations similar to those of the router-B described above, and transmits the bypass pipe set up request message to the router-D.

When the bypass pipe set up request message is received from the router-C, the router-D checks whether the dedicated VC between the router-C and the router-D is available according to the condition P1, and whether it is the last router of the bypass pipe according to the condition P2. In this example, the final destination of this bypass pipe set up request message is the router-D, it is recognized that it is the last router of the bypass pipe. Then, the router-D changes the internal state from an "idle" state to an "exit" state, and returns a bypass pipe set up response message to the router-C from which the bypass pipe set up request message has arrived. This message contains the pipe ID, the VCID, and the sender address. Here, the sender address is the router-D. Then, the VCID and port used here are registered in the input side of the bypass pipe management table.

When the bypass pipe set up response message is received from the router-D, the router-C changes the internal state from the "set up request reception" state to a "relay" state. Then, a previous stage router is recognized from the VCID registered in the input side of the bypass pipe management table and the bypass pipe set up response message is transmitted to the router-B. Here, the content of this message retains the pipe ID, the final destination address, and the sender address as received while changing the VCID to that registered in the bypass pipe management table. Then, the ATM routing table is changed accordingly so as to enable the ATM transfer.

When the bypass pipe set up response message is received from the router-C, the router-B operates similarly as the router-C, and transmits the bypass pipe set up response message to the router-A.

When the bypass pipe set up response message is received from the router-B, the router-A changes the internal state from the "set up request transmission" state to an "entrance" state, and registers the VCID and port used here in the input side of the bypass pipe management table. Also, the router-A changes the output target of the IP packet from the default VC to the currently set up bypass pipe by registering the IP address of the IP packet and the VPI/VCI of the bypass pipe into the IP-VC correspondence table. In addition, the virtual next hop IP address for the IP routing table (L3 routing table) as shown in FIG. 18E is registered. By this, the set up of the bypass pipe from the router-A to the router-D is finished.

FIG. 15 is a control message sequence for a case in which the bypass pipe has been set up only to an intermediate point. The black dot symbol indicates that the router-A receives the bypass pipe set up request command just as in a case of FIG. 14. Here, the operations from the router-A to the router-C are the same as in a case of FIG. 14.

When the bypass pipe set up request message is received from the router-C, the router-D checks whether the dedicated VC is available according to the condition P1. Then, when the condition P1 is not satisfied, the router-D leaves the internal state in the "idle" state, and returns the bypass pipe set up rejection message to the router-C. This message contains the final destination address, the sender address, the pipe ID, and the VCID. In this example, the final destination address is the router-D, and the sender address is the router-A.

When the bypass pipe set up rejection message is received from the router-D, the router-C changes the internal state from the "set up request reception" state to an "exit" state. Then, the bypass pipe set up response message is transmitted to the router-B. Here, the final destination address of this message is set to be the router-C. The router-C then finishes its operation by deleting the output side of the bypass pipe management table.

Hereafter, the router-B and the router-A operates similarly as in a case of FIG. 14, such that eventually the bypass pipe from the router-A to the router-C is set up.

FIG. 16 is a control message sequence for a case in which the bypass pipe has not been set up at all as the bypass pipe set up request transmitted from the router-A is rejected by the neighboring router-B.

In this case, when the bypass pipe set up request message is received, the router-B checks the condition P1 and recognizes that there is no available dedicated VC, so that the router-B returns the bypass pipe set up rejection.

When the bypass pipe set up rejection message from the router-B is received, the router-A changes the internal state from the "set up request transmission" state to the "idle" state, and deletes the output side of the bypass pipe management table, such that eventually no bypass pipe is set up.

Figure 19:
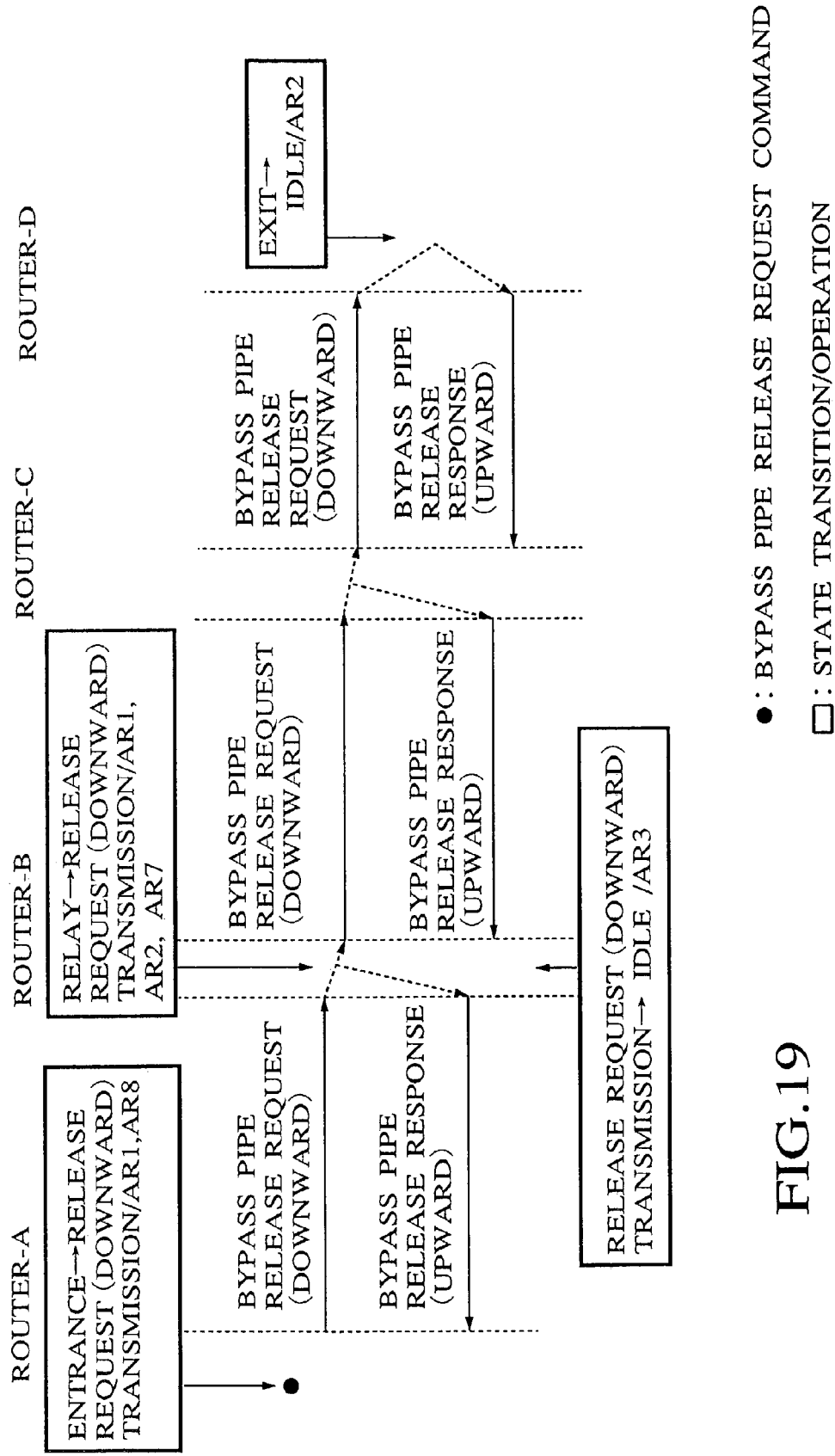
FIG. 19 is a diagram showing a detailed control message sequence to be used at a time of bypass pipe release in one case.
Figure 20:
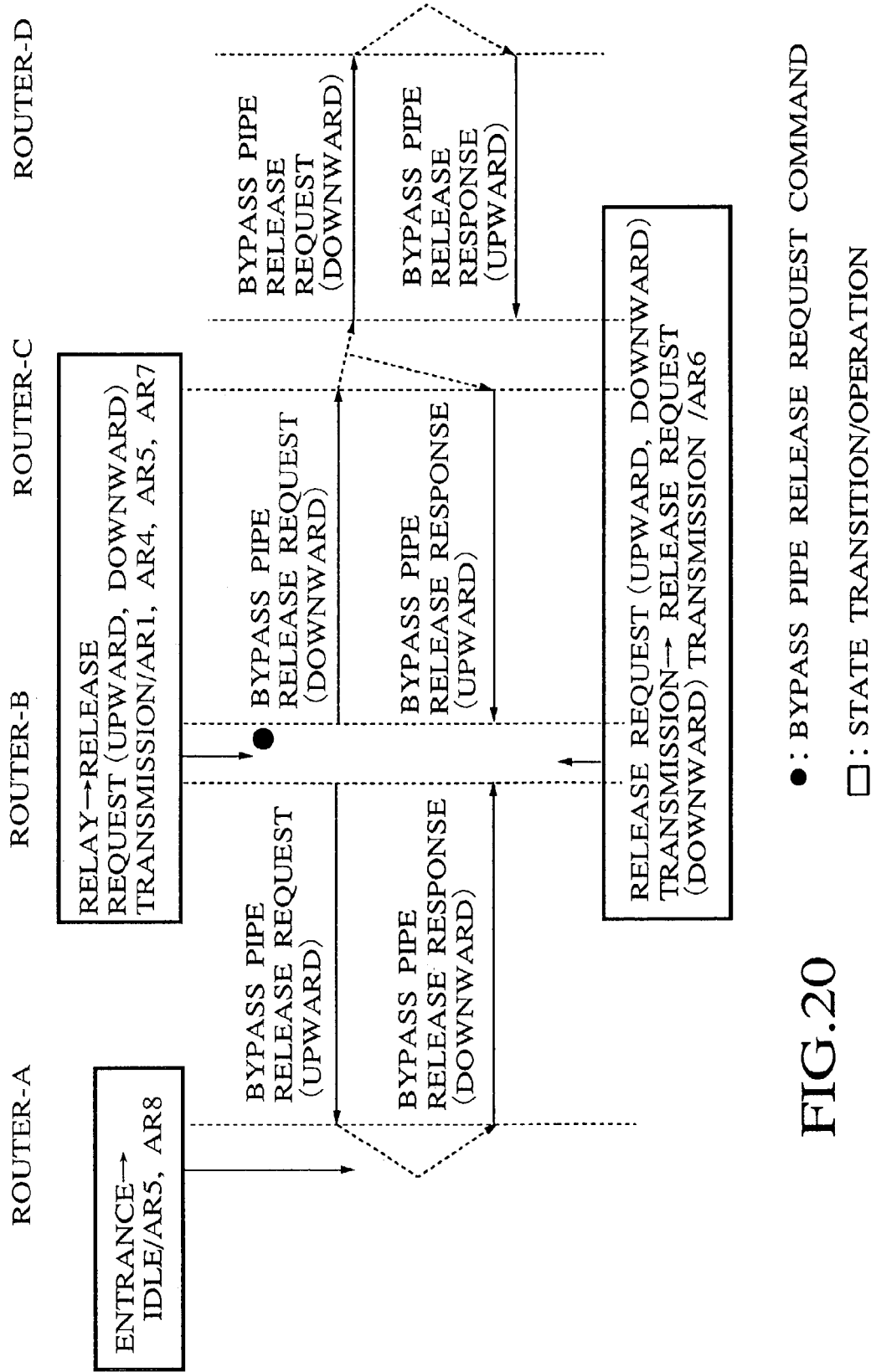
FIG. 20 is a diagram showing a detailed control message sequence to be used at a time of bypass pipe release in another case.
Figure 21:
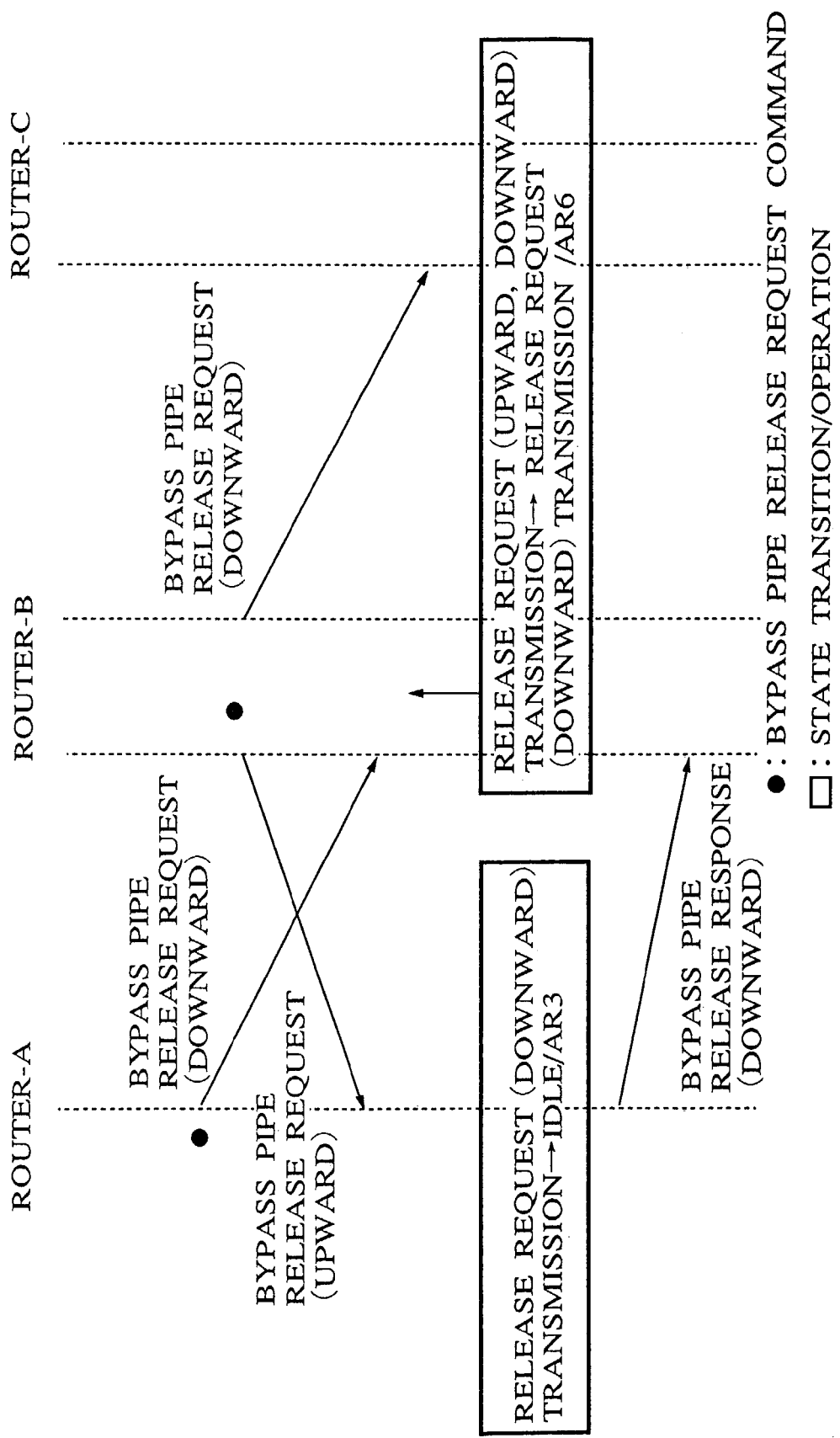
FIG. 21 is a diagram showing a detailed control message sequence to be used at a time of bypass pipe release in still another case.

Next, detailed control message sequences to be used at a time of bypass pipe release are shown in FIGS. 19, 20, and 21, where FIG. 19 shows a control message sequence for a case in which the bypass pipe is released by a router at an entrance of the bypass pipe, and FIG. 20 shows a control message sequence for a case in which the bypass pipe is released by a router in a middle of the bypass pipe. In either case, the release is not a partial one and the bypass pipe is to be entirely released. FIG. 21 shows a control message sequence for an exemplary case of an exceptional processing in which the bypass pipe release request messages are issued simultaneously from two routers.

As indicated in each of FIGS. 19, 20, and 21, a black dot symbol in these figures represents a router which made a bypass pipe release request command. Also, a solid line with an arrow in these figures represents a control message. Here, a control message at a time of bypass pipe release is also transferred to a neighboring router hop by hop, using a default VC provided between the neighboring routers, just as in a case of the bypass pipe set up request message. In addition, a rectangular enclosure with an arrow in these figures represents a state transition inside a router and an operation of a router at that time, where each operation is indicated in an abbreviated format of "AR(numeral)" whose content is also specified in the table shown in FIG. 17 described above.

Now, the detailed control message sequences of FIGS. 19, 20, and 21 will be described in further detail one by one.

FIG. 19 is a control message sequence for a case in which a router at an entrance of the bypass pipe issues the bypass pipe release request command. The router-A which is the router at an entrance of the bypass pipe changes the internal state from the "entrance" state to a "release request (downward) transmission" state, and deletes an entry corresponding to this bypass pipe from the IP-VC correspondence table such that the transmission packet does not use this bypass pipe. Then, the router-A transmits the bypass pipe release request (downward) to the router-B. This message contains the pipe ID of the bypass pipe to be released, the VCID, and the sender address. In this case, the sender address is the router-A.

When the bypass pipe release request message is received from the router-A, the router-B changes the internal state from the "relay" state to a "release request (downward) transmission" state. Then, the router-B deletes the input side of the bypass pipe management table, and transmits the bypass pipe release response (upward) to the router-A while transmitting the bypass pipe release request (downward) to the router-C. Here, the bypass pipe release response message contains the pipe ID, the VCID, and the sender address. In this case, the sender address is the router-B. On the other hand, the sender address of the bypass pipe release request message is the router-A which originally issued this message.

When the bypass pipe release request message is received from the router-B, the router-C operates similarly as the router-B.

When the bypass pipe release request message is received from the router-C, the router-D changes the internal state from the "exit" state to the "idle" state. Then, the router-D deletes the input side of the bypass pipe management table and transmits the bypass pipe release response message to the router-C.

When the bypass pipe release response message is received, each of the router-C, the router-B, and the router-A changes the internal state from the "release request (downward) transmission" state to the "idle" state. By means of these operations, the bypass pipe is released.

FIG. 20 is a control message sequence for a case in which a router in a middle of the bypass pipe (assumed to be the router-B here) issues the bypass pipe release request command. When the bypass pipe release request command is received, the router-B changes the internal state from the "relay" state to a "release request (upward, downward) transmission" state. Then, the router-B deletes the ATM routing table in order to finish the ATM transfer, and transmits the bypass pipe release request (upward) packet to the router-A while transmitting the bypass pipe release request (downward) message to the router-C.

The router-C and the router-D operate similarly as in a case of FIG. 19.

When the bypass pipe release request (upward) is received from the router-B, the router-A changes the internal state from the "entrance" state to the "idle" state. Then, the router-A deletes the virtual next hop IP address of the IP routing table by looking up the user in the bypass pipe management table in order to switch the IP packet transfer from the bypass pipe to the default VC. Also, the router-A deletes the entry for this bypass pipe from the IP-VC correspondence table while deleting the output side of the bypass pipe management table. Then, the router-A finishes its operation by transmitting the bypass pipe release response (downward) message to the router-B.

When the bypass pipe release response (downward) is received from the router-A, the router-B changes the internal state from the "release request (upward, downward) transmission" state to the "release request (upward) transmission" state. Then, the router-B finishes its operation by deleting the input side of the bypass pipe management table.

FIG. 21 is a control message sequence for an exemplary case of an exceptional processing at a time of the bypass pipe release, in which the bypass pipe release request messages are issued simultaneously from the router-A and the router-B. At a time of issuing the bypass pipe release request messages from the router-A and the router-B, the operations are the same as in the normal cases described above.

When the bypass pipe release request message is received from the router-A, the router-B changes the internal state from the "release request (upward, downward) transmission" state to the "release request (downward) transmission" state, and deletes the input side of the bypass pipe management table.

On the other hand, when the bypass pipe release request message is received from the router-B, the router-A changes the internal state from the "release request (downward) transmission" state to the "idle" state, and deletes the output side of the bypass pipe management table.

Figure 22:
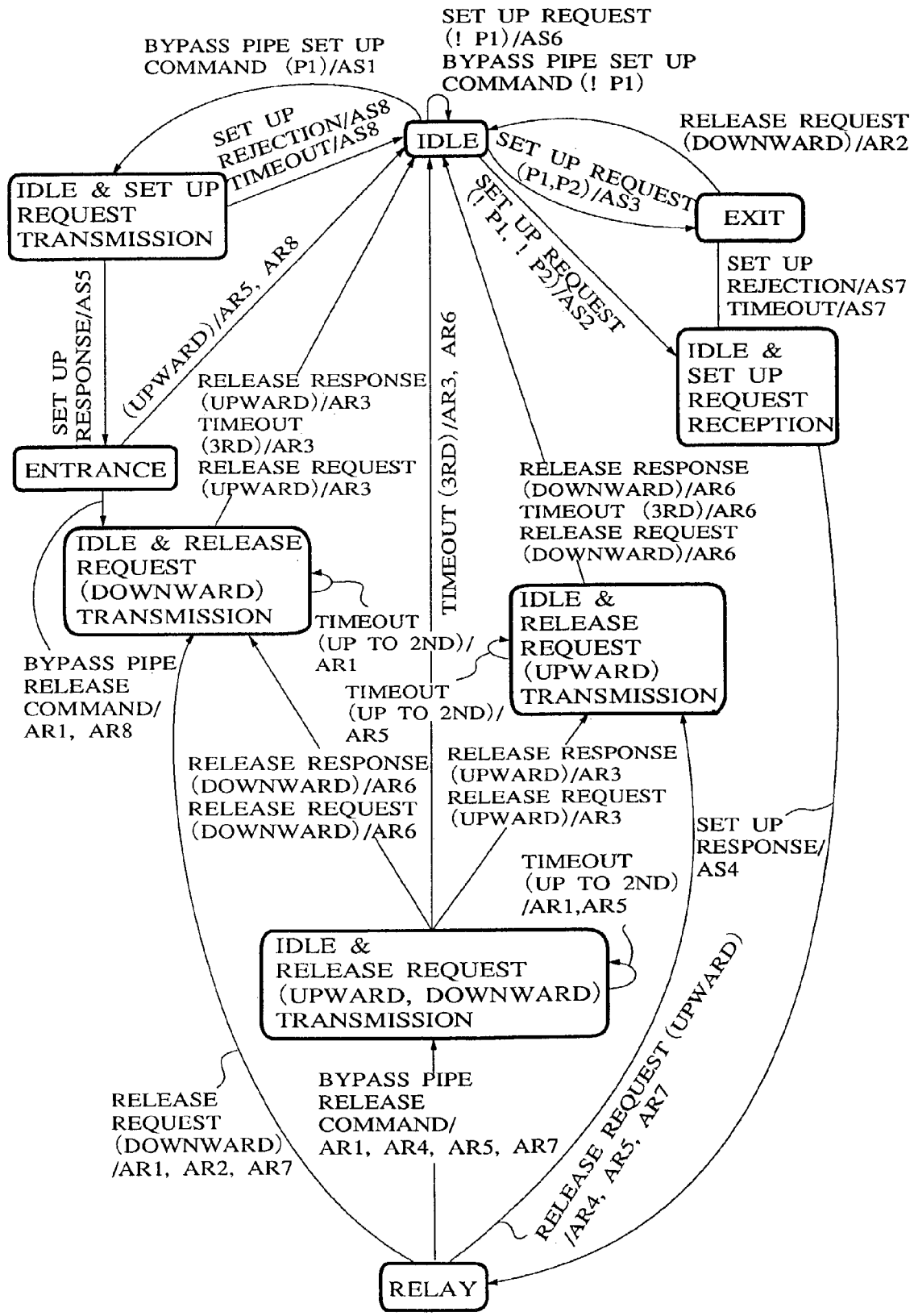
FIG. 22 is a state transition diagram summarizing procedures and internal operations for bypass pipe set up and release using a hard state scheme in the ATM network of FIG. 1.

The procedures and the internal operations for the bypass pipe set up and release described above can be summarized in terms of the state transitions inside the router as shown in FIG. 22. It is to be noted that, in the above description, the procedures and the internal operations for the bypass pipe set up and release have been described only for a normal case in which the packet reaches without a failure. However, in practice, there is also a possibility for the packet to be lost. For this reason, a timer is activated whenever the request message is transmitted, such that when there is no response to that message within a prescribed period of time (i.e., a case of timeout), a new operation is to be carried as indicated in FIG. 22.

In FIG. 22, each node (enclosure) represents the internal state of the router, and there are nine internal states altogether. The solid lines with arrows among these internal states represent the state transitions. Each solid line with an arrow is accompanied by the indication of an event causing that state transition and an operation at that time. For instance, when the bypass pipe set up command arrives in the "idle" state, the internal state is changed to the "idle & set up request transmission" state, and the operation AS1 is carried out. Also, in FIG. 22, "!P1" and "!P2" indicate negations of the above described conditions P1 and P2, i.e., cases in which the conditions P1 and P2 do not hold, respectively.

It is to be noted here that, although not depicted in this state transition diagram of FIG. 22, in practice, when the router is in any of the "entrance" state, the "relay" state, and the "exit" state, whether the bypass pipe is connected is checked regularly, and it is necessary to return to the "idle" state whenever the bypass pipe is not connected.

Next, with references to flow charts of FIGS. 23 and 24, an exemplary bypass pipe set up procedure using control message exchanges in an exemplary situation shown in FIG. 25 will be described.

Figure 25:
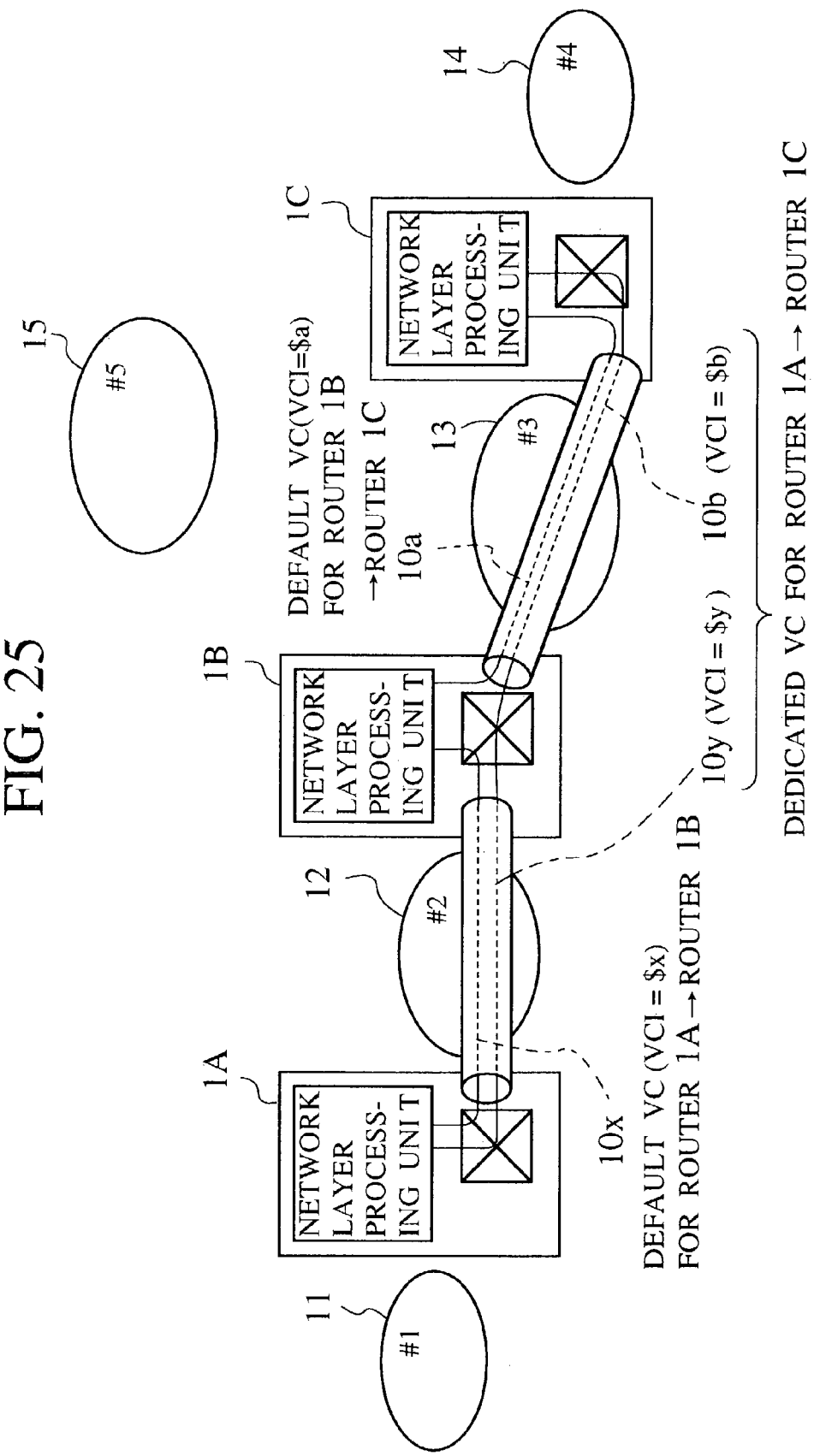
FIG. 25 is a schematic block diagram showing an exemplary situation used in explaining an exemplary bypass pipe set up procedure using control message exchanges.

In FIG. 25, ATM-LANs 11 to 15 (#1 to #5) are internetworked by routers 1A, 1B, and 1C having network layer processing units, where each network layer processing unit corresponds to the network layer processing unit 35 in a configuration of FIG. 5. In this example, there are a default VC 10x with VCI=$x between the router 1A and the router 1B and a default VC 10a with VCI=$a between the router 1B and the router 1C, and a bypass pipe formed by a dedicated VC 10y with VCI=$y and a dedicated VC 10b with VCI=$b is to be set up from the router 1A to the router 1C.

First, when the bypass pipe set up request is recognized (step S2001), the router 1A looks up the internal routing table (step S2002) and transmits the bypass pipe set up request message to a next stage router 1B (step S2003) in order to set up the dedicated VC between this router 1A and the next stage router 1B. Here, the bypass pipe set up request message is to be transferred hop by hop between the neighboring routers, so that it is always transmitted through the default VC between the neighboring routers.

In this embodiment, the VP pipe is established between the neighboring routers, and the default VC and the dedicated VC to be used for the datagram transfer are both contained in this VP. In this case, the bypass pipe set up request message contains at least (1) the IP address of the start point router, (2) the IP address of the end point router, and (3) the VCI value desired to be used within the VP pipe.

For example, in a case the router 1A desires to establish the bypass pipe, the router 1A captures the VCI value "$y" of the dedicated VC within the VP between this router 1A and the router 1B, and transmits the datagram via that dedicated VC (step S2004).

Here, the router 1A may start the transmission of the datagram toward the router 1C through this VC with VCI=$y immediately, or at a certain period of time after the sending of the message, or after a message reception acknowledgement is received from the router 1B side in some way. As will be described below, in any of these cases, this VC has the network layer processing unit in a middle of the route as the receiving target, so that even if this VC is not connected with the end point router end-to-end, it is possible to transmit the datagram through this VC. At this point, VCI=$y is going to be registered as the destination datalink layer identifier (VPI/VCI value in this embodiment) of the router 1C on the routing table within the router 1A. Here, however, the metric value remains unchanged and does not decrease even when the dedicated VC is established.

The router-B receives the bypass pipe set up request message through the default VC between the router 1A and the router 1B as described above (step S2005). By means of this message, the router-B can recognize the fact that "it is requested to establish this VC with VCI=$y as the bypass pipe to the router 1C in the VP containing the default VC". At this point, the L2 routing table of the datalink layer switch unit 202 within the router 1B may be set up such that the connection target of this VC with VCI=$y is set as the network layer processing unit within the router 1B, or the connection target may be as the network layer processing unit within the router 1B for all VCI values within the VP in advance at a time of the VP establishment (step S2006). At this point, the VC with VCI=$y in this VP is connected to the network layer processing unit within the router 1B so that it is not ATM transfer, but it is possible even at this point to transmit the datagram through this VC to reach the router 1C eventually.

Next, with regard to the end point router of the bypass pipe set up request message, the network layer processing unit of the router 1B searches the next hop router by looking up its own routing table (step S2007). In a case this router 1B is the relay router (step S2008 NO), the router 1B selects the next hop router which is the router 1C by looking up the routing table (step S2009). Then, the router 1B captures a still unused VCI value ($b for example) in the VP between this router 1B and the router 1C, and transmits the bypass pipe set up request message through the default VC to the next hop router 1C by rewriting the desired VCI value of the above (3) to $b (step S2010).

Here, at the router 1B, it is possible to generate the dedicated VC by directly connecting this VC and the VC with VCI=$y in the VP between the router 1A and the router 1B at the ATM layer. Here, the direct connection at the ATM layer is realized by directly setting up the header conversion table of the add/drop and header conversion unit 32 as described above in a case the network layer processing unit which received the bypass pipe set up request message itself is the two port router, or by directly setting up the the switch table in the switch input/output processing unit as described above in a case the network layer processing unit which received the bypass pipe set up request message itself is the multi-port router, or by directly issuing the primitive for the set up to the processing function governing the table set up (step S2011). One of the feature of the present invention lies in this point.

This table set up may be carried out immediately after the reception of the bypass pipe set up request message, or at a certain period of time after the message has been sent out to the next stage router, or after a message reception acknowledgement is received from the next stage router in some way.

FIG. 25 shows a situation (intermediate state) of the default VC and the dedicated VC for the datagram transfer using the router 1A as the start point after the above described procedure has been carried out.

Up to now, the procedure for setting up or releasing a bypass pipe using a hard state scheme has been described according to the control message sequences as outlines in parts (b) and (e) of FIG. 13. Alternatively, it is also possible to carry out the set up or the release of a bypass pipe according to the control message sequences as outlined in parts (c) (set up-2) and (d) (release-1) of FIG. 13, where a part (c) of FIG. 13 shows a control message sequence for the set up which is similar to that of a part (e) of FIG. 13 for the release as described above, while a part (d) of FIG. 13 shows a control message sequence for the release which is similar to that of a part (b) of FIG. 13 for the set up.

More specifically, the control message sequence as outlined in a part (c) of FIG. 13 is a case in which the bypass pipe is set up step by step using sequential exchange of the bypass pipe set up request message and the bypass pipe set up response message between each neighboring routers.

In this case, when the router-A requests the setup of the bypass pipe, the router-A transmits the bypass pipe set up request message to the router-B. In response, if the set up of the requested bypass pipe is to be permitted, the router-B transmits the bypass pipe set up response message to the router-A. By means of this, the router-A can recognize that the dedicated VC has been set up between the router-A and the router-B, so that the router-A makes the setting to transmit the data packets through this newly set up dedicated VC. At this point, the dedicated VC has not been set up beyond the router-B yet, so that the router-B carries out the conventional network layer transfer to the router-C.

Next, the router-B determines whether to set up the bypass pipe between this router-B and the next stage router-C as well, and in a case of setting up such a bypass pipe the router-B transmits the bypass pipe set up request message to the router-C. Then, when the bypass pipe set up response message from the router-C is received, the router-B makes the setting to carry out the datalink layer transfer within this router-B between the dedicated VC for the packet transfer from the router-A to the router-B and the dedicated VC for the packet transfer from the router-B to the router-C. By means of this, the bypass pipe has been set up from the router-A to the router-C, and the transfer at the router-B can be switched from the conventional network layer transfer to the faster datalink layer transfer.

Here, whether or not to transmit the bypass pipe set up request message to a next stage router can be determined by manners similar to those for determining a timing for bypass pipe set up/release which will be described in detail below.

By repeating the similar operation at the router-C as well, it is possible to set up the bypass pipe from the router-A to the router-D.

Bypass Pipe Set Up/Release Procedure (Soft State)

Next, a procedure for setting up or releasing a bypass pipe using a soft state scheme in this embodiment will be described in detail.

In short, this scheme operates as follows. In this scheme, the transmitting side router can transmit the bypass pipe set up request message regularly at a certain time interval. Then, the router at an intermediate stage of the bypass pipe is given a time-out value for the bypass pipe, such that this time-out value is reset by the reception of the bypass pipe set up request message, for example. By means of this, it is possible to prevent the bypass pipe that is no longer used from being left as a garbage. Alternatively, the router at an intermediate stage of the bypass pipe can monitor a presence or absence of the cell traffic in each bypass pipe, and when there is no traffic in some bypass pipe over a certain period of time, it judges that this bypass pipe is no longer used and resets this bypass pipe, i.e., changes the reception target of the VC constituting that bypass pipe to the router processing unit within this router and resets the information concerning the transmission source and the reception target for that VC. In this manner, the similar effect as described above can also be achieved.

Here, it is not necessary for the bypass pipe set up request message to carry a set up request for just one bypass pipe per one message, and it is possible for a single message to carry set up requests for a plurality of bypass pipes. In general, a number of bypass pipes can trace the identical route in a course of reaching to their respective end point routers, so that it is useful to carry set up requests for a plurality of dedicated VCs in the bypass pipe set up request message from viewpoints of the reduction of the traffic and the ease of the management. In particular, in a case of requesting the set up of a plurality of bypass pipes at once as in a case of the abnormality to be described below, this scheme is also useful in preventing the occurrence of the congestion at the CPU within the router and the network.

Now, the bypass pipe set up/release procedures in this scheme will be described in detail.

In an exemplary case in which a router-A commands set up/release of a bypass pipe from a router-A to a router-D through a router-B, a router-C, and ATM-LANs provided between routers as shown in a part (a) of FIG. 26, there are two possible outlines for a control message sequence to be used at a time of set up as indicated in parts (b) and (c) of FIG. 26, and two possible outlines for a control message sequence to be used at a time of release as indicated in parts (d) and (e) of FIG. 26.

Here, a case of using the control message sequence as outlined in a part (b) (set up-1) of FIG. 26 which is the receiver initiative soft state type bypass pipe control protocol will be described in detail first. In this case, the bypass pipe management table of FIG. 18C described above should be modified to include an additional "previous router" field for registering an IP address of a previous stage router, which is to be registered at a time of receiving the path message, and to be utilized in determining a path of the bypass pipe.

In this case, the router-A regularly transmits a path message toward the router-D in order to permit the bypass pipe up to the router-D and notify the path of the bypass pipe to the intermediate routers. Each of the router-B and the router-C which are the intermediate routers in this example transfers this message to its next stage router, while registering the IP address of its previous stage router into the previous router field of the bypass pipe management table in order to record the path. Thus, the router-B registers the IP address of the router-A, and the router-C registers the IP address of the router-B, while the router-D which received the path message registers the IP address of the router-C into the previous stage router field of the bypass pipe management table.

When the router-D wishes to utilize the bypass pipe, the router-D transmits a reservation message to the address registered in the previous stage router field of the bypass pipe management table, which is the router-C in this example. IN the bypass pipe management table, the dedicated VC to be used as the bypass pipe is registered in the input side. This reservation message is transmitted regularly, and a timer T1 (not shown) is activated whenever this reservation message is transmitted, such that the same message is transmitted again when this timer indicates the time-out.

When the reservation message is received from the router-D, the router-C checks the condition P3: this router is not the first router of the bypass pipe. When this condition P3 is checked, the router-C transmits the reservation message to the previous stage router-B, while rewrites the ATM routing table to enable the ATM transfer between the dedicated VC from the router-B to the router-C and the dedicated VC from the router-C to the router-D. In addition, the router-C registers the dedicated VCs into the input side and the output side of the bypass pipe management table, and activates a timer T2 (now shown) in order to monitor the fact that the reservation message is regularly transmitted.

The router-B operates similarly as the router-C, and transfers the reservation message to the router-A. When the reservation message is received from the router-B, the router-A recognizes that it is the first router of the bypass pipe by checking the condition P3, and registers the dedicated VC to the output side of the bypass pipe management table, while changing the IP routing table and the IP-VC correspondence table. Then, the router-A activates the timer T2 in order to monitor the fact that the reservation message is regularly transmitted. By means of these operations, the bypass pipe from the router-A to the router-D can be set up.

A case of using the control message sequence as outlined in a part (c) (set up-2) of FIG. 26 which is the sender initiative soft state type bypass pipe control protocol can also be realized similarly as in a case of the receiver initiative soft state type bypass pipe control protocol described above.

As for the bypass pipe release procedure in this scheme, there are two methods including a method for sending an explicit release message, and a method for releasing the bypass pipe when the timer indicates the time-out as the regularly transmitted reservation messages stop arriving. The control message sequences as outlined in a part (d) (release-1) and a part (e) (release-2) of FIG. 26 belong to the former method of sending an explicit release message.

In a case of a part (d) of FIG. 26 for releasing from the router-A side, the router-A changes the internal state from the "entrance" state to the "idle" state. Then, the router-A deletes the output side of the bypass pipe management table as well as the virtual next stage router from the IP-VC correspondence table and the IP routing table, and stops the timer T2. Then, the router-A notifies the release explicitly to the router-B by sending the release message.

When the release message is received from the router-A, the router-B changes the internal state from the "relay" state to the "idle" state. Then, the router-B deletes the dedicated VC related to the bypass pipe to be released from the input side and the output side of the bypass pipe management table, rewrites the ATM routing table in order to stop the ATM transfer, and stops the timer T2. Then, the router-B sends the release message to the next router-C.

The router-C operates similarly as the router-B, and sends the release message to the router-D.

When the release message is received from the router-C, the router-D changes the internal state from the "exit" state to the "idle" state. Then, the router-D deletes the input side of the bypass pipe management table, and stops the timer T1.

A case of a part (e) of FIG. 26 for releasing from the router-D side can also be realized similarly as in a case of a part (d) of FIG. 26 described above.

In this case, the router-D changes the internal state from the "exit" state to the "idle" state, and sends the release message to the router-C. Then, the router-D deletes the input side of the bypass pipe management table, and stops the timer T1.

When the release message is received from the router-D, the router-C changes the internal state from the "relay" state to the "idle" state, deletes the input side and the output side of the bypass pipe management table, and rewrites the ATM routing table. Then, the router-C sends the release message to the router-B, and stops the timer T2.

The router-B operates similarly as the router-C, and sends the release message to the router-A.

When the release message is received from the router-B, the router-A changes the internal state from the "entrance" state to the "idle" state. Then, the router-A deletes the output side of the bypass pipe management table as well as the virtual next stage router from the IP-VC correspondence table and the IP routing table, and stops the timer T2.

In the above, a case of explicit release has been described, but there is also a case in which the release message packet is lost in a middle, so that it is necessary to make it possible to release the bypass pipe by using a local timer. Namely, the reservation message is to be regularly transmitted from the exit router while the bypass pipe is active, so that when it is recognized that the reservation message has stopped arriving, the bypass pipe can be released.

To this end, each router has the timer T2, which is reset whenever the reservation message arrives. When the reservation message has stopped arriving and this timer T2 indicates the time-out, the router changes the internal state to the "idle" state, and deletes the bypass pipe management table along with the ATM routing table, the IP routing table, and the IP-VC correspondence table relates to this bypass pipe.

Figure 27:
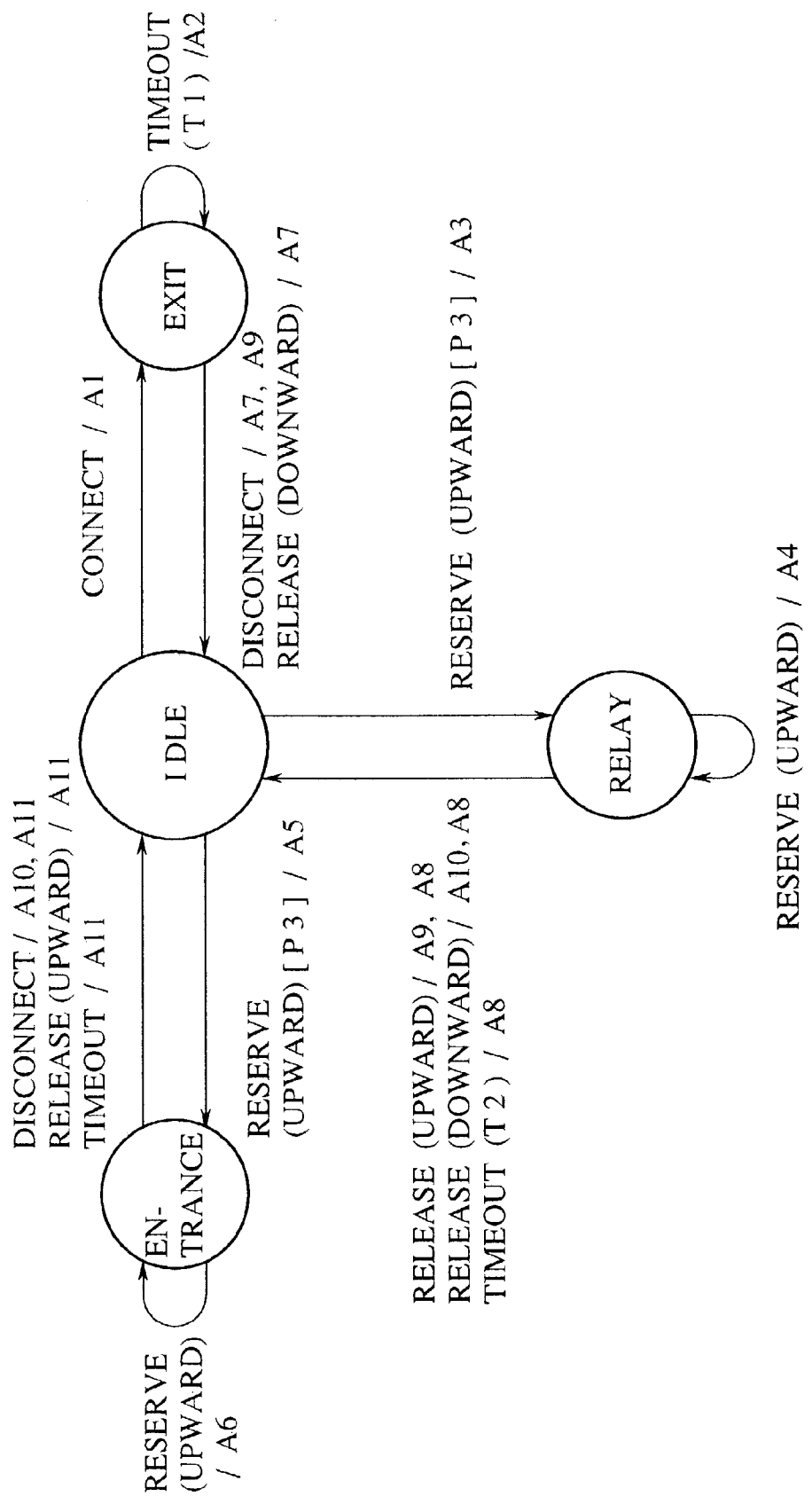
FIG. 27 is a state transition diagram summarizing procedures and internal operations for bypass pipe set up and release using a receiver initiative soft state scheme in the ATM network of FIG. 1.

The procedures and the internal operations for the receiver initiative soft state type bypass pipe set up and release described above can be summarized in terms of the state transitions inside the router as shown in FIG. 27.

In FIG. 27, each node (circular enclosure) represents the internal state of the router, and there are four internal states altogether. The solid lines with arrows among these internal states represent the state transitions. Each solid line with an arrow is accompanied by the indication of an event causing that state transition and an operation at that time. Here, each operation is indicated in an abbreviated format of "A(numeral)" whose content is specified in a table shown in FIG. 28 similar to the table of FIG. 17 described above.

Figure 29:
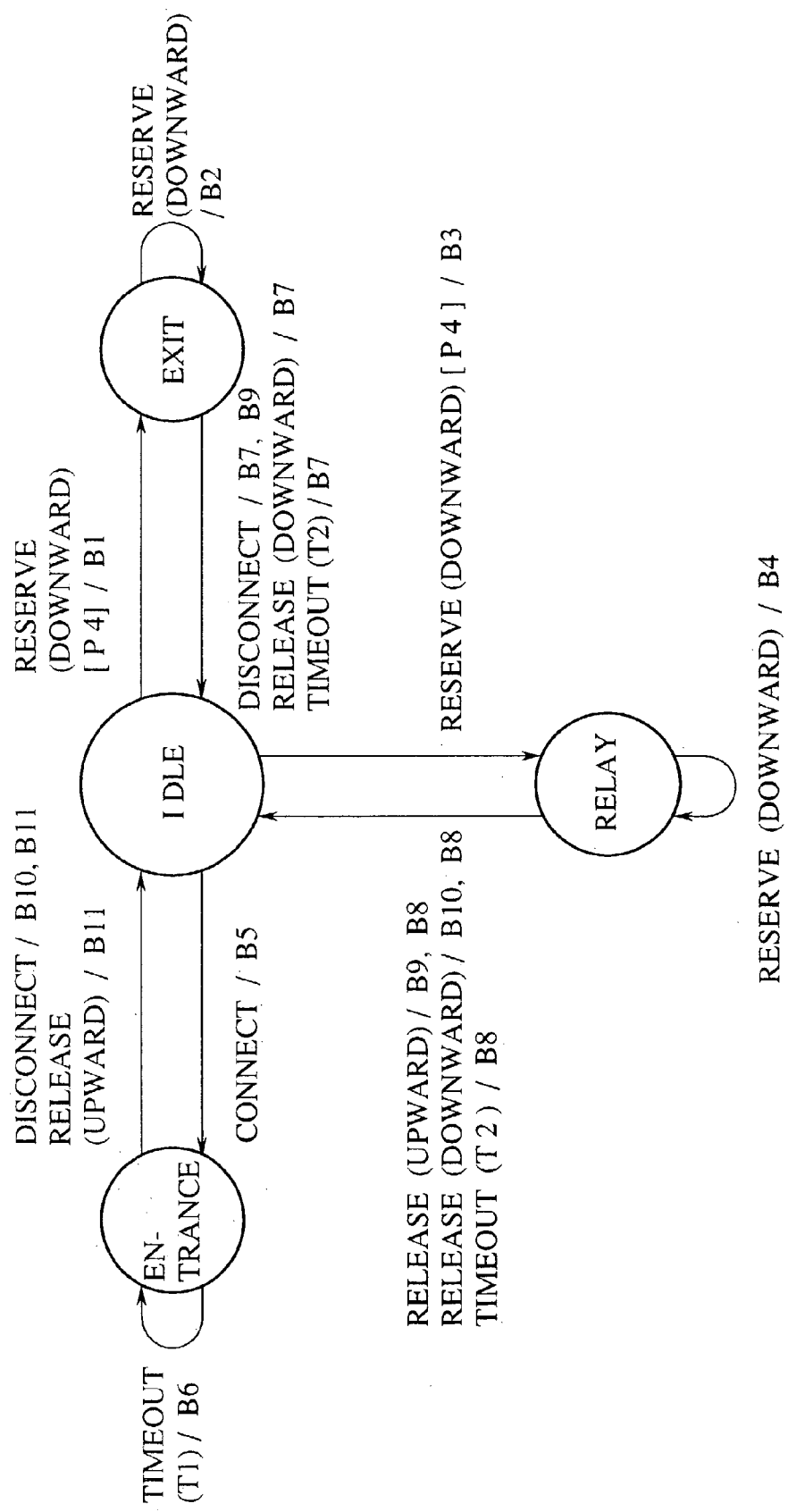
FIG. 29 is a state transition diagram summarizing procedures and internal operations for bypass pipe set up and release using a sender initiative soft state scheme in the ATM network of FIG. 1.

Similarly, the procedures and the internal operations for the sender initiative soft state type bypass pipe set up and release described above can be summarized in terms of the state transitions inside the router as shown in FIG. 29 similar to the state transition diagram of FIG. 27. Here, each operation is indicated in an abbreviated format of "B(numeral)" whose content is specified in a table shown in FIG. 30 similar to the table of FIG. 17 described above.

Figure 31:
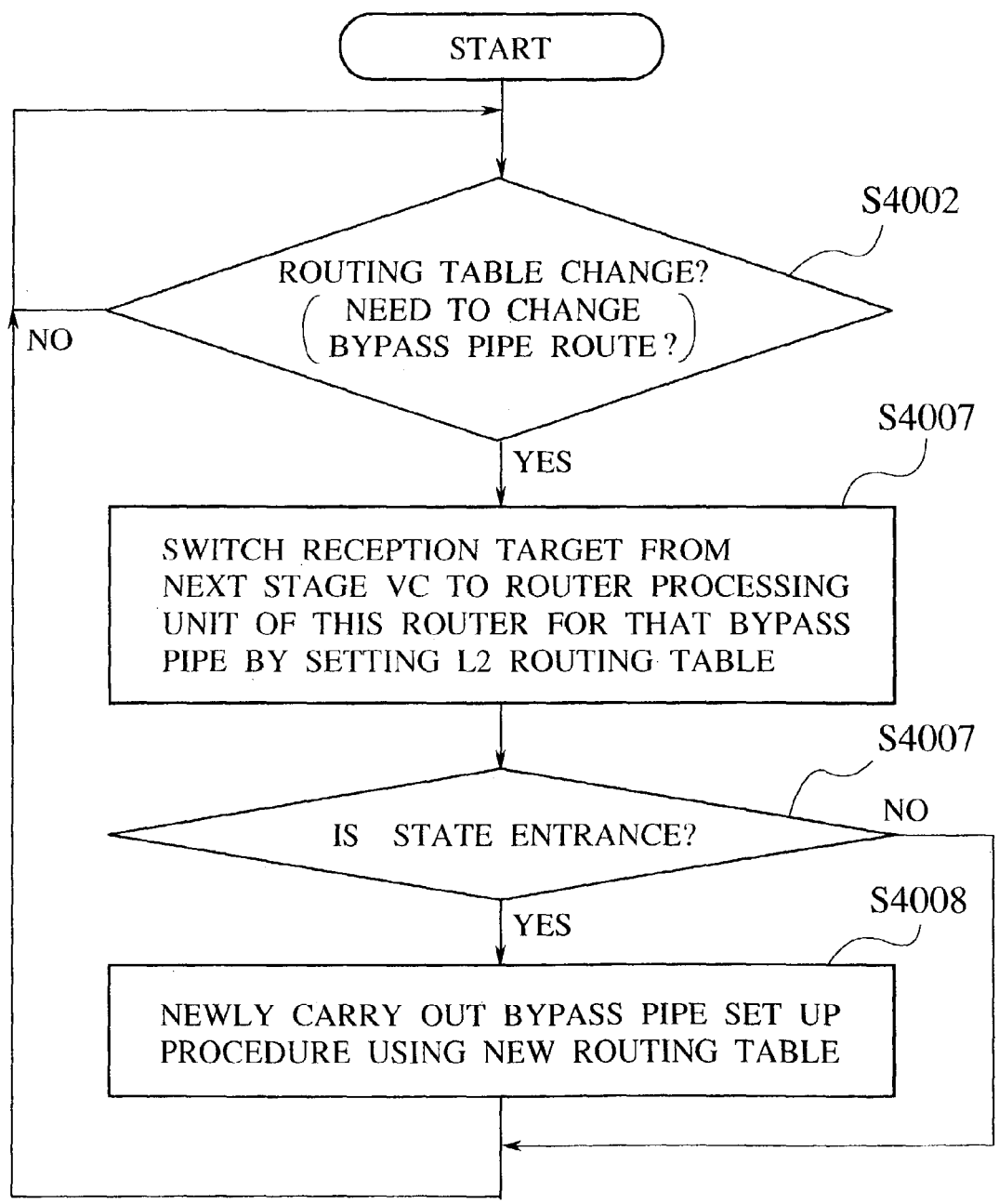
FIG. 31 is a flow chart showing an operation of a router in the ATM network of FIG. 1 in a case of a change in the routing table due to the routing protocol operation.

Next, with reference to the flow chart of FIG. 31, the operation of the router in a case of a change in the routing table of the router due to the routing protocol operation will be described. Here, the change of the routing table includes a case corresponding to a change of the topology of the internet environment, a case corresponding to a change of the metric value that can happen in a case of an abnormality such as the breakdown of an intermediate router or ATM-LAN, etc.

In the following, a case in which the bypass pipe route is changed will be described. In this case, the change of the routing table is handled as follows.

For the neighboring router, when the router processing unit of the router recognizes an occurrence of an abnormality such as a case in which the routing information that is supposed to be transmitted regularly fails to arrive, or a case in which a calculation result of the metric value has increased (step S4002), this router processing unit rewrites the L2 routing table for the dedicated VC connected toward that neighboring router, to make this router processing unit itself as the reception target of that VC (step S4004). Consequently, as for the datagram received from that VC which had been the dedicated VC until then, the transfer is continued according to this updated routing table in that router processing unit.

Here, if this dedicated VC becomes out of use as the routing information according to the existing routing protocol such as RIP is transmitted toward the upstream side of this dedicated VC, and the routing route has changed subsequent to the recognition of the abnormality on the upstream side, the registered information on this dedicated VC will be eventually deleted within a certain period of time by the time-out, etc. caused as the bypass pipe set up request message that is supposed to be transmitted regularly fails to arrive, or as the traffic stops existing in that VC.

On the other hand, when the "entrance" state router recognized the change of the routing table (step S4002 YES and step S4007 YES), the bypass pipe set up request message is issued according to the newly rewritten routing table in this router. Thereafter, the bypass pipe set up procedure is carried out again according to the procedure of FIGS. 23 and 24 described above, for example (step S4008). Then, the datagram can be transmitted through this newly set up bypass pipe.

At a time of the breakdown of the network or the router at an intermediate stage, the changes can occur in a plurality of routing tables at once, so that the bypass pipe setup request message to be newly issued makes a plurality of set up requests for the bypass pipes in an identical direction simultaneously within this message. By means of this, it is possible to reduce a number of bypass pipe set up request message packets within the network, while the processing function (such as CPU) within the router for handling this message can handle these requests within this single message, so that it is also possible to reduce a processing load and achieve a quick recovery.

It is to be noted that a case of explicitly sending the bypass pipe set up request message has been described above, but it is also possible for the start point router to immediately start transmitting the datagram through an unused VC of the new route. In this case, the algorithm of FIGS. 40 and 41 to be described below is going to be employed.

Bypass Pipe Set Up Procedure (In-Band)

Next, a procedure for setting up or releasing a bypass pipe using an in-band scheme for handling the control messages will be described in detail. In this scheme, the control packet for commanding the bypass pipe set up/release os transferred through the dedicated VC to be used as a constituent element of that bypass pipe itself, that is, the data packet and the control packet are transferred by the identical dedicated VC.

Figure 32:
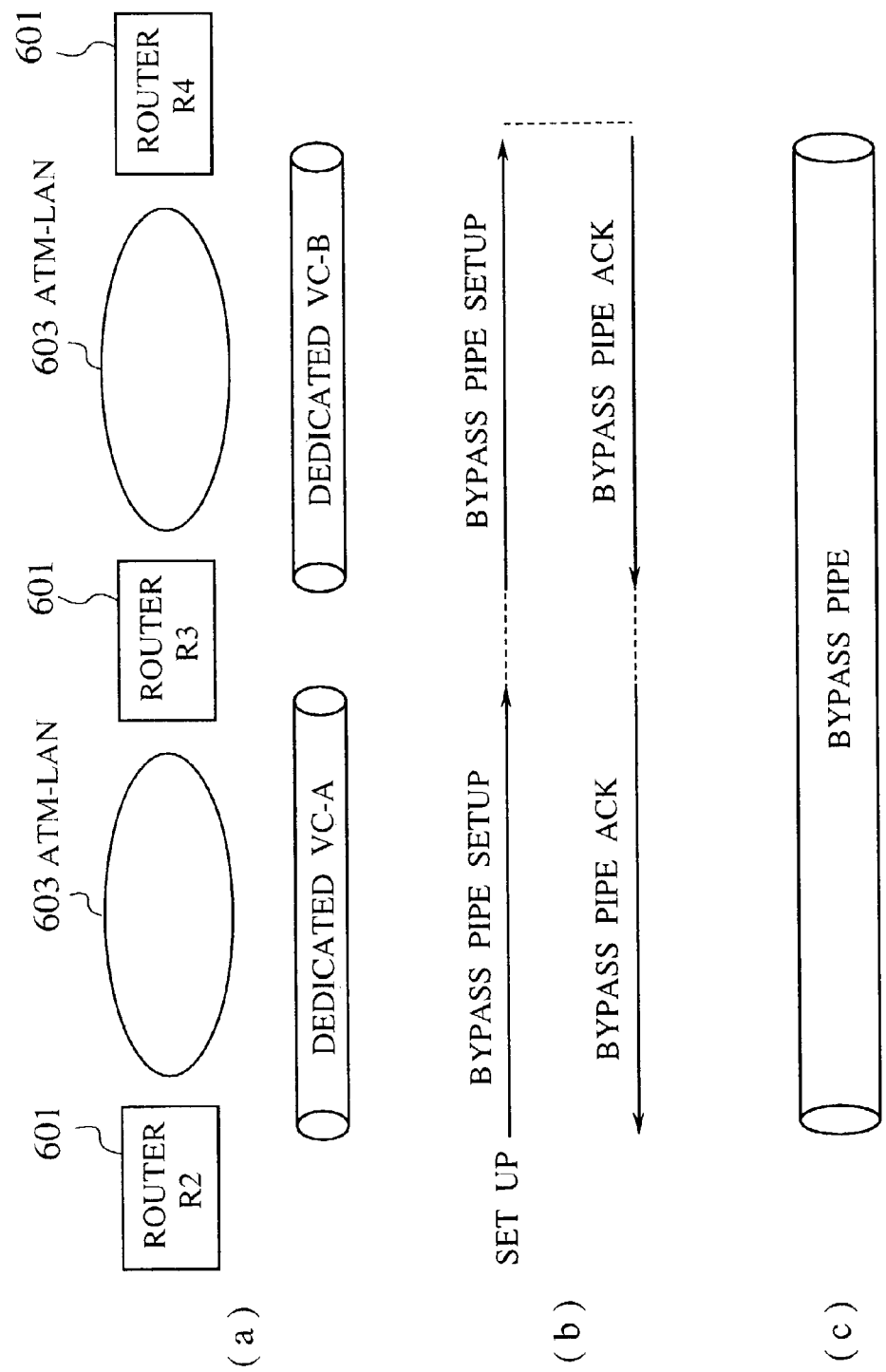
FIG. 32 is a diagram showing an outline of a procedure for setting up a bypass pipe using a in-band scheme in the ATM network of FIG. 1.

FIG. 32 shows a control message sequence for the bypass pipe set up in this scheme, for an exemplary case of setting up the bypass pipe from the router R2 to the router R4 through the router R3 and the ATM-LANs between the routers as indicated in a part (a) of FIG. 32. In this case, as indicated in a part (b) of FIG. 32, at a time of the bypass pipe set up, the router R2 for commanding the set up of the bypass pipe from the router R2 to the router R4 transmits the "Bypass Pipe Setup" message to the router R3 through the dedicated VC-A. When this "Bypass Pipe Setup" message is received from the router R2, the router R3 transmits the "Bypass Pipe Setup" message to the router R4 through the dedicated VC-B. In response, the router R4 transmits the "Bypass Pipe Ack" message to the router R3 through the dedicated VC-B, and then the router R3 transmits the "Bypass Pipe Ack" message to the router R2 through the dedicated VC-B. By means of these operation, the bypass pipe from the router R2 to the router R4 as indicated in a part (c) of FIG. 32 is established.

As for the bypass pipe release, the cell flow is monitored at each router, and the bypass pipe is released by the judgement of each router using appropriate timer in this scheme.

Case of Using SVC

Up to this point, it has been assumed that the VC is given in a form of a PVC. However, it is also possible for the VC to be given in a form of an SVC (Switched Virtual Channel).

In a case of using the SVC, the bypass pipe set up procedure can be realized in any of the following four methods.

(1) After the ATM signaling is completed, the control messages are transmitted in the same direction by the same procedure as in a case of using the PVC described above.

(2) After the control messages are transmitted, the ATM signaling is carried out in an opposite direction.

(3) After the ATM signaling is completed, the control messages are transmitted in an opposite direction.

(4) The bypass pipe set up message is embedded into the ATM signaling message.

The method (1) is a method which uses the SVC but the SVC is handled similarly as the PVC by setting up the VC in advance.

It is noted here that it has been assumed in the above description that the default VC and some dedicated VCs are set up for the bypass pipe control in advance, but it is also possible to provide a VP of a prescribed capacity between the routers in advance instead. In such a case, the operations since the VC is established in the VP until the VC is released are the same as a communication scheme utilizing the VC.

In addition, instead of providing the VPs in mesh shape among all the routers in advance, it is also possible to utilize an SVP (Switched VP) in which the VP is connected between the routers by the ATM signaling upon an arrival of the data packet to be communicated (which makes the first VC request between these routers). In this case, the operations since the VP is connected by the ATM signaling until the VP is disconnected is the same as a communication scheme utilizing the VP.

The method (2) is a method which establishes the bypass pipe by using the bypass pipe set up request message. Here, the algorithm is similar to that shown in FIGS. 23 and 24 described above.

In this case, the first stage router generates the bypass pipe set up request message. Then, this message is forwarded to the next stage router by using the default VC according to the routing table provided in the router (steps S2001 to S2004 of FIG. 23).

When this message is received, the router of an intermediate stage establishes the link layer connection (ATM connection in this embodiment) between this router and the previous stage router, while forwarding that message to the next stage router (Steps S2005 to S2010). In addition, the VC established between this router and the previous stage router is connected at the ATM layer with the VC established (by the next stage router) between this router and the next stage router by the setting of the L2 routing table (step S2011 of FIG. 24).

The last stage router establishes the link layer connection between this router and the previous stage router, and sets the router processing unit within this router as the terminal point of that connection (step S2006).

By means of a series of these operations, the bypass pipe can be set up in this method (2). In short, this is a method in which the establishment of the bypass pipe is sequentially requested to the next stage router explicitly by means of the bypass pipe set up request message.

Figure 33:
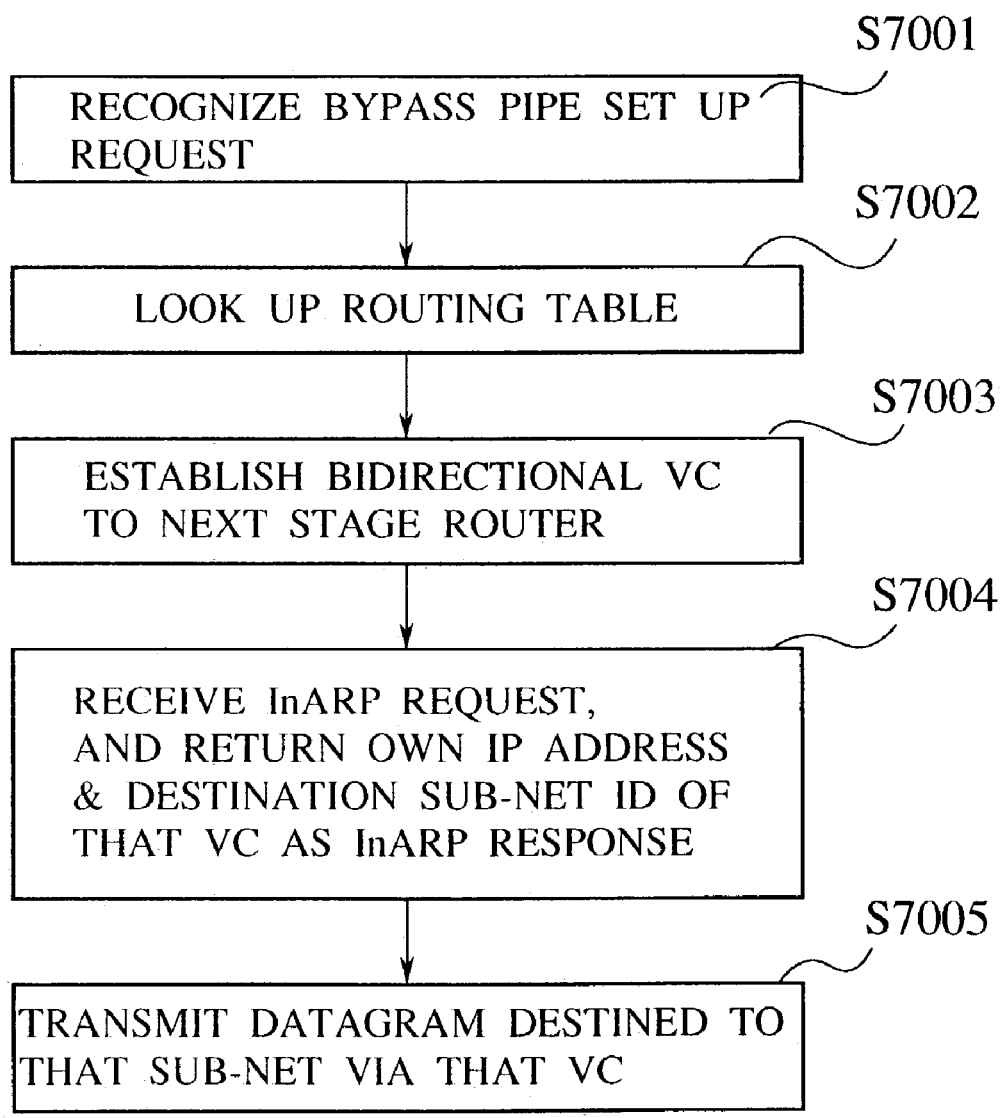
FIG. 33 is a flow chart showing an operation of one router in one method for a bypass pipe set up in a case of using SVC.
Figure 34:
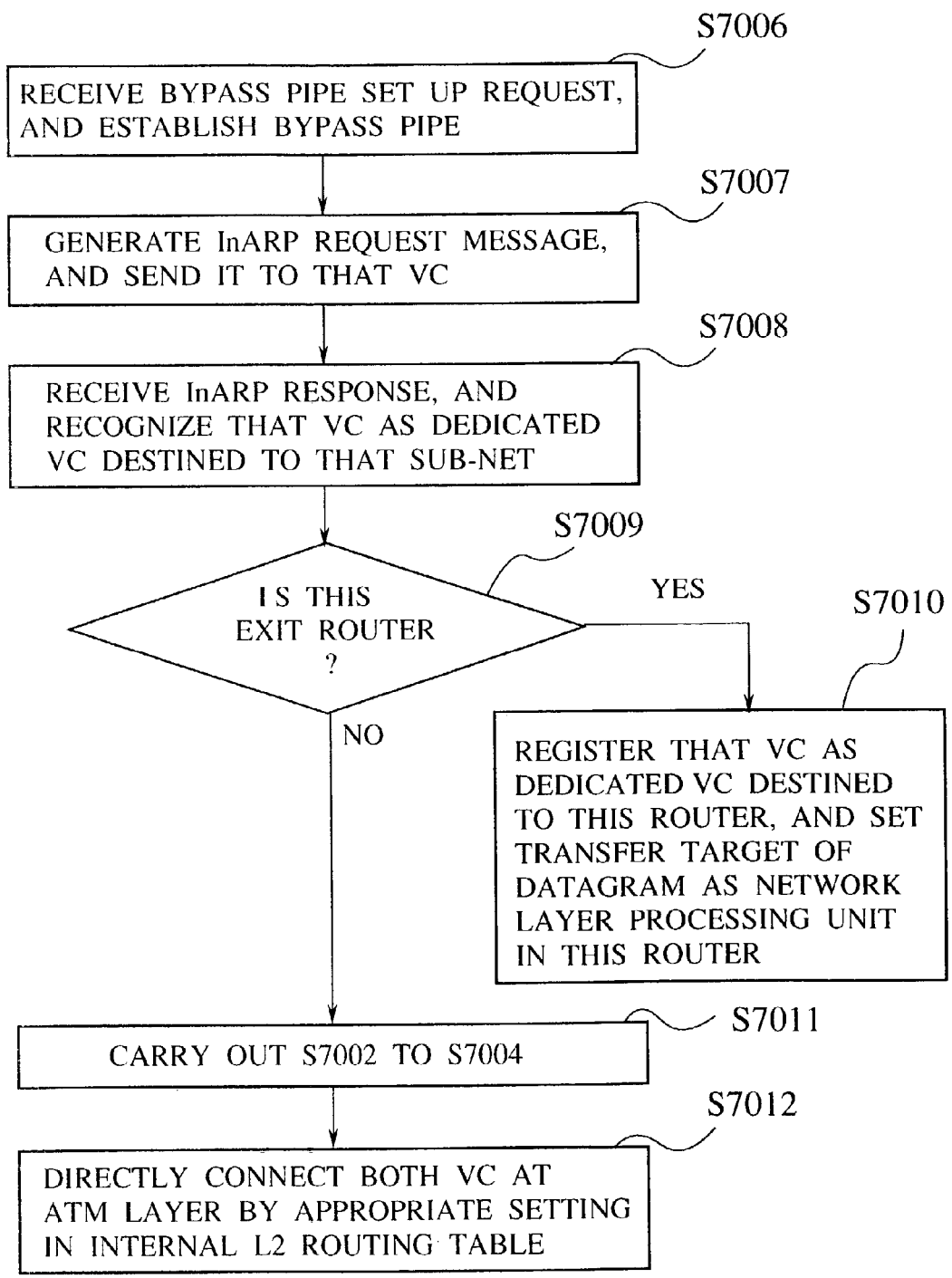
FIG. 34 is a flow chart showing an operation of another router in one method for a bypass pipe set up in a case of using SVC.

The method (3) is a method in which the establishment of the datalink layer connection is carried out by the previous stage router, rather than the next stage router as in the method (2) described above. More specifically, this method can be carried out according to the flow charts of FIGS. 33 and 34 as follows.

When the bypass pipe set up request is recognized, the datalink layer switch unit of the first stage router-A which wishes to establish the bypass pipe recognizes the next stage router by looking up the routing table within that router, and requests the establishment of the bidirectional VC between this router and the next stage router to the ATM-LAN (steps S7001 to S7003). Here, the requested VC is a bidirectional VC because the InARP message to be described below will be transmitted in an opposite direction in which case. At this point, a special message such as the bypass pipe set up request message is not issued.

Then, the intermediate stage router-B receives the bypass pipe set up request from the ATM-LAN in which the sub-net is shared with the previous stage router-A (step S7006). Here, at this point, the use of this VC is unknown and the end point IP address to be the start point of this VC is also unknown, so that the router-B generates the InARP request message and transmits this InARP request message to this VC (step S7007).

Then, when the InARP request message reaches to the router-A, the router-A returns its own IP address as the InARP response message, along with a destination sub-net ID of that VC indicating that it wishes to use this link layer connection (VC) as the dedicated VC between this router and a particular sub-net identified by that sub-net ID either as a part of the InARP response message or as a separate message from the InARP response message, through that VC (step S7004). In the former case, it is necessary to adopt a special format for the InARP response message.

When this InARP response message is received, the router-B recognizes that VC as the dedicated VC for the packets destined to that particular sub-net (step S7008). In addition, by looking up the routing table within that router, the router-B requests the establishment of the VC to the ATM-LAN connected with the next stage router-C (step S7011). Also, when that VC is established and it is recognized by the next stage router that this VC is for the bypass pipe, the VC of the previous stage and this VC are directly connected at the ATM layer by the setting of the L2 routing table within that router, such that these VCs can be passed through by only the ATM layer processing (step S7012).

The final stage router-C recognizes that the VC requested to be set up to it is that for the bypass pipe with this router as the end point (S7008) according to the InARP response message (or a message following the InARP message) by carrying out the above described steps S7006-S7008, and as this router is an "exit" router (step S7009 YES), this router connects that VC to the network layer processing unit within this router (step S7010).

In this case, it should be noted that an ID of the sub-net to be the terminal point of the bypass pipe is entered into the InARP response message (or a separate message).

By means of a series of these operations, the bypass pipe can be set up In this method (3).

It is to be noted that this method (3) uses the bidirectional VC, so that the dedicated VC given in a form of the bidirectional VC is going to be produced. Hence, in order to prevent a plurality of such bidirectional dedicated VC to be set up between any two routers, when one bypass pipe set up procedure is carried out in one direction while another bypass pipe set up procedure is also carried out in an opposite direction simultaneously such that the dedicated VC to the target sub-net has already been established in that one direction by the procedure in the opposite direction at some intermediate stage router, this intermediate stage router may directly connect these VCs at the ATM layer by the setting of the L2 routing table, so as to reduce time required for the bypass pipe set up considerably and simplify the bypass pipe set up procedure.

The method (4) is a method which carries out the bypass pipe set up by utilizing the ATM signaling. Here, for the ATM signaling, the so called well known VC for the ATM signaling is utilized.

Figure 35:
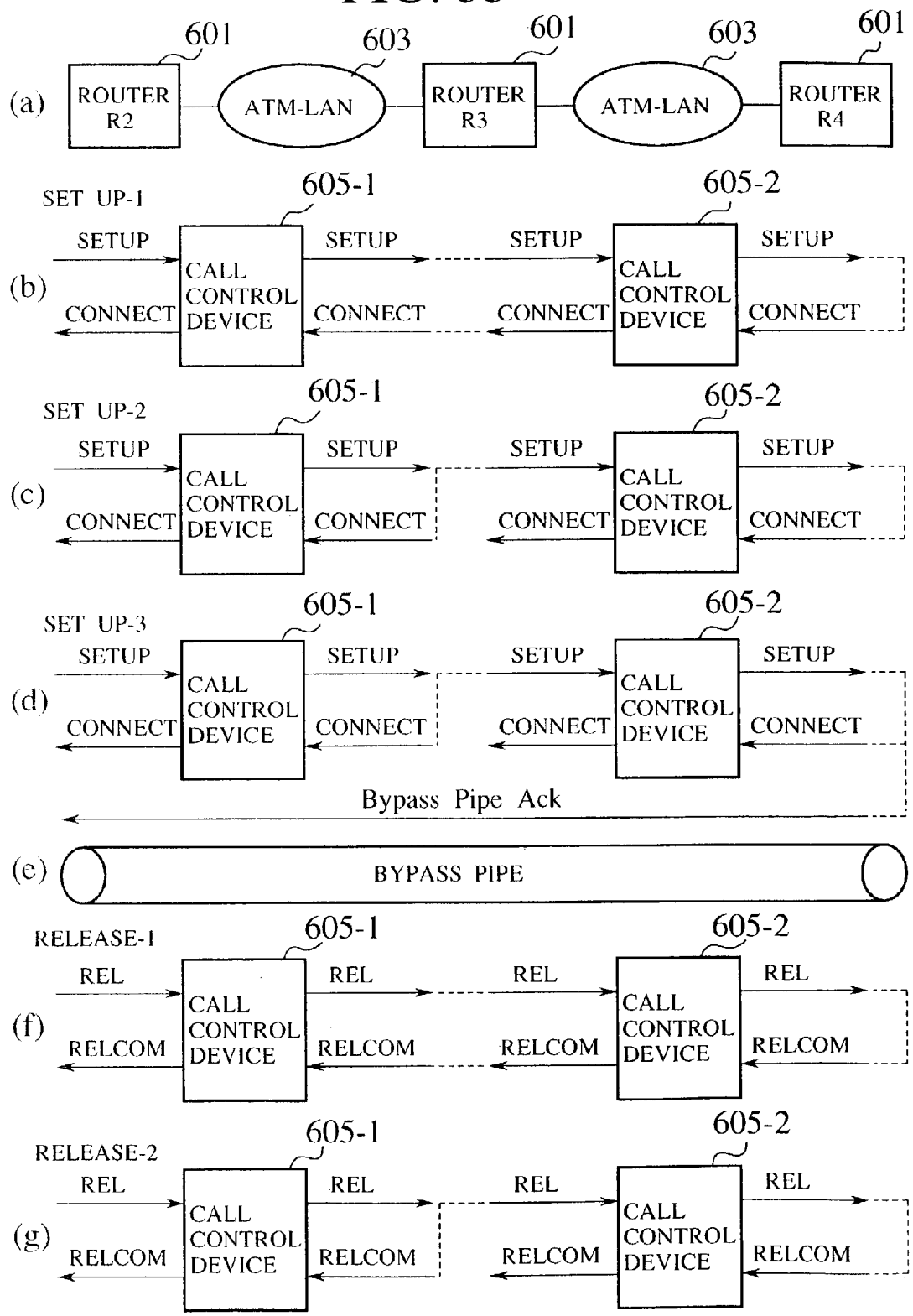
FIG. 35 is a diagram showing possible control message sequences in another method for a bypass pipe set up/release in a case of using SVC.

In FIG. 35, several control message sequences for the bypass pipe set up and release in this method are shown for an exemplary case of setting up or releasing the bypass pipe as indicated in a part (e) of FIG. 35 from the router R2 to the router R4 through the router R3 and the ATM-LANs provided between the routers as indicated in a part (a) of FIG. 35. Here, each ATM-LAN has a call control device 605 for handling the ATM signaling therein.

As the control message sequence for the bypass pipe set up, three sequences are shown in parts (b), (c), and (d) of FIG. 35.

In the set up-1 shown in a part (b) of FIG. 35, the SETUP message of the ATM signaling is sequentially transmitted through the call control devices 605, from the router R2 to the router R3 first, and then from the router R3 to the router R4. After that, the CONNECT message of the ATM signaling is sequentially transmitted through the call control devices 605, from the router R4 to the router R3 first, and then from the router R3 to the router R2. When the CONNECT message is returned to the router R2, the bypass pipe set up is completed.

In the set up-2 shown in a part (c) of FIG. 35, the SETUP message of the ATM signaling is transmitted through the call control device 605-1 from the router R2 to the router R3. When the SETUP message is received from the router R2, the router R3 transmits the SETUP message through the call control device 605-2 to the router R4 while at the same time the router R3 also transmits the CONNECT message through the call control device 605-1 to the router R2. When the SETUP message is received from the router R3, the router R4 transmits the CONNECT message to the router R3. When these CONNECT messages reached to the router R2 and the router R3, respectively, the bypass pipe set up is completed.

In the set up-3 shown in a part (d) of FIG. 35, after the control message sequence similar to the set up-2 described above is carried out, the router R4 transmits the Bypass Pipe Ack message which is an independent control message different from those of the ATM signaling. When this Bypass Pipe Ack message is received at the router R2, the bypass pipe set up is completed.

On the other hand, as the control message sequence for the bypass pipe release, two sequences are shown in parts (f) and (g) of FIG. 35.

The release-1 shown in a part (f) of FIG. 35 is similar to the set up-1 described above in that the REL (release) message of the ATM signaling is sequentially transmitted through the call control devices 605, from the router R2 to the router R3 first, and then from the router R3 to the router R4. After that, the RELCOM (release complete) message of the ATM signaling is sequentially transmitted through the call control devices 605, from the router R4 to the router R3 first, and then from the router R3 to the router R2. When the RELCOM message is returned to the router R2, the bypass pipe is released.

The release-2 shown in a part (g) of FIG. 35 is similar to the set up-2 described above in that the REL message of the ATM signaling is transmitted through the call control device 605-1 from the router R2 to the router R3. When the REL message is received from the router R2, the router R3 transmits the REL message through the call control device 605-2 to the router R4 while at the same time the router R3 also transmits the RELCOM message through the call control device 605-1 to the router R2. When the REL message is received from the router R3, the router R4 transmits the RELCOM message to the router R3. When these RELCOM messages reached to the router R2 and the router R3, respectively, the bypass pipe is released.

It is to be noted that the bypass pipe set up and the bypass pipe release are totally independent operations so that any desired combination of the above described control message sequences for the set up and the control message sequences for the release may be adopted.

Timing for Switching to Bypass Pipe

As for the timing for switching the data packet transfer from the usual IP transfer to the ATM level transfer using the bypass pipe, the following two cases can be considered.

(i) The data packet transfer is switched to that using the bypass pipe after the bypass pipe is set up all the way to the target node.

(ii) The data packet transfer is switched to that using the bypass pipe for any part of the bypass pipe that has been established by then, as the bypass pipe is sequentially set up between each neighboring nodes.

As for the handling of the data packets before the data packets can be transmitted through the bypass pipe, the following two cases can be considered.

(i) The data packets are transferred by using the default VC before the bypass pipe set up is completed.

(ii) the data packets are kept awaiting at an entrance of the bypass pipe until it becomes possible to transfer the data packets through the bypass pipe.

In a case of using the connection-less network layer protocol as in the current IP, either one of the above (i) or (ii) for the data packet transfer switching timing can be used, while it seems preferable to transfer the data packets by using the default VC before the bypass pipe set is completed.

In a case of the connection oriented network layer protocol, however, it seems preferable to transfer the data packets by using the bypass pipe after the bypass pipe set up is completed up to the target node as far as the data packet transfer switching timing is concerned, while it seems appropriate to keep the data packets awaiting at an entrance of the bypass pipe until it becomes possible to transfer the data packets through the bypass pipe as far as the data packet handling before the data packet can be transmitted through the bypass pipe. Here, however, it is assumed that the connection set up request at the network layer level is to be encapsulated within the control message for the bypass pipe set up.

Timing for Bypass Pipe Set Up/Release

Here, the timing for starting the above described bypass pipe set up/release procedure in this embodiment will be explained.

Each node can recognize a need to set up the bypass pipe and transmit the control message in the following situations.

(1) When a statistical value calculated at that node has reached to a prescribed value.

(2) When any of the following messages is received:
 (i) RSVP message (Path message, Reservation message, etc.);
 (ii) ST II message (Connect message, Accept message, etc.);
 (iii) TCP syn or fin message.

(3) When there is an instruction from the application (such as an instruction which requests a securing of a bandwidth or a QoS by an IP layer or an upper layer of the host, for example).

(4) When it is recognized that the bypass pipe has not been set up at a time of packet transmission.

Also, each node can recognize a need to release the bypass pipe in the following situations.

(1) When a statistical value calculated at that node has reached to a prescribed value.

(2) When there is an instruction from the application (such as an instruction which requests a securing of a bandwidth or a QoS by an IP layer or an upper layer of the host, for example).

Here, it is to be noted that, in a case of dealing with the hard state type protocol as in a case of the ST II, the bypass pipe is released only by the explicit release request, whereas in a case of dealing with the soft state type protocol as in a case of the RSVP (Resource Reservation Protocol), in addition to the release of the bypass pipe at a time of receiving the explicit release request, the bypass pipe can also be released by each router on the route individually when each router stops receiving the regularly transmitted bandwidth maintaining request (Refresh message in the RSVP).

Figure 36:
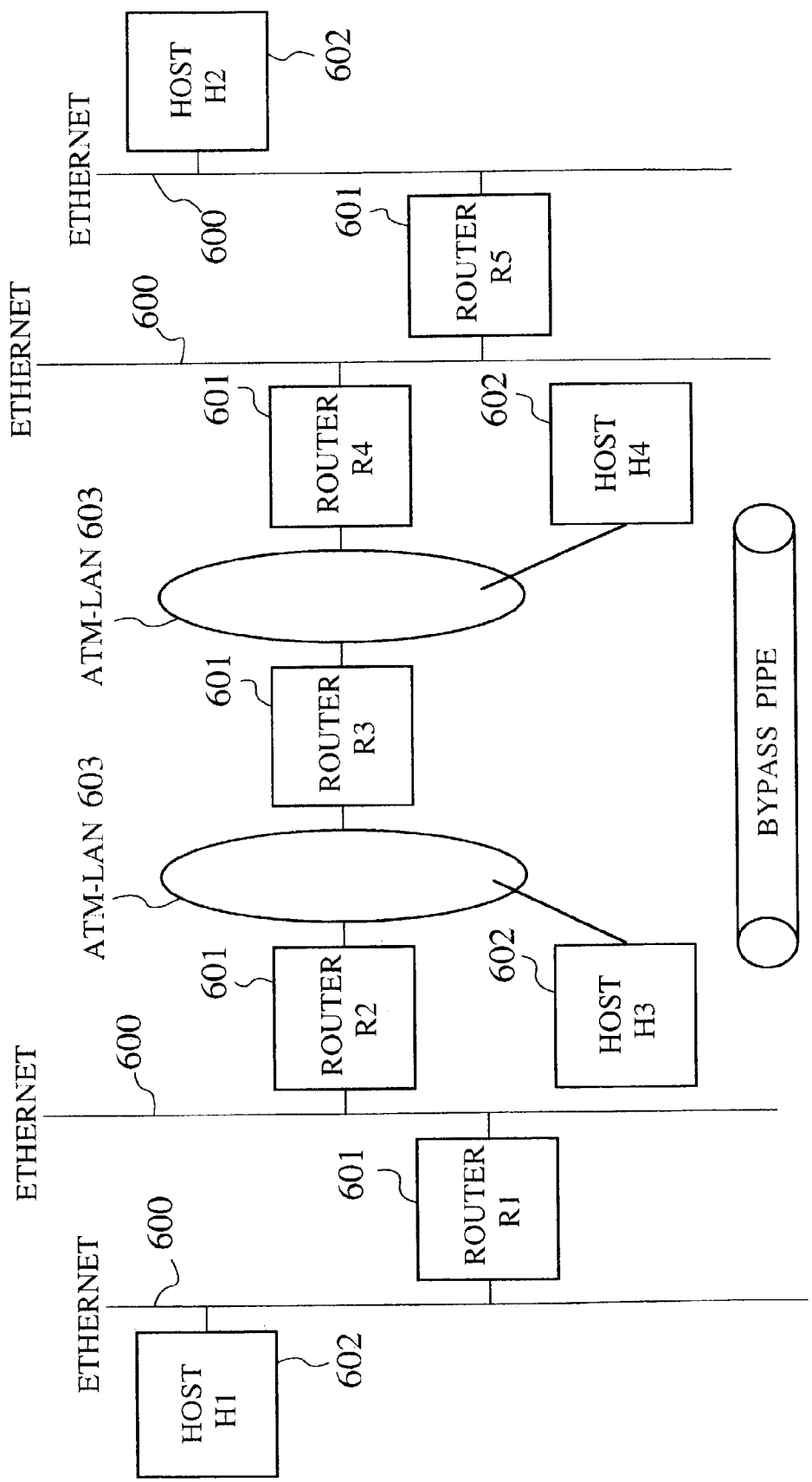
FIG. 36 is a schematic block diagram showing an exemplary configuration for the ATM network of FIG. 1.

Now, with reference to an exemplary configuration shown in FIG. 36, various types of nodes which can utilize the bypass pipe in this embodiment will be explained. Here, for an exemplary case of transmitting the data packet through the bypass pipe from left to right in the figure, the following nodes may have a need to set up the bypass pipe between the router R2 and the router R4.

(1) A non-ATM transmission side host or application (such as the host H1).

(2) An ATM transmission side host or application (such as the host H3).

(3) An initial stage cell switching router (such as the router R2).

(4) An intermediate stage cell switching router (such as the router R3).

(5) A final stage cell switching router (such as the router R4).

(6) An ATM reception side host or application (such as the host H4).

(7) A non-ATM reception side host or application (such as the host H2).

Among them, (1) can be realized in the ST II for example, while (7) can be realized in the RSVP for example. The others can be realized by means of the bypass pipe control messages.

Now, some exemplary cases of the timing for starting the bypass pipe set up procedure will be described in detail.

(A) Case of Using Statistical Information

First, a case of using the statistical information in determining the timing for starting the bypass pipe set up procedure will be described. This function can be realized by the datalink layer connection set up judgement unit 205 in the configuration of FIG. 4 described above.

This datalink layer connection set up judgement unit 205 commands the set up or release of the datalink layer connection according to the statistical information obtained by the network layer switch unit 204, and updates the datalink layer routing table in the datalink layer switch unit 202 to reflect that statistical information. Here, when more packets than a prescribed number are received, transmitted, or transferred, the datalink layer connection is set up and this connection is registered in the datalink layer routing table. Also, when no packet arrives over a prescribed period of time, the datalink layer connection is released, and this connection is deleted from the datalink layer routing table.

More specifically, this operation is carried out according to the flow chart of FIG. 37 as follows.

Figure 37:
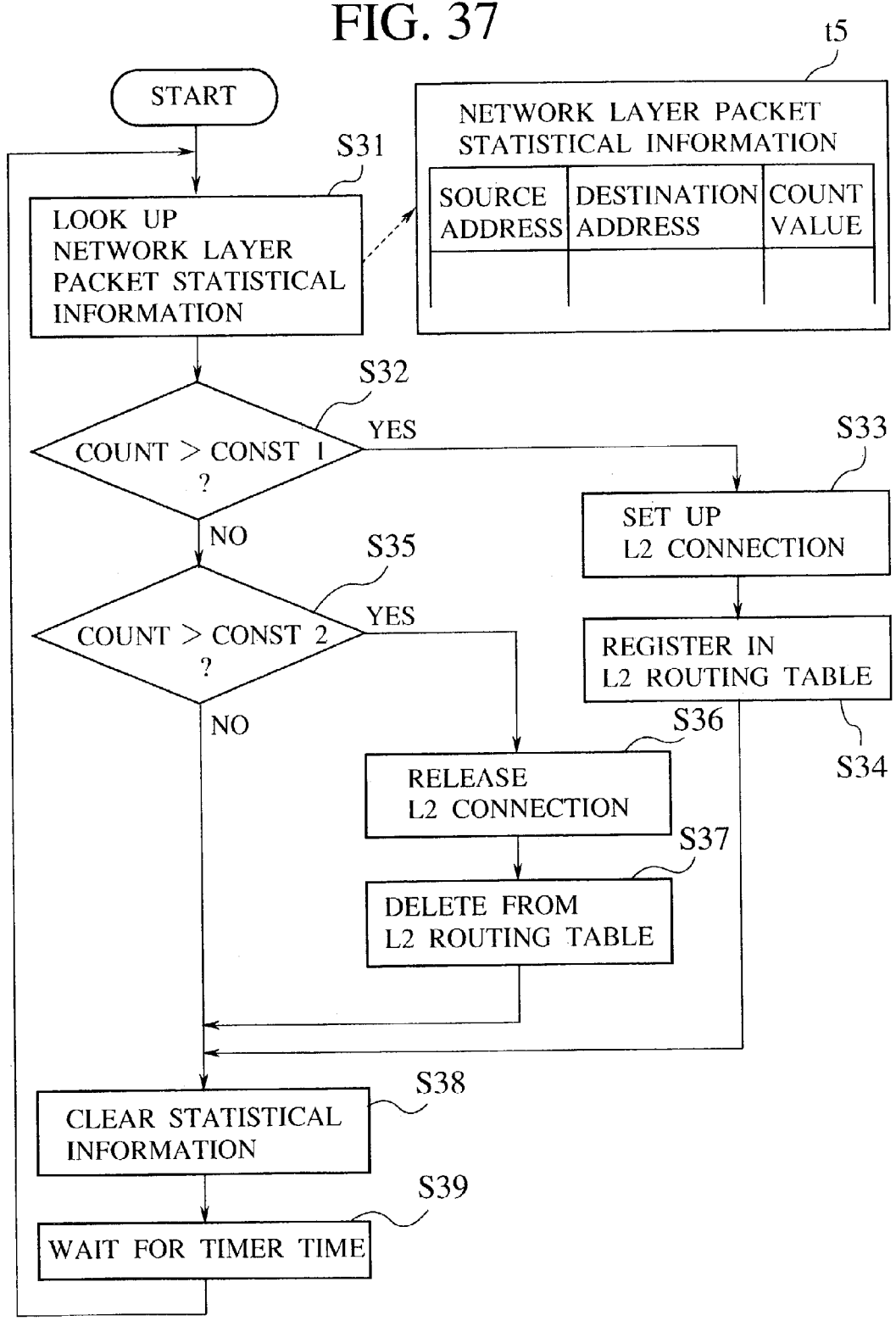
FIG. 37 is a flow chart showing an operation at a time of starting the bypass pipe set up procedure in a case of using a statistical information.

In this case of FIG. 37, there is provided a network layer packet statistical information t5 which indicates a number of received packets as a count value to be updated whenever the packet is transferred at the network layer switch unit 204. The datalink layer connection set up judgement unit 205 looks up this network layer packet statistical information (step S31), and if the count value (COUNT) is greater than a constant value (CONST1) (step S32 YES), the datalink layer connection (L2 connection) is set up (step S33), and an entry for this connection is registered in the datalink layer routing table (L2 routing table) (step S34). Also, if the count value (COUNT) is less than another constant value (CONST2) (step S35 YES), the datalink layer connection (L2 connection) is released (step S36), and an entry for this connection is deleted from the datalink layer routing table (L2 routing table) (step S37). Then, the network layer packet statistical information t5 is reset (step S38), and after a wait for a prescribed timer time set by a timer (not shown) (step S39), the above operation is repeated.

Here, by setting CONST1=1 for example, it is possible to carry out the packet transfer for the first packet alone, and then switch to the cell transfer for the subsequent packets.

Also, as a method for releasing the datalink layer connection, it is possible to adopt a method in which a certain time value (CONST3) is set as the count value (COUNT) in the network layer packet statistical information t5 whenever a packet is received, and sequentially reduced as time elapses, such that the datalink layer connection is released when the count value becomes 0.

Also, instead of using the network layer packet statistical information as described above, it is also possible to use the statistical information for the datalink layer data in a similar manner to release the datalink layer connection.

(B) Case of Set Up at a Time of Router Activation

Figure 38:
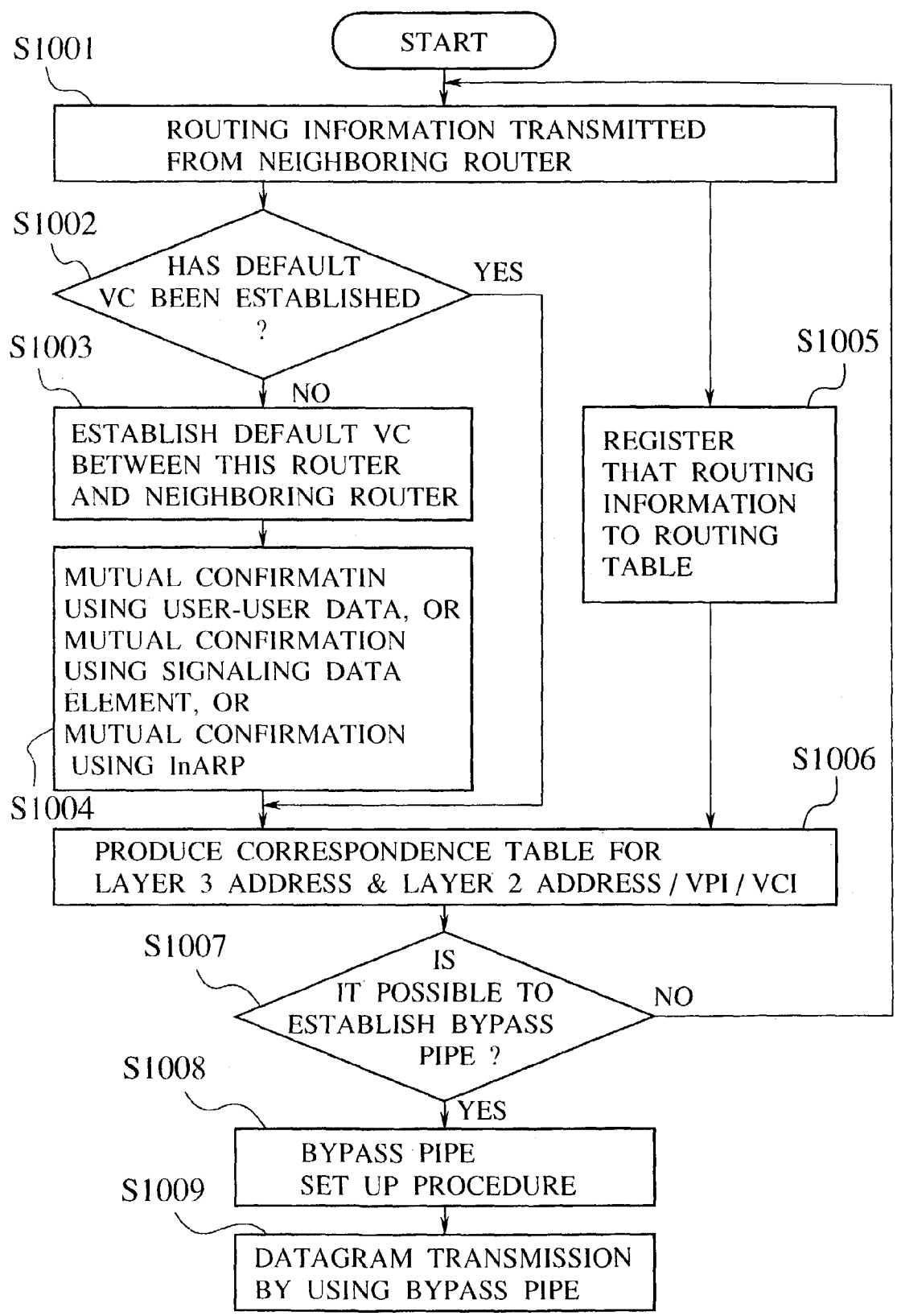
FIG. 38 is a flow chart showing an operation at a time of starting the bypass pipe set up procedure in a case of using a router activation timing.

Next, a case of starting the bypass pipe set up procedure when a connection target router is activated will be described. In this case, the operation is carried out according to the flow chart of FIG. 38 as follows.

When the routing information is transmitted from the neighboring router (step S1001), the router can recognize that a new router has appeared at several hops ahead, and that this new router has not been connected to the same ATM-LAN as this router according to its metric value.

Then, this router checks whether the default VC between this router and the neighboring router has been established (step S1002), and if not, this router establishes the default VC for the datagram transfer between this router and the neighboring router (step S1003). Then, this router carries out a mutual confirmation using the user-user data, or a mutual confirmation using the signaling data element, or a mutual confirmation using InARP, with respect to the neighboring router (step S1004). Meanwhile, the routing information transmitted from the neighboring router is registered into the routing table in this router (step S1005).

Then, this router produces a correspondence table for the layer 3 address and the layer 2 address/VPI/VCI (step S1006). This correspondence table corresponds to a table of FIG. 8 described above or tables of FIGS. 18D and 18E described above.

At this point, when this router recognizes that there exists a sub-net which is not connected by the direct end-to-end ATM connection at several hops ahead, this router checks if it is possible to establish the bypass pipe (step S1607), and if so, the bypass pipe set up procedure as described above is carried out (step S1008) to establish the direct end-to-end ATM connection between this router and that new router, and then the datagram transmission by using that bypass pipe is carried out (step S1009).

(C) Case of Set Up at a Time of Packet Transmission

Next, a case of starting the bypass pipe set up procedure at a time of the packet transmission will be described. In this case, the operation is carried out according to the flow chart of FIG. 39, where the steps identical to those in the flow chart of FIG. 7 described above are given the same reference numerals in the figure and their descriptions will be omitted.

Figure 39:
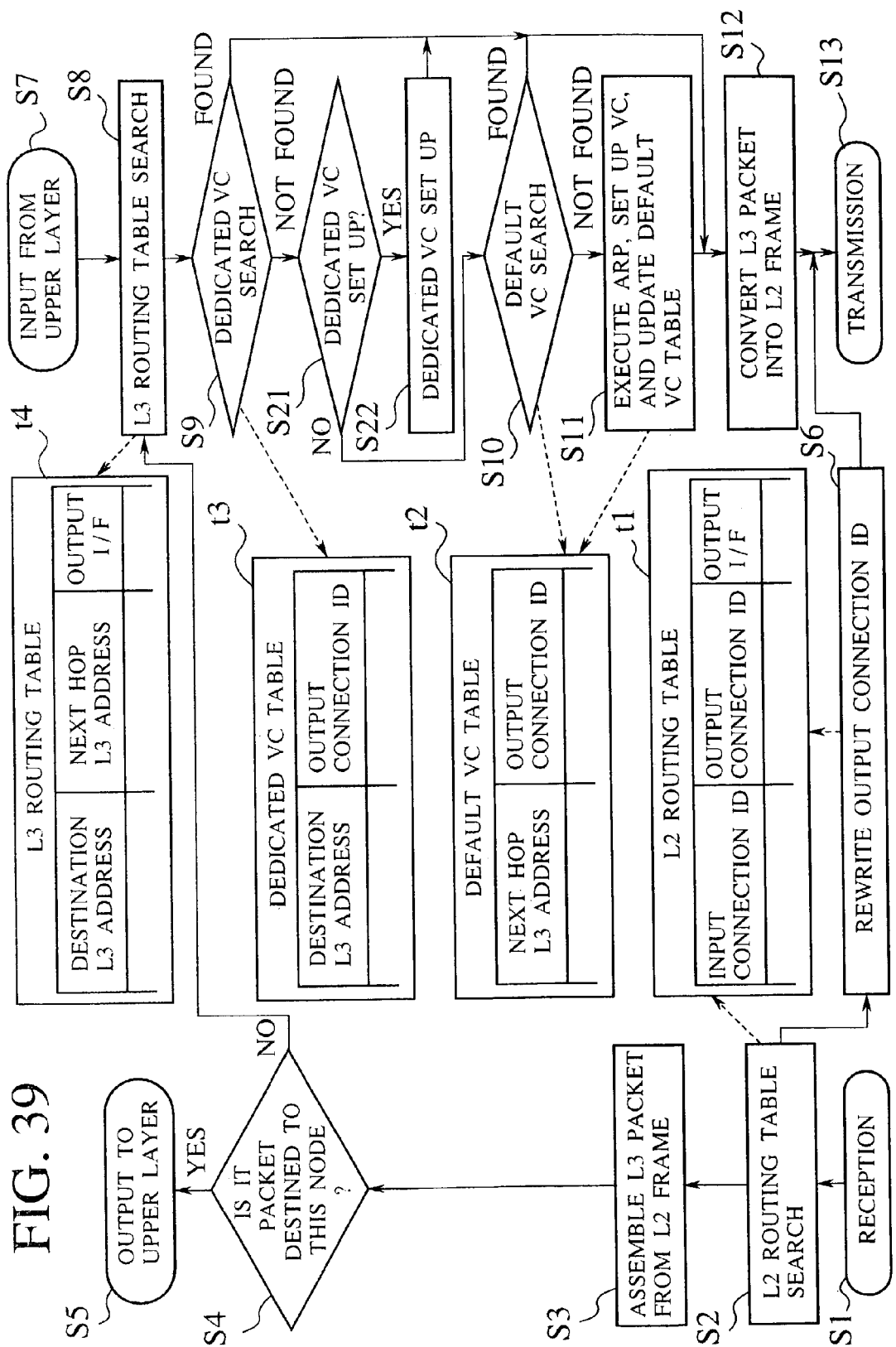
FIG. 39 is a flow chart showing an operation at a time of starting the bypass pipe set up procedure in a case of using a packet transmission timing.

The operation according to FIG. 39 differs from that of FIG. 7 in that, after the dedicated VC search at the step S9 has failed, before the default VC search at the step S10 is carried out, whether or not to set up the dedicated VC is judged (step S21). Then, if the dedicated VC is to be set up, the dedicated VC setup procedure is carried out (step S22) and the operation proceeds to the step S12, whereas otherwise the default VC search at the step S10 is carried out.

(D) Case of Set Up at a Time of Resource Reservation Protocol Reception

Next, a case of starting the bypass pipe set up procedure when a resource reservation protocol (such as RSVP, ST II, etc.) for the network layer is received will be described.

In this case, the bypass pipe set up procedure is carried out when the set up message of the resource reservation protocol is received, and the bypass pipe release procedure is carried out when the release message of the resource reservation protocol is received. Here, in a case the resource reservation protocol is the RSVP, the session ID of the RSVP may be used as the bypass pipe ID.

It is noted here that it is also possible to set up or release the bypass pipe according to the set up or release command of the transport layer protocol such as TCP, instead of the resource reservation protocol. In general, it is possible to set up or release the bypass pipe according to the connection set up or release message at the layer above the network layer.

Bypass Pipe Set Up/Release Procedure Using No Control Message

Next, the bypass pipe set up/release procedures without using any control message in this embodiment will be described in detail.

Figure 40:
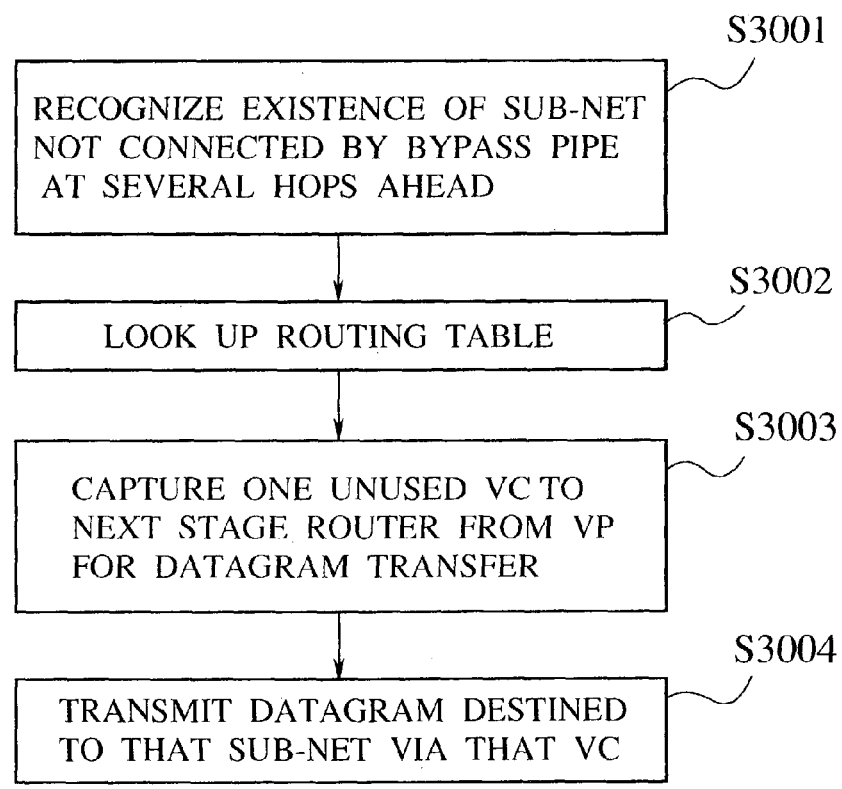
FIG. 40 is a flow chart showing an operation of one router in one bypass pipe set up procedure using no control message.
Figure 41:
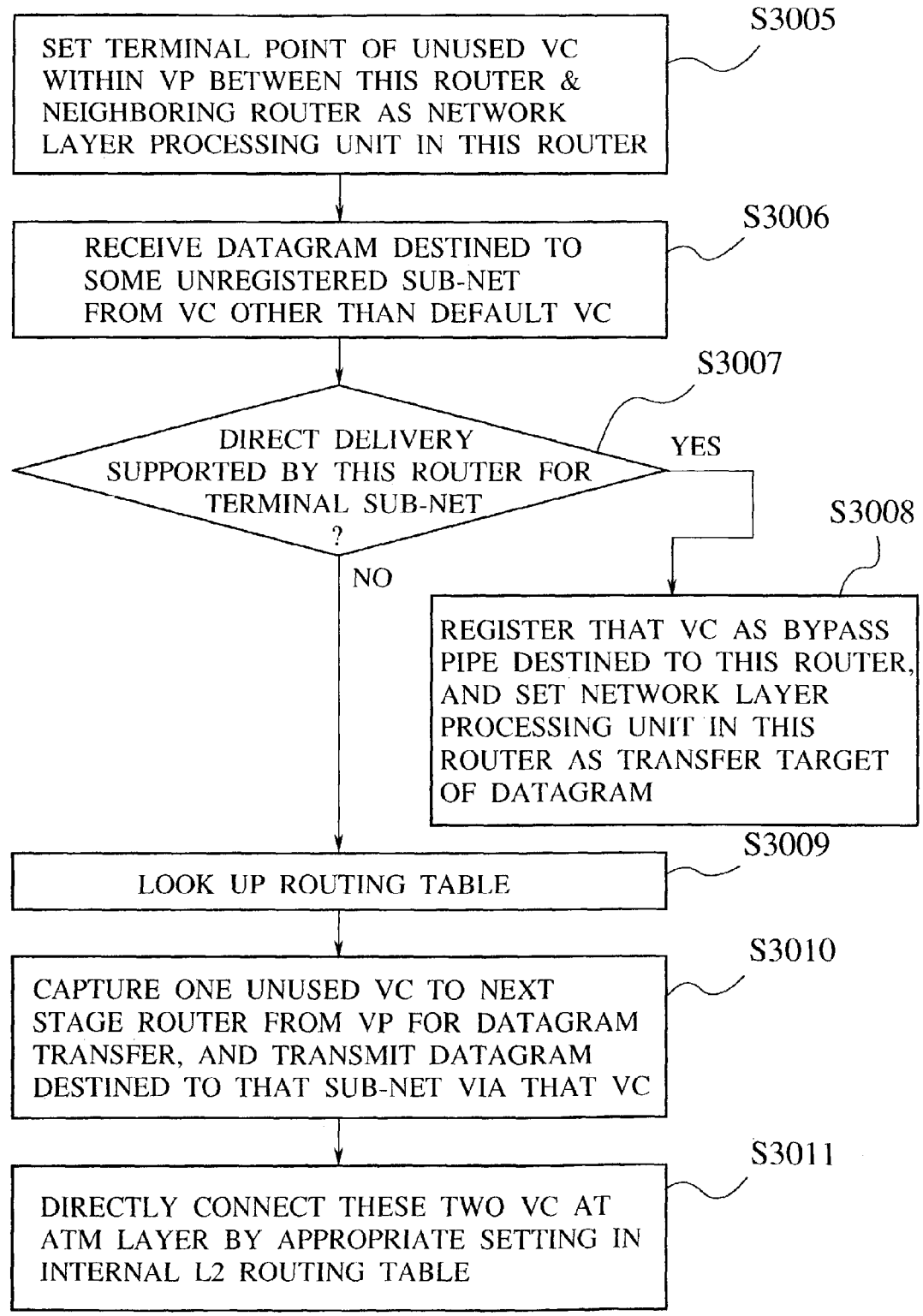
FIG. 41 is a flow chart showing an operation of another router in one bypass pipe set up procedure using no control message.

First, with references to the flow charts of FIGS. 40 and 41, the first bypass pipe set up/release procedure using no control message will be described.

When the first stage router receives the datagram destined to the sub-net which is several hops ahead, to which the bypass pipe has not been set up and for which the direct delivery is not supported by this router (step S3001), in order to establish the bypass pipe up to that sub-net, this router looks up the routing table in this router to check the next stage router (step S3002), and captures one arbitrary unused VC to the next stage router other than the default VC within the VP connected to the next stage router (step S3003). Then, the datagram destined to that sub-net is transmitted through that VC (step S3004).

At the subsequent stage router, the terminal point of each unused VC between this router and the neighboring router is set in advance as the network layer processing unit in this router (step S3005) such that the receiving targets of all the VCs within the VP for datagram transfer are set in the L2 routing table in advance.

Then, the second stage router which received the datagram destined to some unregistered sub-net through the VC other than the default VC from the first stage router (step S3006) recognizes that the previous stage router wishes to use that VC as the dedicated VC destined to the destination sub-net of the received datagram, as this datagram is received from the VC other than the default VC.

Then, unless this second stage router is the final stage router of this dedicated VC (step S3007 NO), this second stage router looks up the routing table in this router to check the next stage router (S3009), captures one arbitrary unused VC to the next stage router other than the default VC within the VP connected to the next stage router and transmits the datagram destined to that sub-net through that VC (step S3010), while this VC between the second stage router and the third stage router is directly connected at the ATM layer with the VC between the first stage router and the second stage router by an appropriate setting in the L2 routing table (step S3011).

The third and subsequent intermediate stage routers also operate similarly as the second stage router.

When the destination sub-net of the datagram received from the unused VC is a sub-net for which the direct delivery is supported by this router, the router recognizes that it is the final stage router to which the dedicated VC is destined, so that this VC is registered as the bypass pipe destined to this router, and the transfer target of the received datagram is set to be the network layer processing unit in this router (step S3008).

By means of these operations, it is possible to construct the bypass pipe environment without using any bypass pipe set up request message. In this procedure, the bypass pipe is constructed only at the route in which the datagram to be transmitted actually exists, so that there is an advantage that a wasteful set up operation for a bypass pipe which is actually not going to be used can be eliminated.

Next, with references to FIG. 42 to FIG. 48, the second bypass pipe set up/release procedure using no control message will be described.

Figure 42:
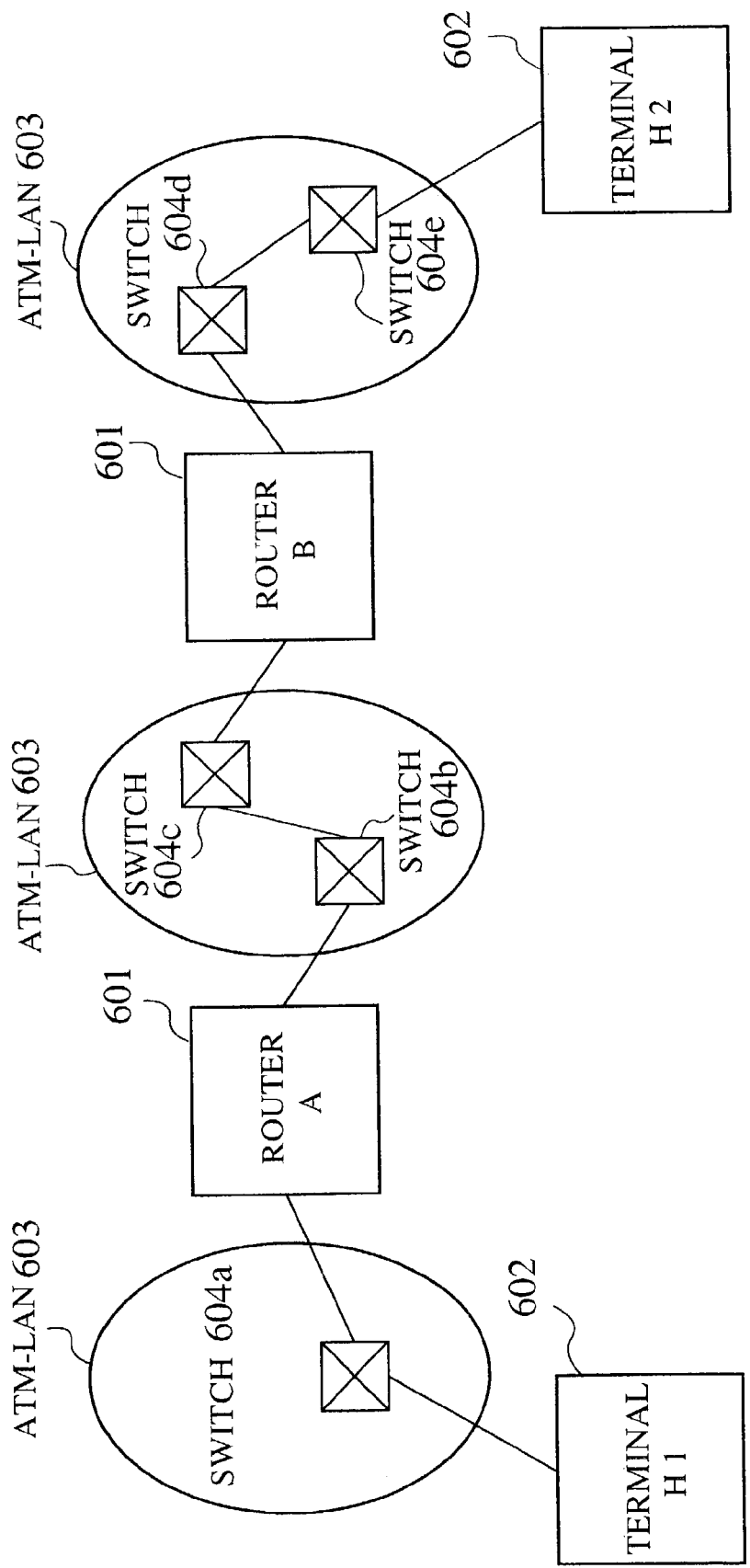
FIG. 42 is a schematic block diagram showing another exemplary configuration for the ATM network of FIG. 1 for explaining another bypass pipe set up/release procedure using no control message.

The following description is based on an exemplary configuration as shown in FIG. 42 in which the ATM-LANs 603 have switches 604 (604a to 604e) connecting the routers 601 (router-A and router-B) and the terminals 602 (host H1 and host H2) to the ATM-LANs 603, where the switch 604a provides a VC (PVC) between the host H1 and the router-A, the switches 604b and 604c provide a VC (PVC) between the router-A and the router-B and the switches 604d and 604e provide a VC (PVC) between the router-B and the host H2.

Figure 43:
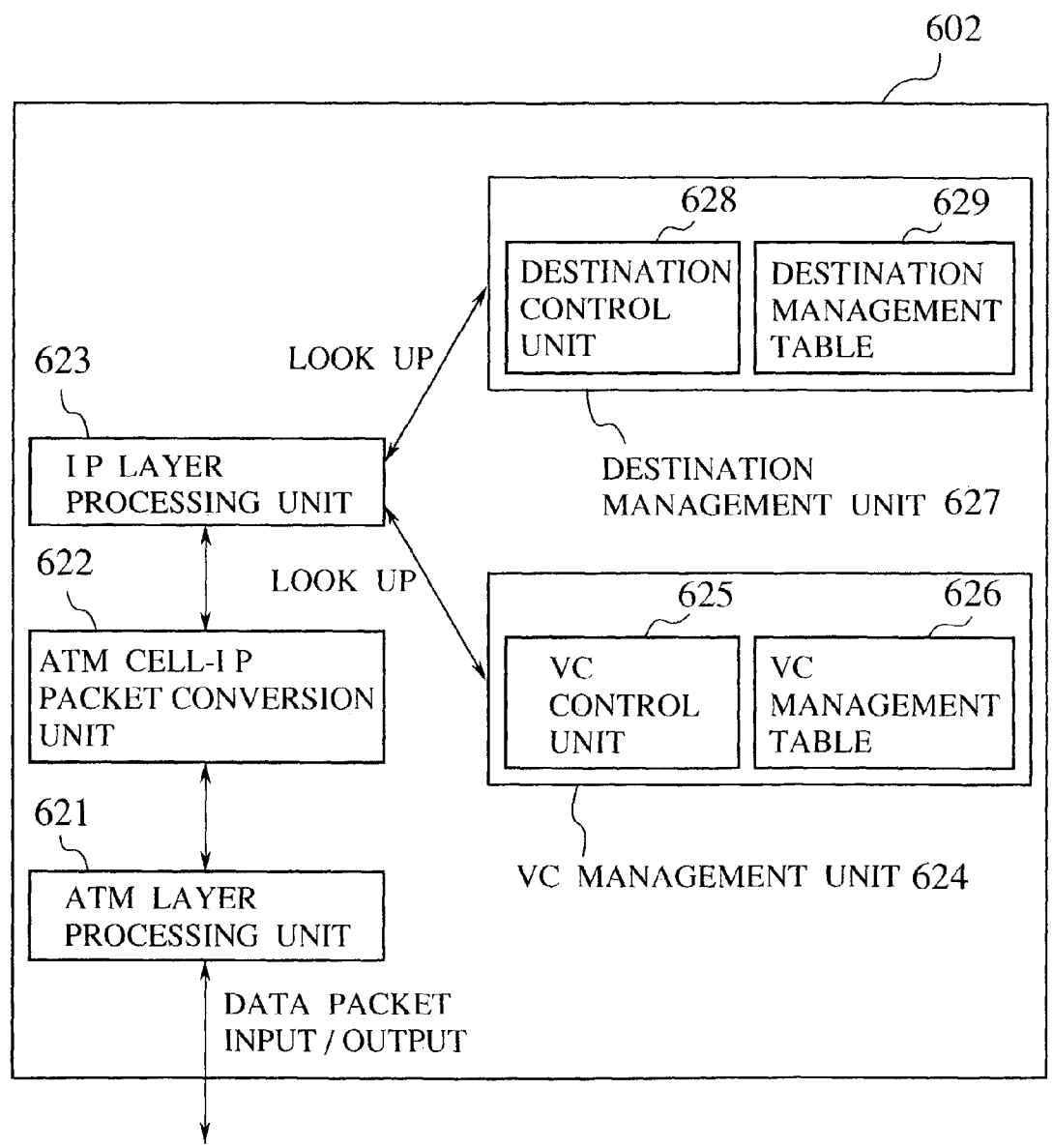
FIG. 43 is a block diagram showing a configuration of each terminal in the exemplary configuration of FIG. 42.

In this case, each terminal 602 has a configuration as shown in FIG. 43, which is basically similar to that of FIG. 9 and which comprises: an ATM layer processing unit 621; and ATM cell-IP packet conversion unit 622 connected with the ATM layer processing unit 621; an IP layer processing unit 623 connected with the ATM cell-IP packet conversion unit 622, and a VC management unit 624 and a destination management unit 627 connected with the IP layer processing unit 623, where the VC management unit 624 includes a VC control unit 625 and a VC management table 626, while the destination management unit 627 includes a destination control unit 628 and a destination managem table 629.

Figure 44:
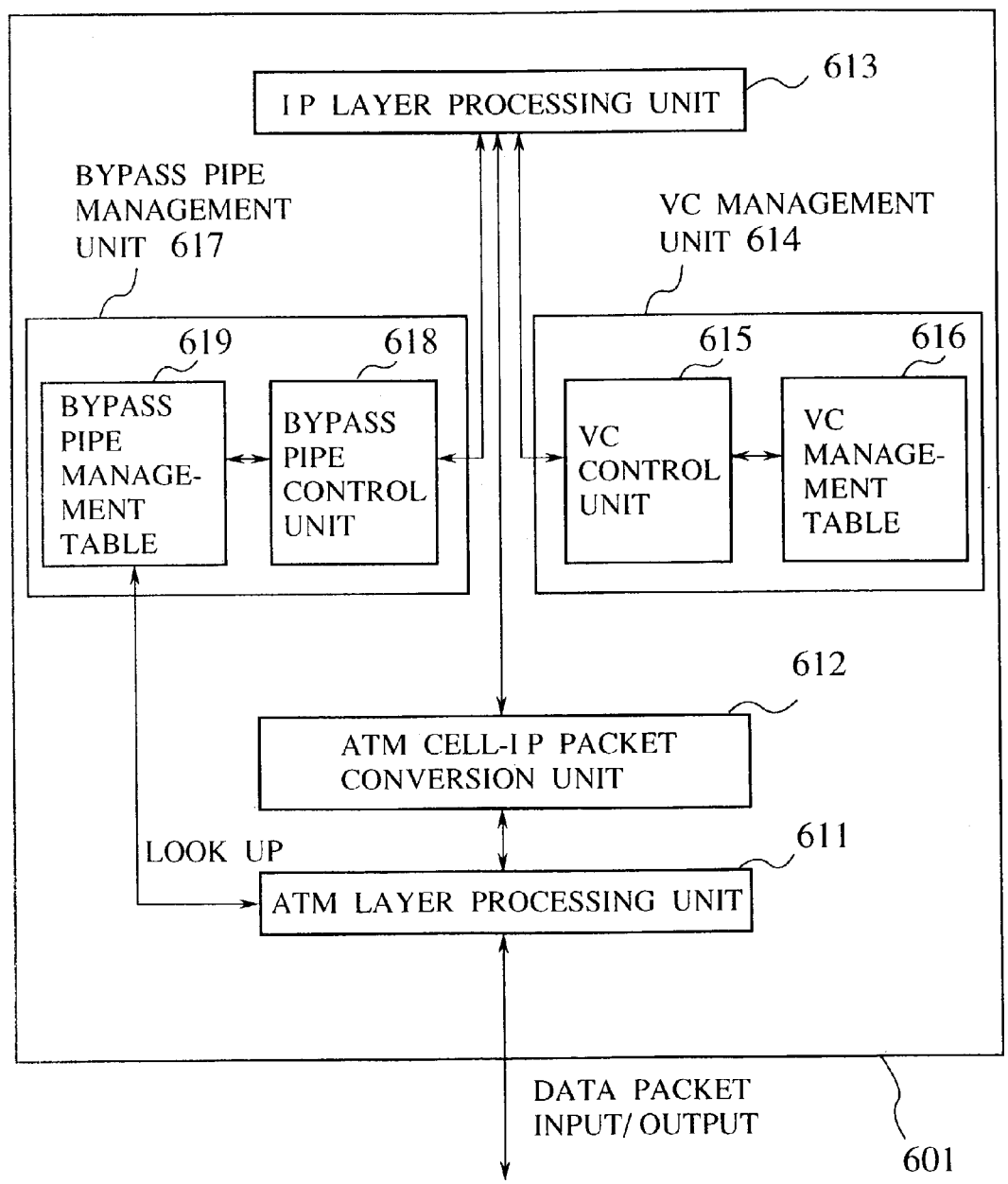
FIG. 44 is a block diagram showing a configuration of each router in the exemplary configuration of FIG. 42.

On the other hand, each router 601 has a configure as shown in FIG. 44, which comprises: an ATM layer processing unit 611 (corresponding to the datalink lay (switch unit 202 of FIG. 4); and ATM cell-IP packet conversion unit 612 (corresponding to the datalink layer network layer translation unit 203 of FIG. 4) connected with the ATM layer processing unit 611; an IP layer processing unit 613 (corresponding to the network layer switch unit 204 and the network layer control unit 207 FIG. 4) connected with the ATM cell-IP packet conversion unit 612; and a bypass pipe management unit 617 connects with the ATM layer processing unit 611 and the IP layer processing unit 613 and a VC management unit 614 connect with the IP layer processing unit 613 (corresponding to the datalink layer connection set up judgement unit 205 the datalink layer control unit 206 of FIG. 4), where th VC management unit 614 includes a VC control unit 615 an VC management table 616, while the bypass pipe managemen unit 617 includes a bypass pipe control unit 618 and a bypass pipe management table 619.

Here, the switches 604a to 604e have route control tables with initial settings as indicated in FIG. 45A to FIG. 45E, respectively, while the host H1, the host H2, t router-A, and the router-B have the VC management tables 616 with initial settings as indicated in FIG. 46A to FIG. 46D, respectively.

Now, with reference to the flow chart of FIG. 47, a procedure for the data packet transmission by the transmission terminal 602 in this case will be described first.

When data to be transmitted is generated (step S101), the destination management table 629 is referred to check if there exists an entry corresponding to the destination IP address in the generated IP packet (S102). In a case a corresponding entry exists at the step S102, a corresponding I/F and a corresponding VPI/VCI are obtained from the destination management table 629 (step S103). Then, the ATM cell is assembled according to a prescribed format (step S107) and the data packet, i.e., the assembled ATM cell, is transmitted (step S108).

In a case a corresponding entry does not exist at the step S102, a next hop is determined by referring to an IP routing table provided within the IP layer processing unit 623 (step S104), where the IP routing table registers the correspondence between the destination IP address and the next hop IP address.

Then, the VC management table 626 is referred to obtain available I/F and VPI/VCI corresponding to the next hop (step S105), and the status field in the VC management table 626 corresponding to the obtained I/F and VPI/VCI is updated while the destination management table 629 is updated by adding a new entry (step S106). Then, the ATM cell is assembled according to a prescribed format by adding the obtained VPI/VCI (step S107) and the data packet, i.e., the assembled ATM cell, is transmitted (step S108).

Figure 48:
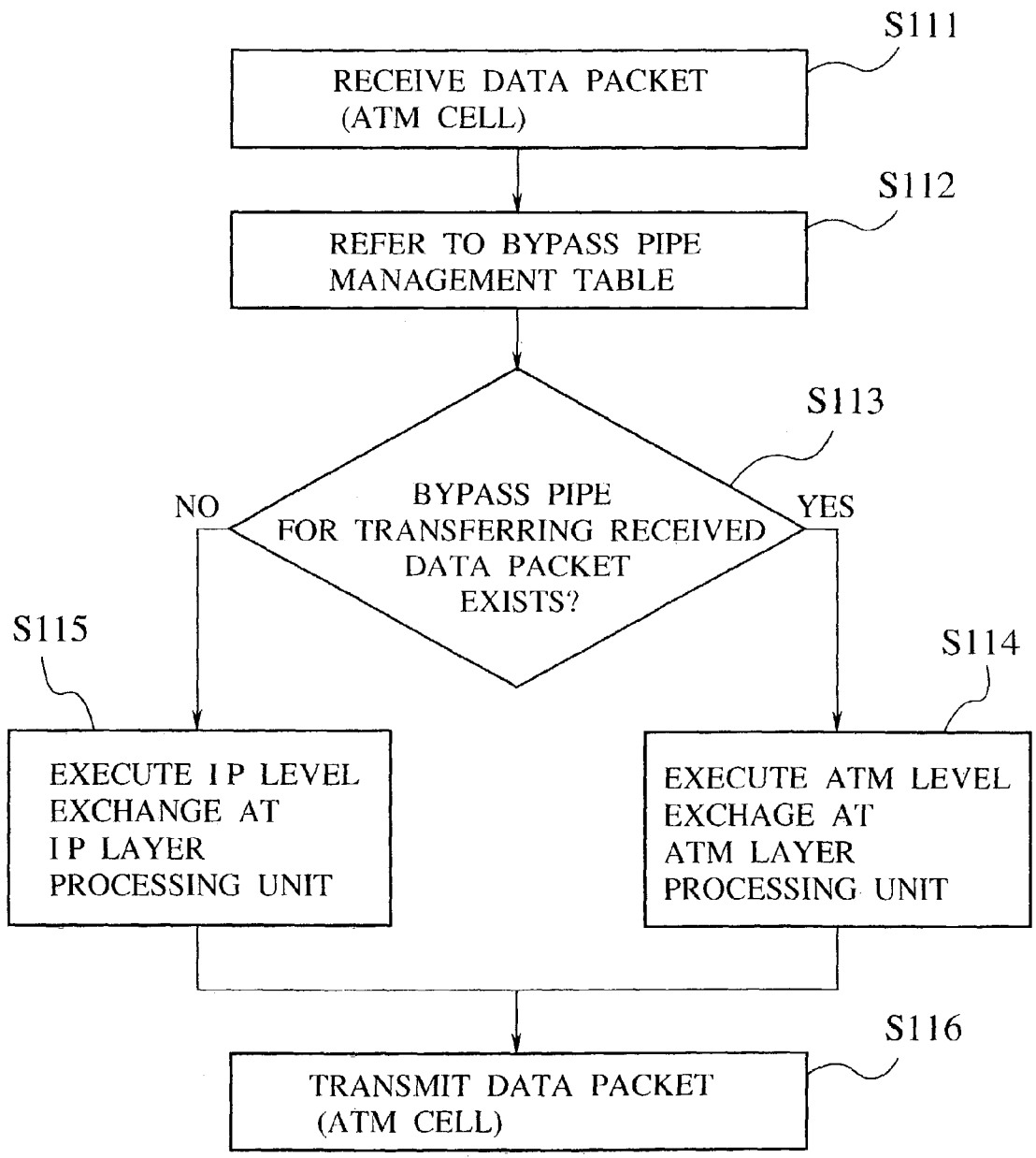
FIG. 48 is a flow chart showing a procedure for data packet handling by a router in the exemplary configuration of FIG. 42.

Next, with reference to the flow chart of FIG. 48 a procedure for the data packet handling by the router 601 in this case will be described.

When the data packet (ATM cell) is received (step S111), the bypass pipe management table 619 is referred by the ATM layer processing unit 611 (step S112) to check if there exists a bypass pipe corresponding to the I/F and the VPI/VCI of the received ATM cell (step S113).

In a case the corresponding bypass pipe exists at the step S113, the ATM level exchange is executed at the ATM layer processing unit 611 (step S114), and the data packet (ATM cell) is transmitted to the bypass pipe by only the ATM level processing (step S116).

In a case the corresponding bypass pipe does not exist at the step S113, the ATM cell is disassembled and given to the IP layer processing unit 613, to determine a next hop according to the IP routing table provided therein. Then, the VC management table 616 is referred to obtain available I/F and VPI/VCI corresponding to the next hop, according to the IP address of the next hop. Then, the ATM cell is assembled again by adding the obtained VPI/VCI (step S115) and the data packet, i.e., the assembled ATM cell, is transmitted (step S116).

At the same time, the bypass pipe control unit 618 registers a set of the I/F and the VPI/VCI at times of reception and transmission of that ATM cell into the bypass pipe management table 619, to produce a new bypass pipe while updating the bypass pipe management table 619. By means of this operation, the subsequent ATM cells having the same transmission source and the same destination arriving to this router after this updating of the bypass pipe management table 619 can be transferred at high speed by only the ATM level processing at the ATM layer processing unit 611.

In a case the VC cannot be obtained for some reasons such as a lack of bandwidth or an occurrence of obstruction, the ATM cell loss will be caused. It is also possible to keep the subsequent ATM cells awaiting in a buffer (now shown) provided in the ATM layer processing unit 611 until the bypass pipe management table 619 is updated.

Here, the VC is basically bidirectional, so that when each of the terminal 602 and the router 601 obtains the VCID, if any unused VCID is secured at random, there is a possibility for the same VCID to be secured from both sides. In order to prevent such a case in which the same VCID is secured from both sides, it is possible to determine in advance a VCID of the VC given by a PVC that can be secured from a node on one side.

The deletion of the entry from the bypass pipe management table 619 can be realized by a method using the ATM level message such as the OAM cell which is different from the control message at the network layer level, or by a method for deleting the entry according to a statistical information such as a traffic on the bypass pipe.

Figure 50:
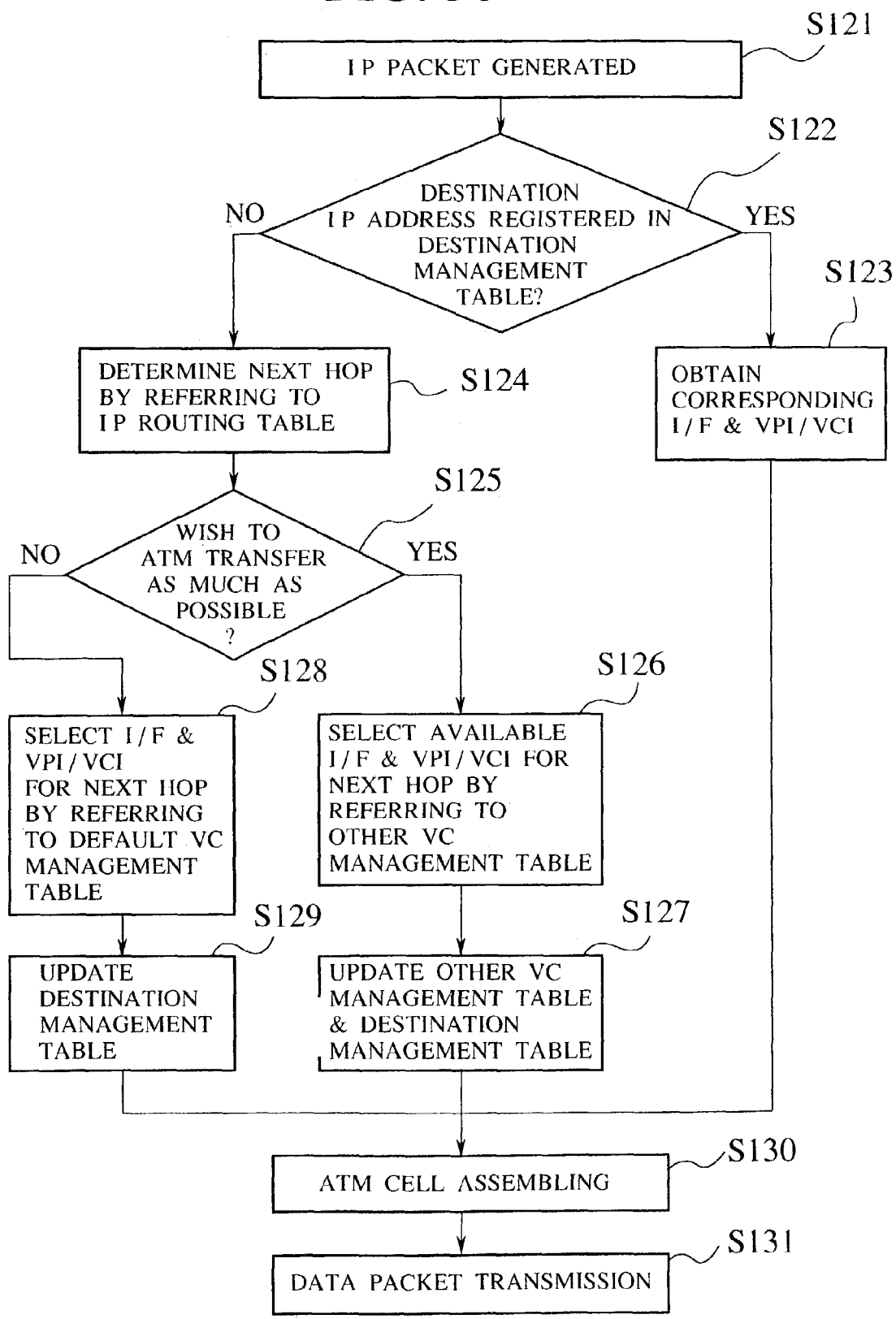
FIG. 50 is a flow chart showing a procedure for data packet transmission by a transmission terminal in a procedure using the VC management table content of FIG. 49.
Figure 51:
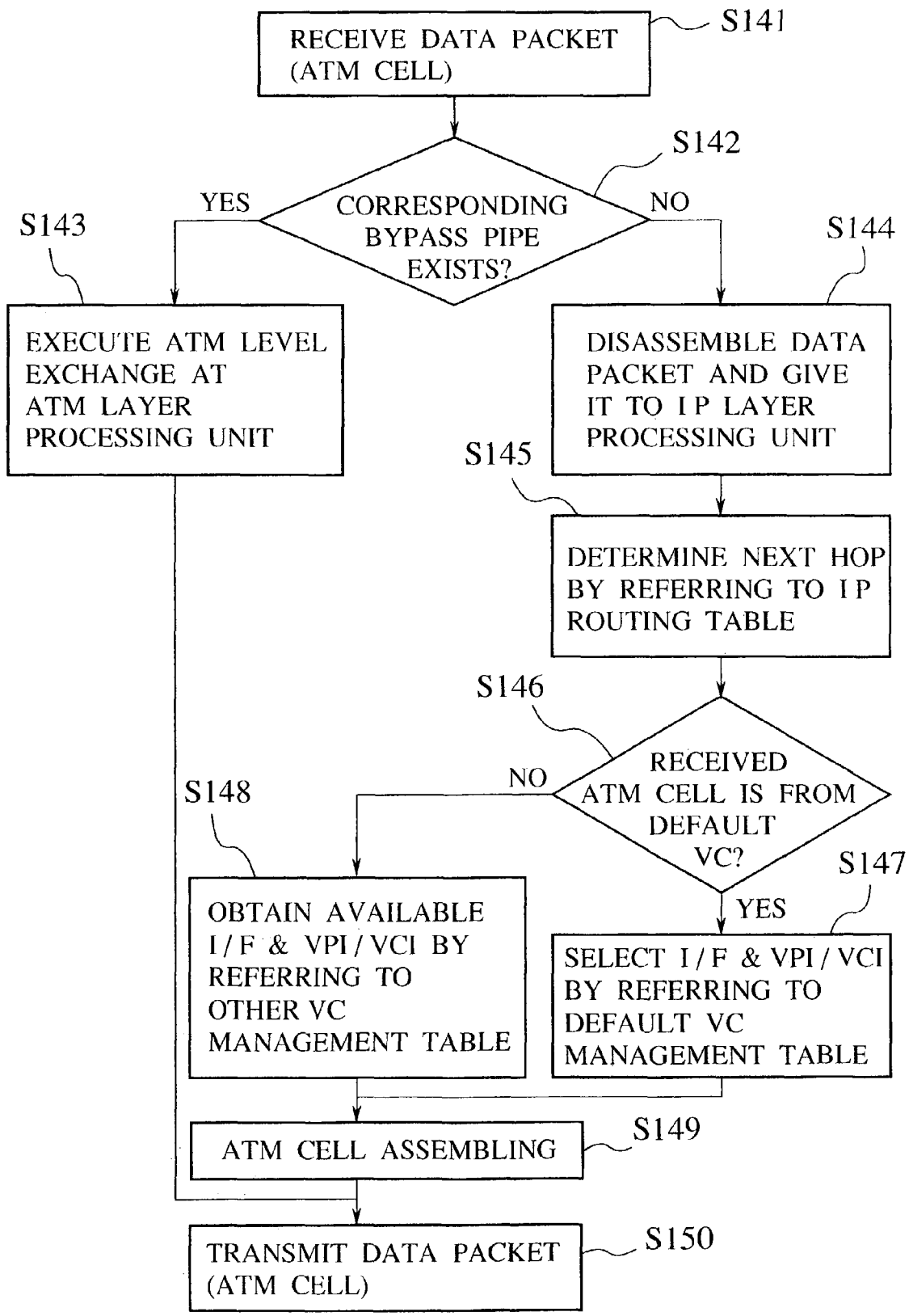
FIG. 51 is a flow chart showing a procedure for data packet handling by a router in a procedure using the VC management table content of FIG. 49.

Next, with references to FIG. 49 to FIG. 51, the third bypass pipe set up/release procedure using no control message will be described.

In the second procedure described above, the VCs of the same function are setup between the terminal 602 and the router 601 as well as between the routers 601. In this third procedure, the default Vc and the dedicated VC are set up between the terminal 602 and the router 601 as well as between the routers 601. Then, a sender who wishes to make the conventional IP level transfer of the data packet at the router 601 utilizes the default VC for the data packet transmission, while a sender who wishes to make the ATM level transfer of the data packet at the router 601 as much as possible utilizes the dedicated VC for the data packet transmission.

In this case, each terminal 602 has a configuration similar to that shown in FIG. 43 described above, except that the VC management table 626 in the VC management unit 624 has an internal configuration as shown in FIG. 49, which includes a default VC management table 6261 for registering a VPI/VCI of a VC defined in advance as the default VC for each VC connection target and an other VC management table 6262 for registering a VPI/VCI of a VC other than the default VC. Similarly, each router 601 has a configuration similar to that shown in FIG. 44 described above, except that the VC management table 616 in the VC management unit 614 has an internal configuration similar to that shown in FIG. 49, which includes a default VC management table 6161 for registering a VPI/VCI of a VC defined in advance as the default VC for each VC connection target and an other VC management table 6162 for registering a VPI/VCI of a VC other than the default VC.

Now, with reference to the flow chart of FIG. 50, a procedure for the data packet transmission by the transmission terminal 602 in this case will be described first.

When data to be transmitted is generated (step S121), the destination management table 629 is referred to check if there exists an entry corresponding to the destination IP address in the generated IP packet (S122). In a case a corresponding entry exists at the step S122, a corresponding I/F and a corresponding VPI/VCI are obtained from the destination management table 629 (step S123). Then, the ATM cell is assembled according to a prescribed format (step S130) and the data packet, i.e., the assembled ATM cell, is transmitted (step S131).

In a case a corresponding entry does not exist at the step S122, a next hop is determined by referring to an IP routing table provided within the IP layer processing unit 623 (step S124), and whether the ATM transfer is wished as much as possible or not is decided (step S125).

When it suffices to make the conventional IP level transfer (step S125 NO), the default VC management table 6261 in the VC management table 626 is referred to obtain I/F and VPI/VCI corresponding to the next hop (step S128), and the destination management table 629 is updated (step S129). Then, the ATM cell is assembled according to a prescribed format (step S130) and the data packet, i.e., the assembled ATM cell, is transmitted (step S131).

On the other hand, when it is wished to make the ATM level transfer as much as possible (step S125 YES), the other VC management table 6262 in the VC management table 626 is referred to obtain available I/F and VPI/VCI corresponding to the next hop (step S126), and the other VC management table 6262 and the destination management table 629 are updated (step S127). Then, the ATM cell is assembled according to a prescribed format (step S130) and the data packet, i.e., the assembled ATM cell, is transmitted (step S131).

Next, with reference to the flow chart of FIG. 51 a procedure for the data packet handling by the router 601 in this case will be described.

When the data packet (ATM cell) is received (step S141), the bypass pipe management table 619 is referred to check if there exists a bypass pipe corresponding to the I/F and the VPI/VCI of the received ATM cell (step S142).

In a case the corresponding bypass pipe exists at the step S142, the ATM level exchange is executed at the ATM layer processing unit 611 (step S143), and the data packet (ATM cell) is transmitted to the bypass pipe by only the ATM level processing (step S150).

In a case the corresponding bypass pipe does not exist at the step S142, the ATM cell is disassembled and given to the IP layer processing unit 613 (step S144), and a next hop is determined according to the IP routing table provided in the IP layer processing unit 613 (step S145).

Then, when the received ATM cell is a cell transmitted from the default VC (step S146 YES), the default VC management table 6161 in the VC management table 616 is referred to obtain I/F and VPI/VCI corresponding to the next hop, according to the IP address of the next hop (step S147). Then, the ATM cell is assembled again by adding the obtained VPI/VCI (step S149) and the data packet, i.e., the assembled ATM cell, is transmitted (step S150).

On the other hand, when the received ATM cell is a cell transmitted from the dedicated VC (step S146 NO), the other VC management table 6162 in the VC management table 616 is referred to obtain available I/F and VPI/VCI corresponding to the next hop, according to the IP address of the next hop (step S148). Then, the ATM cell is assembled again by adding the obtained VPI/VCI (step S149) and the data packet, i.e., the assembled ATM cell, is transmitted (step S150).

At the same time, the bypass pipe control unit 618 registers a set of the I/F and the VPI/VCI at times of reception and transmission of that ATM cell into the bypass pipe management table 619, to produce a new bypass pipe while updating the bypass pipe management table 619. By means of this operation, the subsequent ATM cells having the same transmission source and the same destination arriving to this router after this updating of the bypass pipe management table 619 can be transferred at high speed by only the ATM level processing at the ATM layer processing unit 611.

Multi-Point to Point Bypass Pipe Set Up/Release Procedure

Next, the bypass pipe set up/release procedures for a multi-point to point connection in this embodiment will be described in detail.

Figure 52:
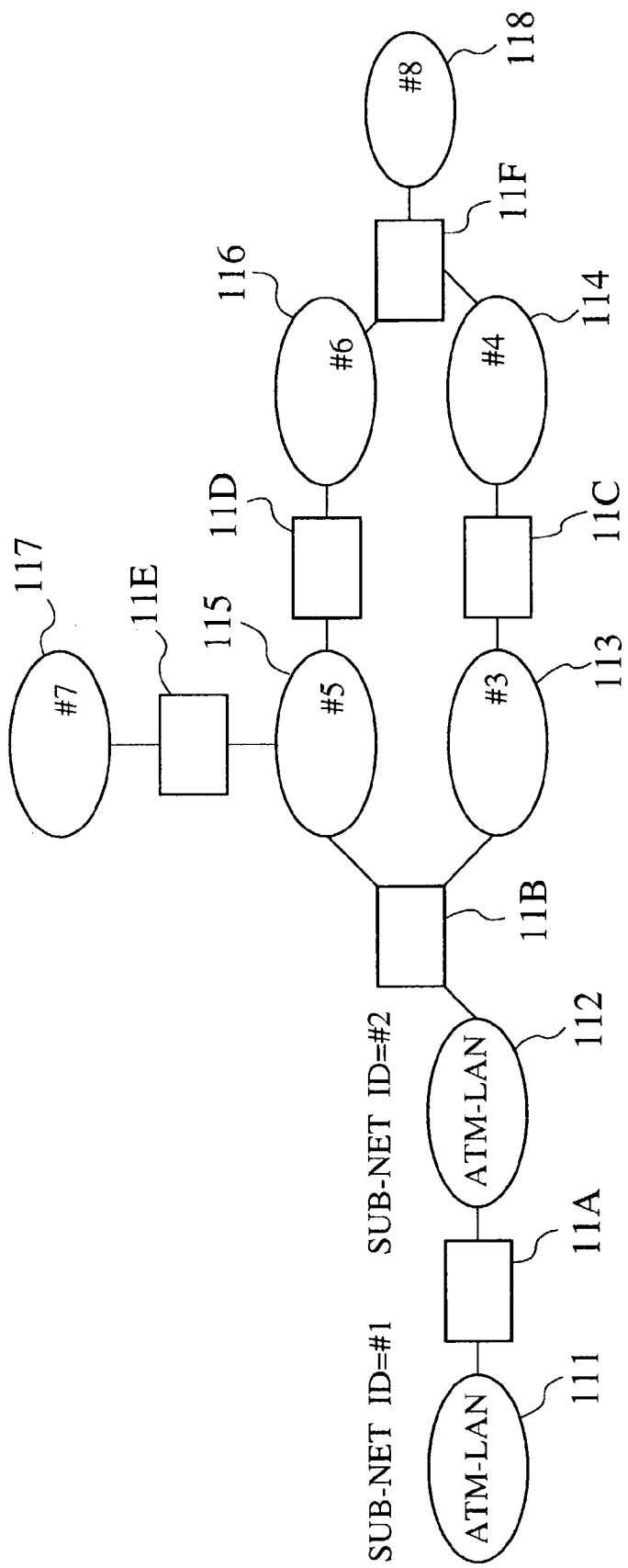
FIG. 52 is a schematic block diagram showing still another exemplary configuration for the ATM network of FIG. 1 for explaining a bypass pipe set up procedure for a multi-point to point connection.

The following description is based on an exemplary configuration as shown in FIG. 52 in which the ATM-LANs 111 to 118 are inter-networked by the routers 11A to 11F, where the ATM-LANs 111 to 118 have sub-net IDs equal to #1 to #8, respectively.

Figure 23:
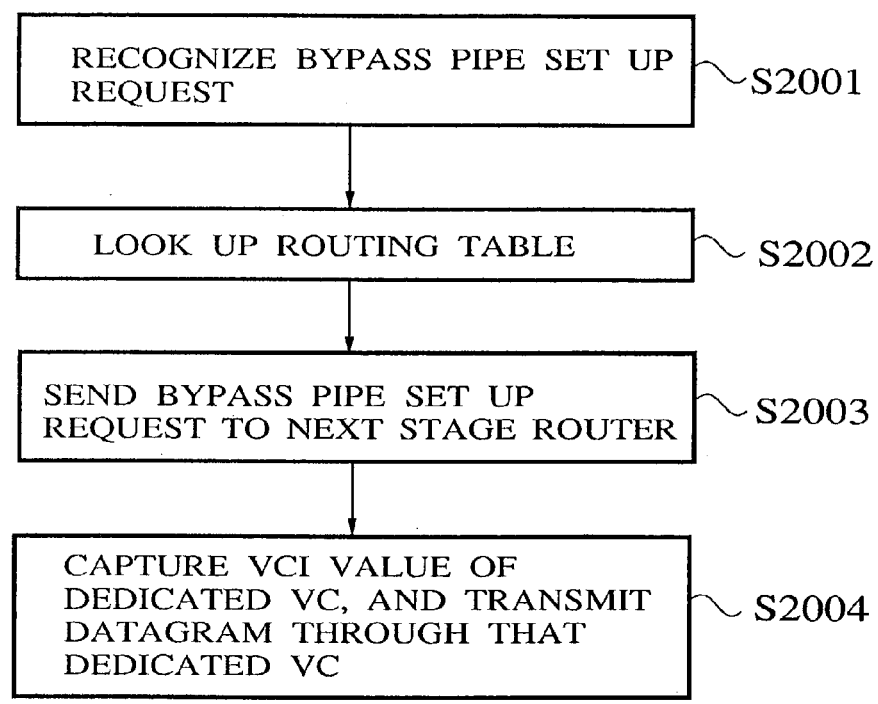
FIG. 23 is a flow chart showing an operation of one router in an exemplary bypass pipe set up procedure using control message exchanges.
Figure 24:
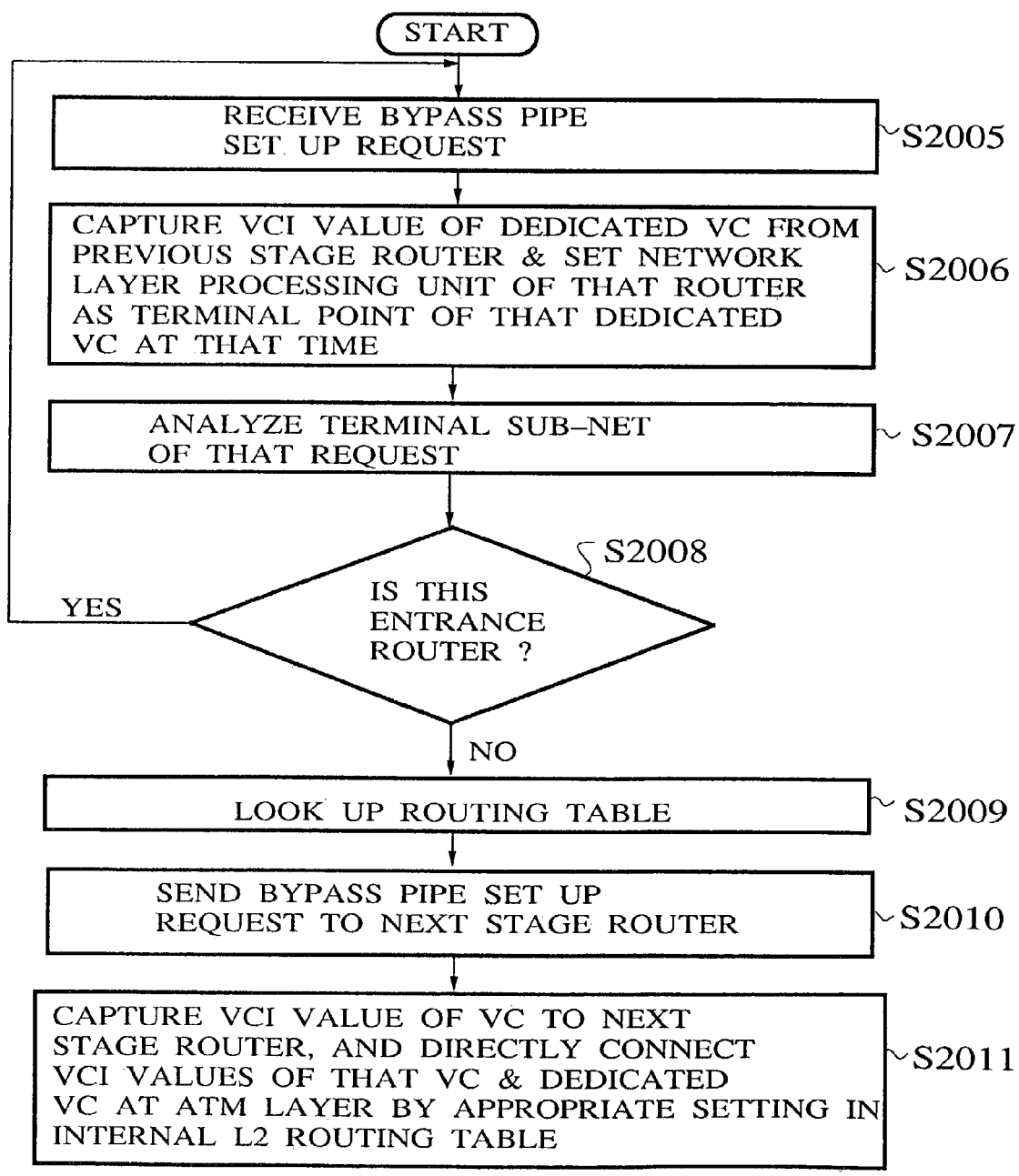
FIG. 24 is a flow chart showing an operation of another router in an exemplary bypass pipe set up procedure using control message exchanges.

In this case, the operation of the node (router) 11A for transmitting the bypass pipe set up request is the same as that described in conjunction with FIG. 23 above.

Figure 53:
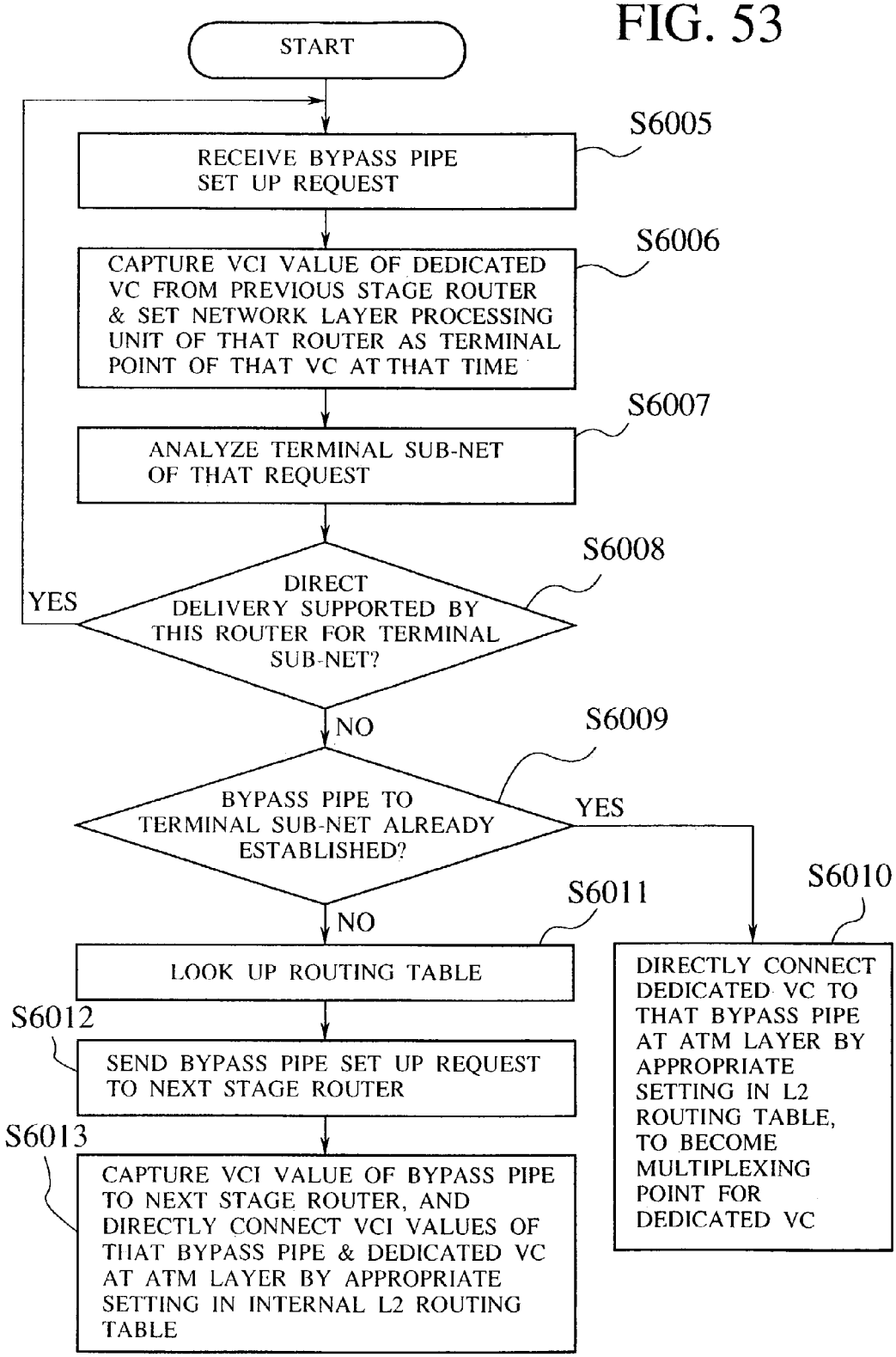
FIG. 53 is a flow chart showing an operation of one router in a bypass pipe set up procedure for a multi-point to point connection.

On the other hand, the next stage router 11B operates according to the flow chart of FIG. 53 as follows.

When the bypass pipe set up request message is received from the router 11A (step S6005), the router 11B captures the VCI value of the dedicated VC from the previous stage router 11A and sets the network layer processing unit of that router as the terminal point of that dedicated VC (step S6006).

Then, the router 11B analyzes the terminal sub-net of the received bypass pipe set up request message (step S6007) to determine whether to transfer this message to the next stage router or not (step S6008).

In a case of transferring this message, whether the bypass pipe to the terminal sub-net has already been established or not is determined (step S6009), and when the bypass pipe has already been established, that dedicated VC is directly connected to that bypass pipe at the ATM layer level by an appropriate setting in the L2 routing table, so as to become a multiplexing point for that dedicated VC (step S6010).

On the other hand, when the bypass pipe has not been established, the routing table is looked up to determine the next stage router (step S6011), and the bypass pipe set up request is transferred to the next stage router (step S6012). Then, the router 11B captures the VCI value of the bypass pipe to the next stage router, and directly connects the VCI values of the bypass pipe and that dedicated VC at the ATM layer level by an appropriate setting in the L2 routing table (step S6013).

Here, in a course of the bypass pipe set up, especially when a number of routers to pass is numerous, it is possible to encounter a situation in which the VC directly connected at the ATM layer exists up to an intermediate stage router but it has not reached to the final stage router yet. In such a case, the L2 routing table in the router may have a setting in which the connection target of the VC in a process of being generated is set to the network layer processing unit in that router.

By means of this, the datagram is transferred only by the ATM layer up to that router as the datagram can pass through the other routers up to that router by the ATM layer processing alone, so that compared with the hop by hop datagram transfer, the high speed datagram transfer is possible even during the bypass pipe set up process.

Also, in this case, the timing for switching the connection target of the VC from the network layer processing unit of the router to the next stage VC, i.e., the timing for rewriting a header conversion table or a switch table (L2 routing table) in the router, can be set to a time at which one packet has passed through that VC, it is possible to prevent an occurrence of a packet destruction (a situation in which only a part of the packet is transferred to the router while the other part of the packet is transferred to the next stage router via the bypass pipe) at this switching timing. For example, in a case of carrying out the ATM cell assembling of the datagram by using the AAL (ATM Adaptation Layer) type 5, this switching timing can be learned from the user-user data field of the ATM cell, so that it suffices to carry out the table rewriting when this switching timing is recognized.

Next, a set up of a multi-point to point bypass pipe in a case in which a number of ATM-LANs to be inter-networked has increased will be described.

When the router 11E and the router 11F are activated, the router 11E establishes the default VC between the router 11B and this router 11E, while the router 11F establishes the default VC between the router 11C and this router 11F, and the operation such as the routing information exchange is carried out through these default VCs. By means of the routing information exchange, the routers 11E and 11F recognize the existence of the router 11A at several hops ahead, and an establishment of the bypass pipe to this router 11A is attempted, as in the steps S3001 to S003 of FIG. 40 described above.

Actually, the router 11F recognizes the existence of the router 11B (sub-nets #2 and #5), the router 11A (subnet #1), and the router 11E (sub-net #7) at several hops ahead according to the routing information exchange, so that the router 11F can transmit a bypass pipe set up request message containing three set up requests for three bypass pipes to these routers-11B, 11A, and 11E, to the router 11C. The router 11E can also transmit the similar bypass pipe set up request message to the router 11B.

In this case, when the bypass pipe set up request message for a bypass pipe in a direction from the router 11F to the router 11A is received from the router 11F, the router 11C operates as follows.

Figure 54:
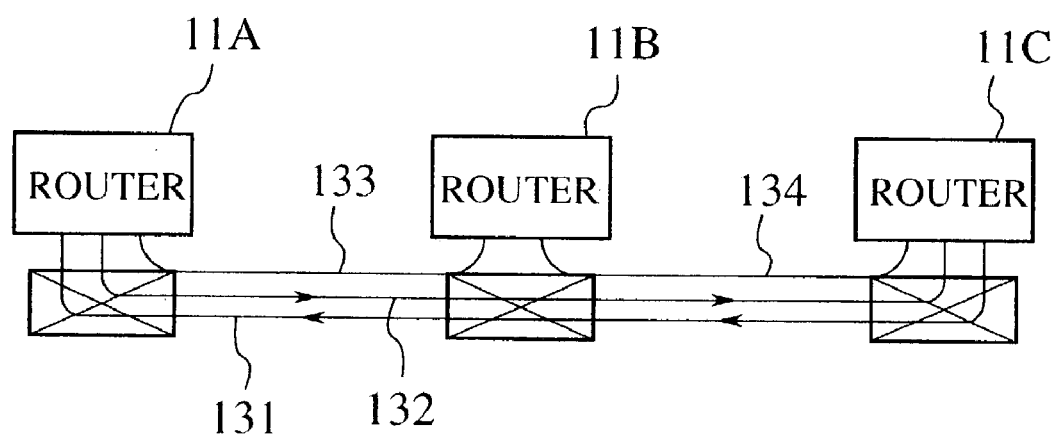
FIG. 54 is a schematic block diagram showing exemplary connections among some routers in the still another exemplary configuration of FIG. 52.

Here, as shown in FIG. 54, the router 11C already has a bypass pipe 131 between the router 11A and this router 11C. Consequently, the multiplexing of the bypass pipes is carried out within the router 11C. In other words, the when the VC for the bypass pipe from the router 11F is captured, the router 11C merges this VC to the bypass pipe 131 from the router 11C to the router 11A that has already been established earlier. Namely, the VC from the router 11F to the router 11A and the VC from the router processing unit in this router 11C to the router 11A are both connected to the bypass pipe 131 from the router 11C to the router 11A by using a table in the add/drop and header conversion unit within this router 11C (or a switch table in a case of a multi-port router).

Similarly, when the bypass pipe set up request message for a bypass pipe in a direction from the router 11E to the router 11A is received from the router 11E, the router 11B utilizes the bypass pipe 131 to the router 11A that has already been established in this router 11B, by merging the VC for the bypass pipe from the router 11E to the bypass pipe 131 by an appropriate setting of a table in the add/drop and header conversion unit within this router 11B (or a switch table in a case of a multi-port router), such that the datagram from the router 11E can reach to the router 11A by only the ATM layer processing.

Figure 55:
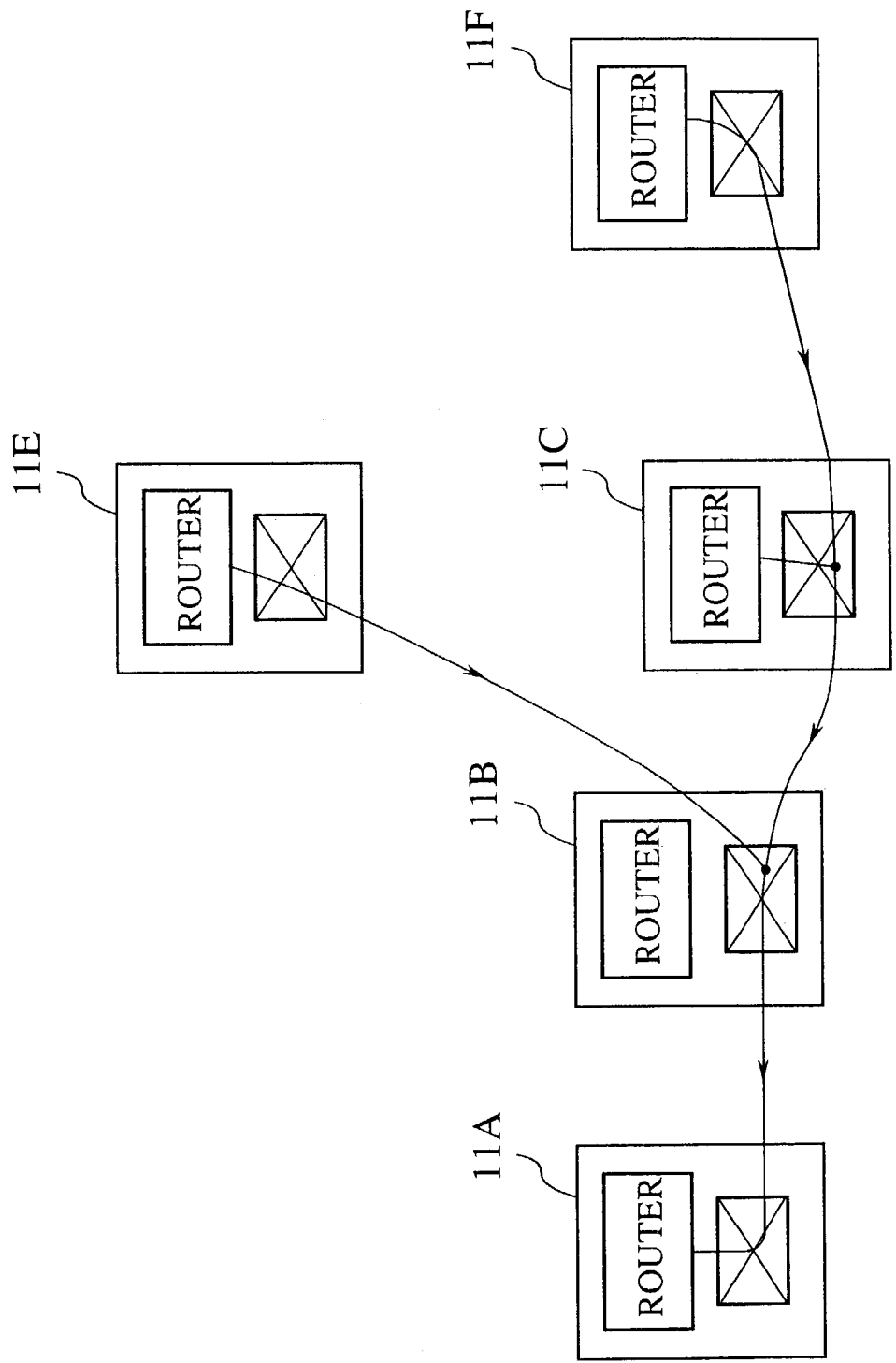
FIG. 55 is a schematic block diagram showing an exemplary multi-point to point connection among some routers in the still another exemplary configuration of FIG. 52.

Thus, in this case, as shown in FIG. 55, the bypass pipes from the router processing units in the routers 11E and 11F are merged at the router 11B to effectively form a spanning tree with the router 11A as a root and the other routers as nodes.

Hence, the multi-point to point connection obtained in this procedure is obtained by the merging of the connections in the routers, and not by a use of a multi-point connection of the ATM-LAN. Consequently, this multi-point to point ATM connection can be realized by the protocol among the routers alone, and the datalink layer is not necessarily required to have a function of a multi-point connection.

As described, in this procedure, it is possible to form the multi-point to point ATM connection as shown in FIG. 55 in which each router functions as a root (destination) and the other routers functions as leaves (start point).

Here, the cell flow from this multi-point to point ATM connection is merged at each router functioning as a node, the multiplexing of the datagram is necessary, and the following should be taken into account.

First, in a case of using the ALL type 3/4, a different MID (Multiplex Identifier) should be assigned to the source of each datagram. By means of this, it becomes possible for the router 11A to identify each transmission source.

Second, in a case of using the AAL type 5, the transmission source identification at the cell level is impossible at the router 11A, so that the add/drop function in the router or the ATM switch should be provided with such a function that, in a given VC, until a transmission of one AAL-PDU (datagram) is finished, the other PDUs are not allowed to flow into that given VC.

In the multi-point to point ATM connection obtained by this procedure, each router functions as a root (destination) and the branch points (nodes) of this multi-point to point ATM connection are located at the routers. In this manner, it becomes possible to realize the dedicated Vc with a smaller number of VCs (or more specifically, a smaller number of ATM-LANs inter-networked to one ATM-LAN).

Thus, in this procedure, the spanning tree for the datagram transfer which is generated by the routing protocol operating among the routers is directly realized by the multi-point to point connection formed by the ATM connections. Note here that, within each ATM-LAN, each of these multi-point to point VCs is basically the point to point VC, which may be a VC associated with QoS.

In this procedure, as a plurality of datagrams from a plurality of locations are multiplexed into one VC at the router, there is a possibility for an overflow of the VC capacity or a cell loss within the ATM switch to occur, in a case of the traffic concentration. Such an overflow or a cell loss can be prevented by any of the following measures.

(1) For the VC in which the congestion or the cell loss is likely to occur, the relay of the cell to that VC by only the ATM layer processing can be temporarily or partially interrupted and the routing to the router processing unit is used instead.

(2) For the lower stream of the spanning tree (i.e., at a side closer to the terminal point router), a larger bandwidth resource can be secured in advance compared with the upper stream.

(3) Basically, the cell loss occurs at the router which becomes a node of the spanning tree. Consequently, an ATM switch in such a router can be selectively formed by a high performance switch capable of realizing the lower cell loss rate compared with the ATM switch in the ATM-LAN.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of establishing a virtual path for transferring packets, comprising:
    receiving, at a downstream layer 3 node of a first logical layer 3 network, a first path request message from an upstream layer 3 node of a second logical layer 3 network, the first path request message requesting that the virtual path pass between the upstream and downstream layer 3 nodes; and
    providing a first reservation message from the downstream layer 3 node to the upstream layer 3 node, the first reservation message responsive to the first path request message, the first reservation message having information identifying the virtual path passing between the upstream layer 3 node and the downstream layer 3 node for transferring, at a layer lower than the layer 3, the packets through the upstream layer 3 node and between (1) a third node upstream of the upstream layer 3 node and (2) the downstream layer 3 node along the virtual path.

2. The method of claim 1, wherein the information of the first reservation message includes specification information identifying a group of packets to be transferred along the virtual path.

3. A method of establishing a virtual path for transferring packets, comprising:
    receiving a first path request message from a first layer 3 node of a first logical layer 3 network at a second layer 3 node of a second logical layer 3 network, the first path request message requesting an upstream portion of the virtual path;
    providing a second path request message from the second layer 3 node, upon receiving the first path request message, to a third layer 3 node of a third logical layer 3 network, the second path request message requesting a downstream portion of the virtual path;
    receiving a first reservation message from the third layer 3 node at the second layer 3 node, the first reservation message responsive to the second path request message, the first reservation message having first information identifying the downstream portion of the virtual path between the third layer 3 node and the second layer 3 node;
    establishing a correspondence in accordance with the first information and a second information at the second layer 3 node; and
    providing a second reservation message, responsive to the first reservation message, from the second layer 3 node to the first layer 3 node, the second reservation message including the second information identifying the upstream portion of the virtual path between the second layer 3 node and the first layer 3 node,
    wherein the correspondence of the second layer 3 node is operative to transfer packets from the upstream portion of the virtual path to the downstream portion of the virtual path and through the second layer 3 node at a layer lower than the layer 3.

4. The method of claim 3, wherein the information of the second reservation message and first reservation message include specification information identifying a group of packets to be transferred along the virtual path.

5. The method of claim 4, wherein a packet is forwarded onto the upstream portion of the virtual path based upon information of the packet which corresponds to the specification information.

6. The method of claim 5, wherein the information of the packet is network layer information.

7. The method of claim 6, further comprising:
    providing an identifier to the packet at the first layer 3 node based upon the network layer destination address of the packet; and
    transferring the packet over the upstream portion of the virtual path in accordance with the identifier.

8. A method of establishing a virtual path for transferring packets, comprising:
    receiving, at a layer 3 node of a first logical layer 3 network, a first path request message from an upstream layer 3 node of a second logical layer 3 network, the first path request message requesting an upstream portion of the virtual path;
    providing a second path request message from the layer 3 node of the first logical layer 3 network, responsive to the first path request message, to a downstream layer 3 node of a third logical layer 3 network, the second path request message requesting a downstream portion of the virtual path;
    receiving at the layer 3 node of the first logical layer 3 network a first reservation message from the downstream layer 3 node responsive to the second path request message, the reservation message including a first information and forwarding packet class corresponding to the downstream portion of the virtual path between the downstream layer 3 node and the layer 3 node of the first logical layer 3 network;
    establishing a correspondence in accordance with the first information, a second information and the forwarding packet class at the node of the first logical layer 3 network; and
    providing a second reservation message from the layer 3 node of the first logical layer 3 network, responsive to the first reservation message, to the upstream layer 3 node, the second reservation message including the second information and the forwarding packet class corresponding to the upstream portion of the virtual path between the layer 3 node of the first logical layer 3 network and the upstream layer 3 node, wherein the correspondence of the layer 3 node of the first logical layer 3 network is operative to transfer packets from the upstream portion of the virtual path to the downstream portion of the virtual path and through the layer 3 node of the first logical layer 3 network at a layer lower than the layer 3.

9. The method of claim 8, further comprising:

storing the second information and the first information in a memory of the layer 3 node of the first logical layer 3 network.

10. The method of claim 9, further comprising:

receiving a packet from the upstream portion of the virtual path at the layer 3 node of the first logical layer 3 network, the packet identified by an input side identifier of the correspondence.

11. The method of claim 10, wherein the input side identifier is used to index an output side identifier in the memory of the layer 3 node of the first logical layer 3 network.

12. The method of claim 11, further comprising:

replacing, at the layer 3 node of the first logical layer 3 network, the input side identifier of the packet with the output side identifier; and transferring the packet in accordance with the output side identifier.

13. A method of establishing a virtual path for transferring packets, comprising:

receiving, at a downstream layer 3 node of a first logical layer 3 network, a first path request message from an upstream layer 3 node of a second logical layer 3 network, the first path request message requesting that the virtual path pass between the upstream and downstream layer 3 nodes; and providing a first reservation message from the downstream layer 3 node to the upstream layer 3 node, the first reservation message responsive to the first path request message, the first reservation message having information identifying the virtual path passing between the upstream layer 3 node and the downstream layer 3 node for transferring, at a layer lower than the layer 3, the packets through the downstream layer 3 node and between (1) a third node downstream of the downstream layer 3 node and (2) the upstream layer 3 node along the virtual path.

14. The method of claim 1, wherein the virtual path through the upstream layer 3 node comprises a bypass pipe through the upstream layer 3 node.

15. The method of claim 3, wherein the virtual path through the second layer 3 node comprises a bypass pipe through the upstream layer 3 node.

16. The method of claim 8, wherein the virtual path through the layer 3 node of the first logical layer 3 network comprises a bypass pipe through the upstream layer 3 node.

17. The method of claim 13, wherein the virtual path through the downstream layer 3 node comprises a bypass pipe through the upstream layer 3 node.

18. The method of claim 1, wherein the transfer of packets through the upstream layer 3 node is without layer 3 processing.

19. The method of claim 3, wherein the transfer of packets through the second layer 3 node is without layer 3 processing.

20. The method of claim 8, wherein the transfer of packets through the layer 3 node of the first logical layer 3 network is without layer 3 processing.

21. The method of claim 13, wherein the transfer of packets through the downstream layer 3 node is without layer 3 processing.

* * * * *